US012285859B2

(12) United States Patent
Chungbin et al.

(10) Patent No.: US 12,285,859 B2
(45) Date of Patent: Apr. 29, 2025

(54) MECHANICAL AVATAR ASSEMBLY AND SYSTEM FOR USE IN A CONFINED SPACE IN A STRUCTURE AND METHOD OF USING THE SAME

(71) Applicants: The Boeing Company, Chicago, IL (US); University of Washington, Seattle, WA (US)

(72) Inventors: Jerry D. Chungbin, Kenmore, WA (US); Shuonan Dong, Seattle, WA (US); John W. Fuller, Seattle, WA (US); Samuel F. Pedigo, Lake Forest Park, WA (US); Santosh Devasia, Lake Forest Park, WA (US); Benjamin Yat-Chun Wong, Lynnwood, WA (US); Kyle William Schultz, Seattle, WA (US); Wade Marquette, Mukilteo, WA (US); Lucky Singh, Seatac, WA (US); Derek Keith Loy, Mukilteo, WA (US); Joseph L. Garbini, Seattle, WA (US)

(73) Assignee: The Boeing Company, Arlington, VA (US)

( * ) Notice: Subject to any disclaimer, the term of this patent is extended or adjusted under 35 U.S.C. 154(b) by 578 days.

(21) Appl. No.: 17/686,350

(22) Filed: Mar. 3, 2022

(65) Prior Publication Data
US 2022/0281102 A1 Sep. 8, 2022

Related U.S. Application Data

(60) Provisional application No. 63/156,816, filed on Mar. 4, 2021.

(51) Int. Cl.
B25J 9/06 (2006.01)
B25J 9/10 (2006.01)
(Continued)

(52) U.S. Cl.
CPC ............ *B25J 9/06* (2013.01); *B25J 9/1035* (2013.01); *B25J 9/1045* (2013.01); *B25J 9/146* (2013.01);
(Continued)

(58) Field of Classification Search
CPC .......... B25J 9/06; B25J 9/1035; B25J 9/1045; B25J 9/146; B25J 9/1697; B25J 19/0004; B25J 19/002; B25J 5/02; B25J 3/02
See application file for complete search history.

(56) References Cited

U.S. PATENT DOCUMENTS 4,298,300 A   11/1981  Francois et al.
6,525,500 B2* 2/2003  Hatley .................. B25J 5/00
                                                        376/249

(Continued)

FOREIGN PATENT DOCUMENTS

BE  569340 A  4/1961
CH  431223 A  2/1967
(Continued)

OTHER PUBLICATIONS

Extended European Search Report (EESR), European Patent Office, Sep. 16, 2022, for Application No. EP22160042.2, Applicant The Boeing Company, et al., 14 pages.

*Primary Examiner* — Octavia Hollington

(57) ABSTRACT

There is provided a mechanical avatar assembly for use in a confined space in a structure. The mechanical avatar assembly includes a rail assembly for attachment to an access opening to the confined space. The rail assembly includes two or more rail segments coupled together to form an elongated base having a rail and a gear rack extending along a length of the elongated base. The rail assembly further includes a carriage portion coupled to the rail, and movable relative to the rail, and a drive assembly coupled to the carriage portion and to the gear rack, to move the carriage (Continued)

portion along the rail. The mechanical avatar assembly further includes an articulating avatar arm coupled to, and movable via, the carriage portion. The mechanical avatar assembly further includes an image capturing device.

20 Claims, 45 Drawing Sheets

(51) Int. Cl.
*B25J 9/14* (2006.01)
*B25J 9/16* (2006.01)
*B25J 19/00* (2006.01)
(52) U.S. Cl.
CPC ......... *B25J 9/1697* (2013.01); *B25J 19/0004* (2013.01); *B25J 19/002* (2013.01)

(56) References Cited

U.S. PATENT DOCUMENTS

| | | | |
|---|---|---|---|
| 7,165,630 B2 * | 1/2007 | Arnston | ................ B23Q 17/22 173/32 |
| 9,839,428 B2 * | 12/2017 | Baxter, III | ....... A61B 17/07207 |
| 2019/0168388 A1 | 6/2019 | Pringle, IV et al. | |

FOREIGN PATENT DOCUMENTS

| | | | | |
|---|---|---|---|---|
| CN | 109079769 A | * | 12/2018 | ................ B25J 9/04 |
| CN | 108527348 B | | 10/2020 | |
| CN | 111923072 B | | 12/2020 | |
| DE | 4104566 C2 | | 6/1995 | |
| EP | 1862381 B1 | | 10/2018 | |
| JP | 2002264050 A | | 9/2002 | |

* cited by examiner

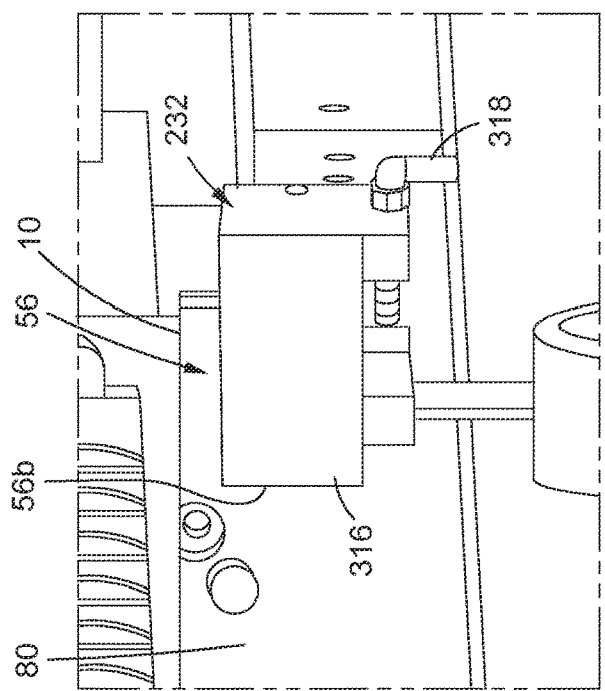
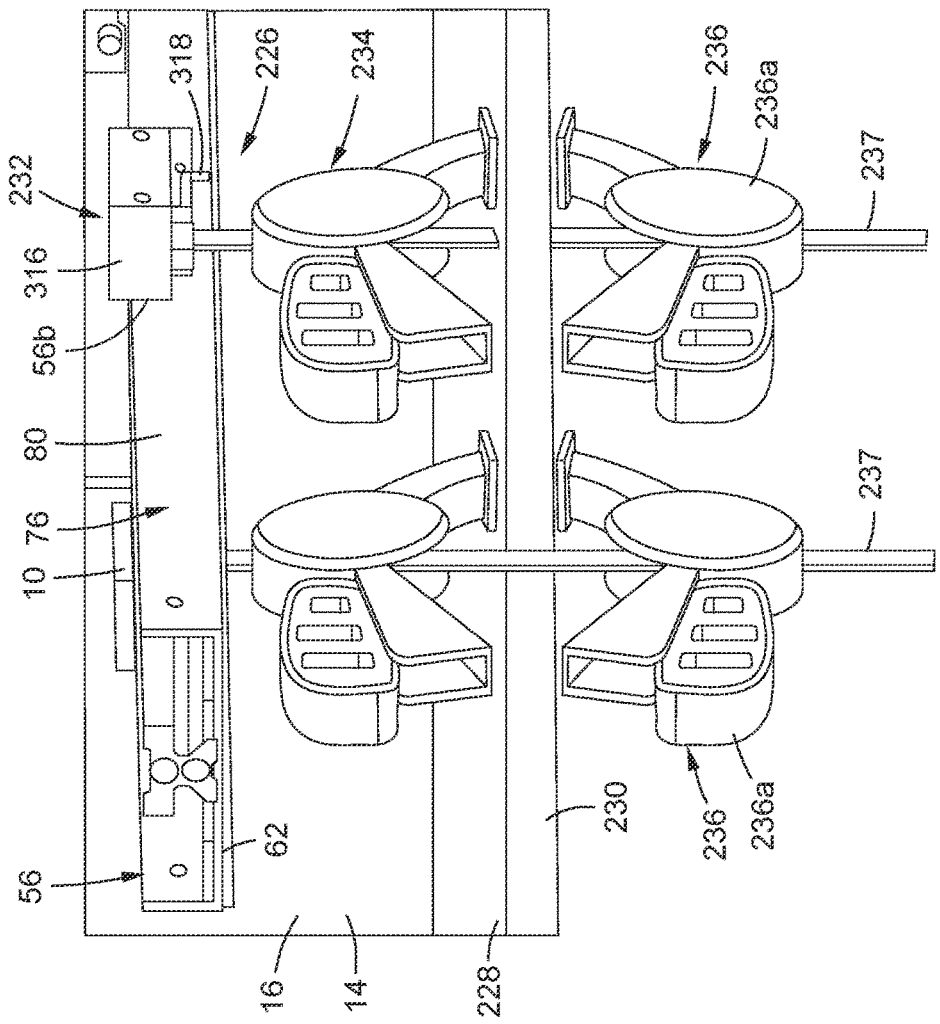
FIG. 8B
FIG. 8A

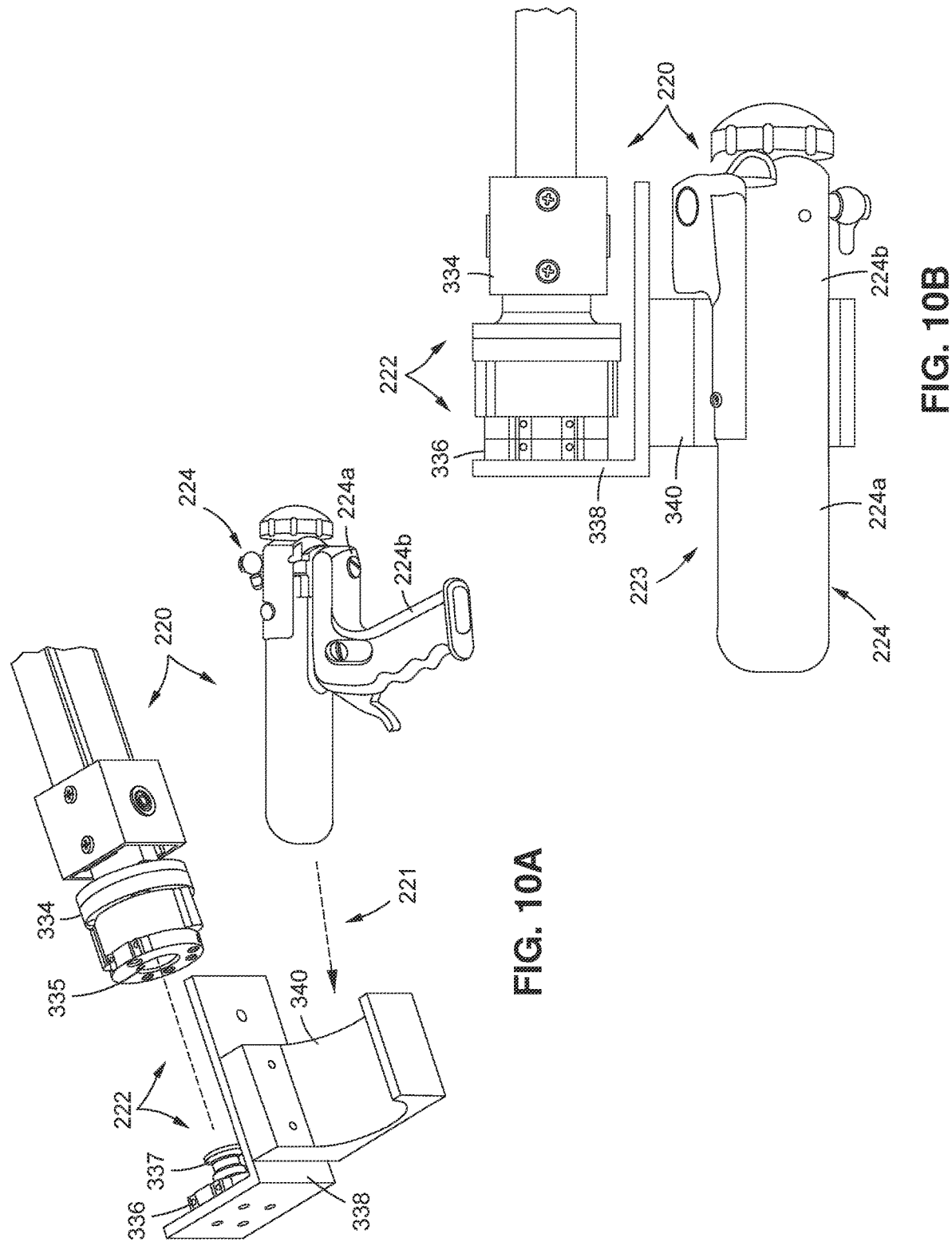

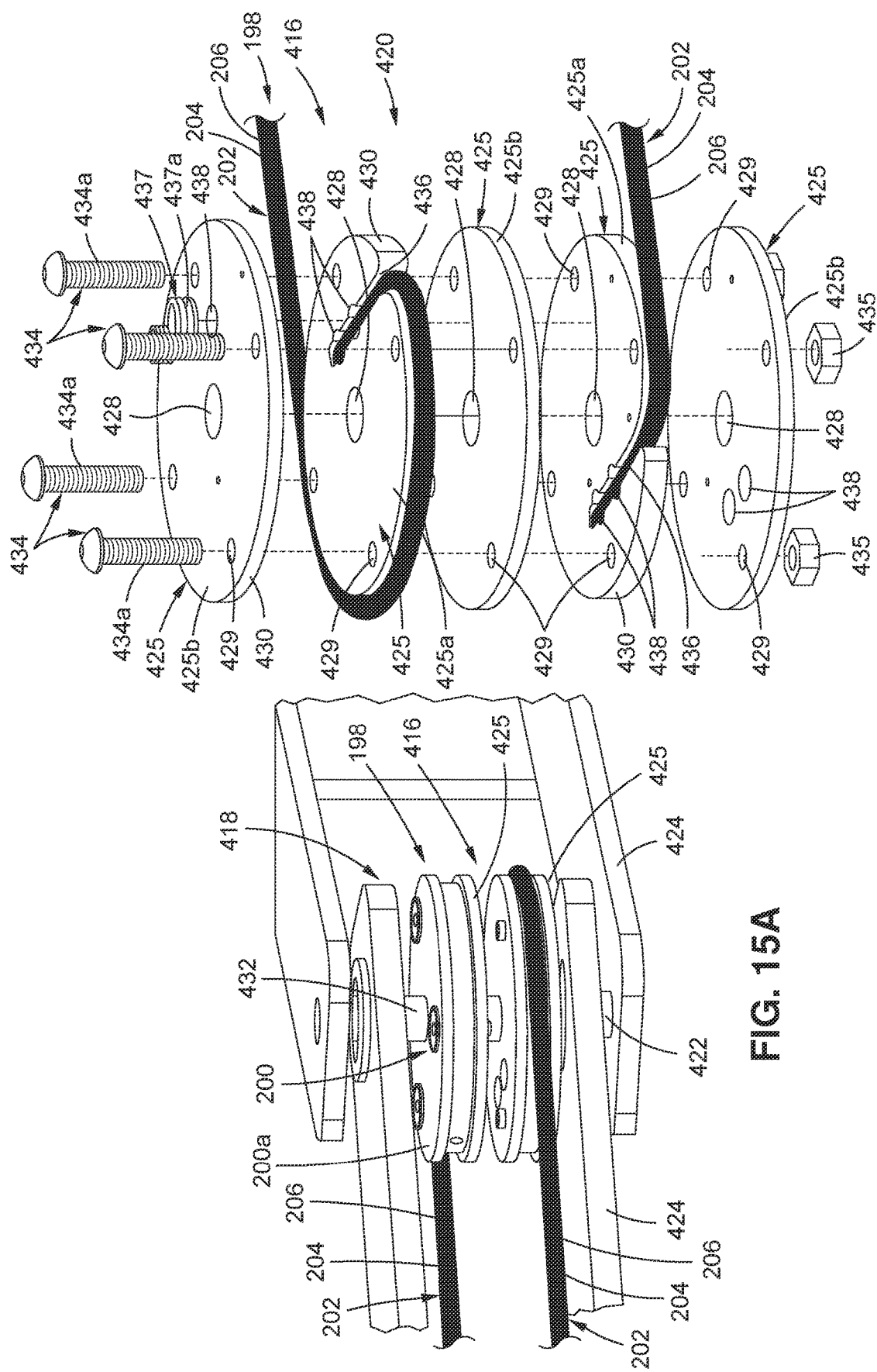

MECHANICAL AVATAR ASSEMBLY AND SYSTEM FOR USE IN A CONFINED SPACE IN A STRUCTURE AND METHOD OF USING THE SAME

CROSS-REFERENCE TO RELATED APPLICATION

This nonprovisional application claims priority to pending U.S. Provisional Application Ser. No. 63/156,816, filed Mar. 4, 2021, which is incorporated herein by reference in its entirety.

FIELD

The disclosure relates generally to assemblies, systems, and methods used to perform operations in confined spaces, and more particularly, to mechanical assemblies, systems, and methods enabling control of operations performed in confined spaces in structures, such as vehicles, from outside of the confined spaces.

BACKGROUND

In the manufacture and assembly of vehicles, such as aircraft, rotorcraft, spacecraft, automobiles, trucks, trains, ships, and other vehicles, as well as in the construction and assembly of architectural structures, various operations including inspecting, sealing, painting, fastening, cleaning, installing, and other types of operations, are typically performed. Such operations may require accessing confined spaces, for example, for aircraft, inside an aircraft wing, inside a horizontal stabilizer, inside a vertical stabilizer, or inside another aircraft structure.

Known methods for performing such confined space operations in a vehicle, such as an aircraft, include a human worker accessing an aircraft structure, such as a tank or a rib bay in a wing of the aircraft, through an access opening formed in the aircraft structure, the human worker crawling into an interior of a confined space in the aircraft structure, and the human worker manually performing one or more operations in the confined space. However, such known methods may be time consuming and may affect build rates. Moreover, such known methods may have ergonomic challenges and issues. In addition, for aircraft with small wings, such known methods may not allow the human operator to access the interior of the confined space due to space and size constraints within the confined space.

In addition, known systems and methods for performing such confined space operations in vehicles, such as aircraft, include the use of fully automated robot assemblies to access an interior of a confined space in an aircraft structure, such as a tank or a rib bay in an aircraft wing, through the access opening, and to automatically perform one or more operations in the confined space. However, such fully automated robot assemblies may be large or bulky in size and may require use of a considerable amount of equipment. Such large fully automated robot assemblies may have difficulty accessing one or more confined areas in the confined space, may have difficulty navigating past support structures, such as stringers or stiffeners, within the aircraft wing, and/or may have difficulty with proper positioning within the confined space to perform the one or more operations. Moreover, such large fully automated robot assemblies may be very heavy in weight (i.e., greater than 50-100 pounds), and may be difficult to manually lift, or may require additional lift equipment to move the robot assemblies to the aircraft structure. Further, fully automated robot assemblies may require the use of numerous sensors and controls which are often not compatible in a spark-proof or ignition-proof environment, such as the tank of an aircraft wing. Packaging such sensors and controls to be spark-proof or ignition-proof may result in increased equipment costs, and in turn, may result in increased overall manufacturing costs.

Accordingly, there is a need in the art for an assembly, system, and method for mechanically accessing a confined space in a structure, such as a vehicle, to perform one or more operations in the confined space, and to enable control of the one or more operations from outside of the confined space, thus avoiding the need for a human worker to crawl into the confined space and perform the one or more operations. Further, there is a need in the art for an assembly, system, and method that are not fully automated, that are lightweight, low cost, simple to use, and may be used as spark-proof or ignition-proof compliant in an environment, and that provide advantages over known assemblies, systems, and methods.

SUMMARY

Example implementations of this disclosure provide an assembly, system, and method for accessing a confined space in a vehicle, such as an aircraft, to perform one or more confined space operations in the vehicle, such as the aircraft, to enable performance of the one or more confined space operations from outside of the confined space, and to provide significant advantages over known assemblies, systems, and methods.

In one version of the disclosure, there is a mechanical avatar assembly for use in a confined space in a structure. The mechanical avatar assembly comprises a rail assembly designed for attachment to an access opening to the confined space in the structure. The rail assembly comprises two or more rail segments coupled together to form an elongated base having a rail and a gear rack extending along a length of the elongated base. The rail assembly further comprises a carriage portion coupled to the rail, and movable relative to the rail. The rail assembly further comprises a drive assembly coupled to the carriage portion and to the gear rack, to move the carriage portion along the rail.

The mechanical avatar assembly further comprises an articulating avatar arm coupled to, and movable via, the carriage portion. The articulating avatar arm comprises a plurality of mechanical links, a plurality of joints coupling the plurality of mechanical links together, and one or more actuator assemblies coupled at each joint. The mechanical avatar assembly further comprises an image capturing device coupled to the articulating avatar arm.

In another version of the disclosure, there is provided a mechanical avatar system for use in a confined space in a structure. The mechanical avatar system comprises a mechanical avatar assembly attached, via an attachment assembly, to an access opening to the confined space in the structure.

The mechanical avatar assembly comprises a rail assembly having a rail and a gear rack, extending along a length of an elongated base formed by two or more rail segments, and having a carriage portion, driven by a pneumatic drive assembly along the rail. The mechanical avatar assembly further comprises an articulating avatar arm coupled to, and movable via, the carriage portion. The articulating avatar arm comprises a plurality of mechanical links, a plurality of joints coupling the plurality of mechanical links together, and one or more actuator assemblies coupled at each joint.

The mechanical avatar assembly further comprises an image capturing device coupled to the articulating avatar arm. The mechanical avatar assembly further comprises an end effector tool assembly coupled to the articulating avatar arm.

The mechanical avatar system further comprises an operator workstation positioned outside the confined space, at a predetermined distance from the mechanical avatar assembly which is attached to the access opening in the structure. The operator workstation comprises a portable structure with a control system having a plurality of control devices, including pneumatic drive assembly control devices, and including an input control arm. The input control arm is mechanically coupled to the articulating avatar arm, with a plurality of connector elements, to remotely and directly control the articulating avatar arm. The articulating avatar arm mimics one or more motions of the input control arm operated by an operator. The operator workstation further comprises a monitor coupled to the portable structure, to display one or more output images from the image capturing device.

In another version there is provided a method of using and remotely operating a mechanical avatar assembly in a confined space in a structure. The method comprises the step of installing the mechanical avatar assembly in an interior of the confined space in the structure.

The mechanical avatar assembly comprises a rail assembly having a rail and a gear rack, extending along a length of an elongated base formed by two or more rail segments, and having a carriage portion, driven by a pneumatic drive assembly along the rail. The mechanical avatar assembly further comprises an articulating avatar arm coupled to, and movable via, the carriage portion. The articulating avatar arm comprises a plurality of mechanical links, a plurality of joints coupling the plurality of mechanical links together, and one or more actuator assemblies coupled at each joint. The mechanical avatar assembly further comprises an image capturing device coupled to the articulating avatar arm, and an end effector tool assembly coupled to the articulating avatar arm.

The method further comprises the step of attaching, with an attachment assembly, at least one portion of the mechanical avatar assembly, to an edge of an access opening to the confined space. The method further comprises the step of positioning an operator workstation outside the confined space, at a predetermined distance from the mechanical avatar assembly attached to the access opening. The operator workstation comprises a portable structure having a control system with a plurality of control devices, including an input control arm, and pneumatic drive assembly control devices. The operator workstation further comprises a monitor, to display one or more output images from the image capturing device.

The method further comprises the step of mechanically coupling the mechanical avatar assembly to the operator workstation, including mechanically coupling the input control arm to the articulating avatar arm, with a plurality of connector elements. The method further comprises the step of operating the pneumatic drive assembly control devices by an operator, to remotely control the pneumatic drive assembly, to drive the carriage portion along the rail, to move the articulating avatar arm to a desired position.

The method further comprises the step of operating the input control arm by the operator, to remotely and directly control the articulating avatar arm, by mechanically actuating one or more input control arm actuator assemblies coupled to, and corresponding to, the one or more actuator assemblies of the articulating avatar arm, to cause the articulating avatar arm to mimic one or more motions of the input control arm, and to orient the articulating avatar arm to a desired orientation. The method further comprises the step of performing one or more confined space operations in the confined space in the structure, by using and remotely operating one of, the image capturing device, or the image capturing device and the end effector tool assembly, coupled to the mechanical avatar assembly.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary versions or embodiments, but which are not necessarily drawn to scale, wherein:

FIG. 8A is an illustration of an enlarged rear perspective view of an attachment assembly attaching an exemplary version of a mechanical avatar assembly of the disclosure to an access opening to a confined space in a structure;

FIG. 8B is an illustration of an enlarged perspective view of a connector device of the attachment assembly of FIG. 8A;

FIG. 10A is an illustration of a right perspective view of an exemplary version of an end effector tool assembly in an uncoupled configuration;

FIG. 10B is an illustration of a right perspective view of the end effector tool assembly of FIG. 10A in a coupled configuration;

FIG. 15A is an illustration of a perspective view of a sandwich pulley and cable assembly in an assembled configuration for use in a version of a mechanical avatar system of the disclosure;

FIG. 15B is an illustration of an exploded perspective view of a sandwich pulley and cable assembly in a disassembled configuration;

Each figure shown in this disclosure shows a variation of an aspect of the versions or examples presented, and only differences will be discussed in detail.

DETAILED DESCRIPTION

Disclosed versions or examples will now be described more fully hereinafter with reference to the accompanying drawings, in which some, but not all of the disclosed versions or examples are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "in one version" or "in a version" do not necessarily refer to the same version. Particular features, structures, or characteristics may be combined in any suitable manner consistent with this disclosure.

As used herein, "comprising" is an open-ended term, and as used in the claims, this term does not foreclose additional structures or steps.

As used herein, "designed to" or "configured to" means various parts or components may be described or claimed as "designed to" or "configured to" perform a task or tasks. In such contexts, "designed to" or "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps.

As used herein, elements that are "coupled" may, but do not necessarily, interact through one or more intermediating elements.

Figure 1A:
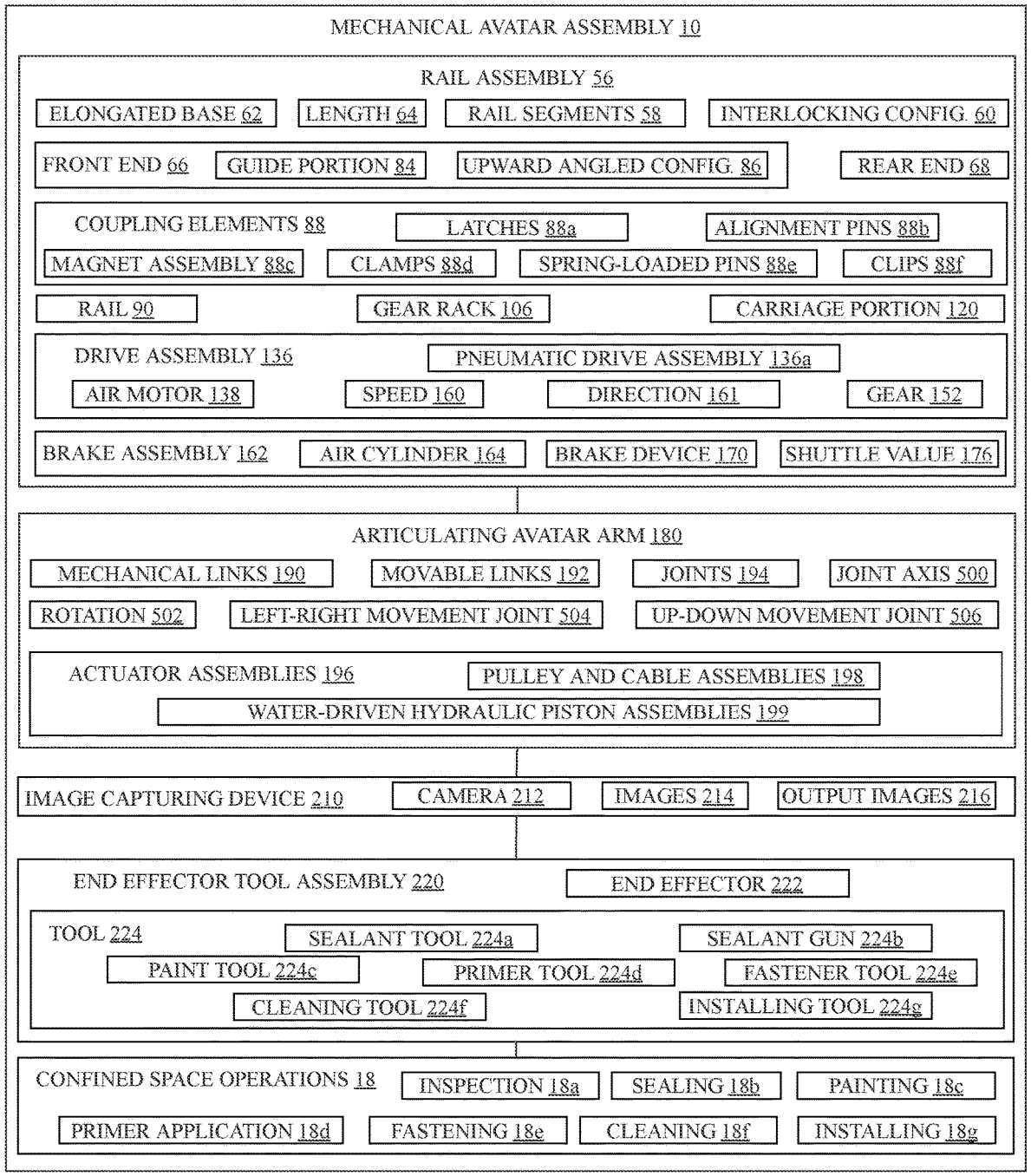
FIG. 1A is an illustration of a functional block diagram showing an exemplary version of a mechanical avatar assembly of the disclosure.
Figure 1B:
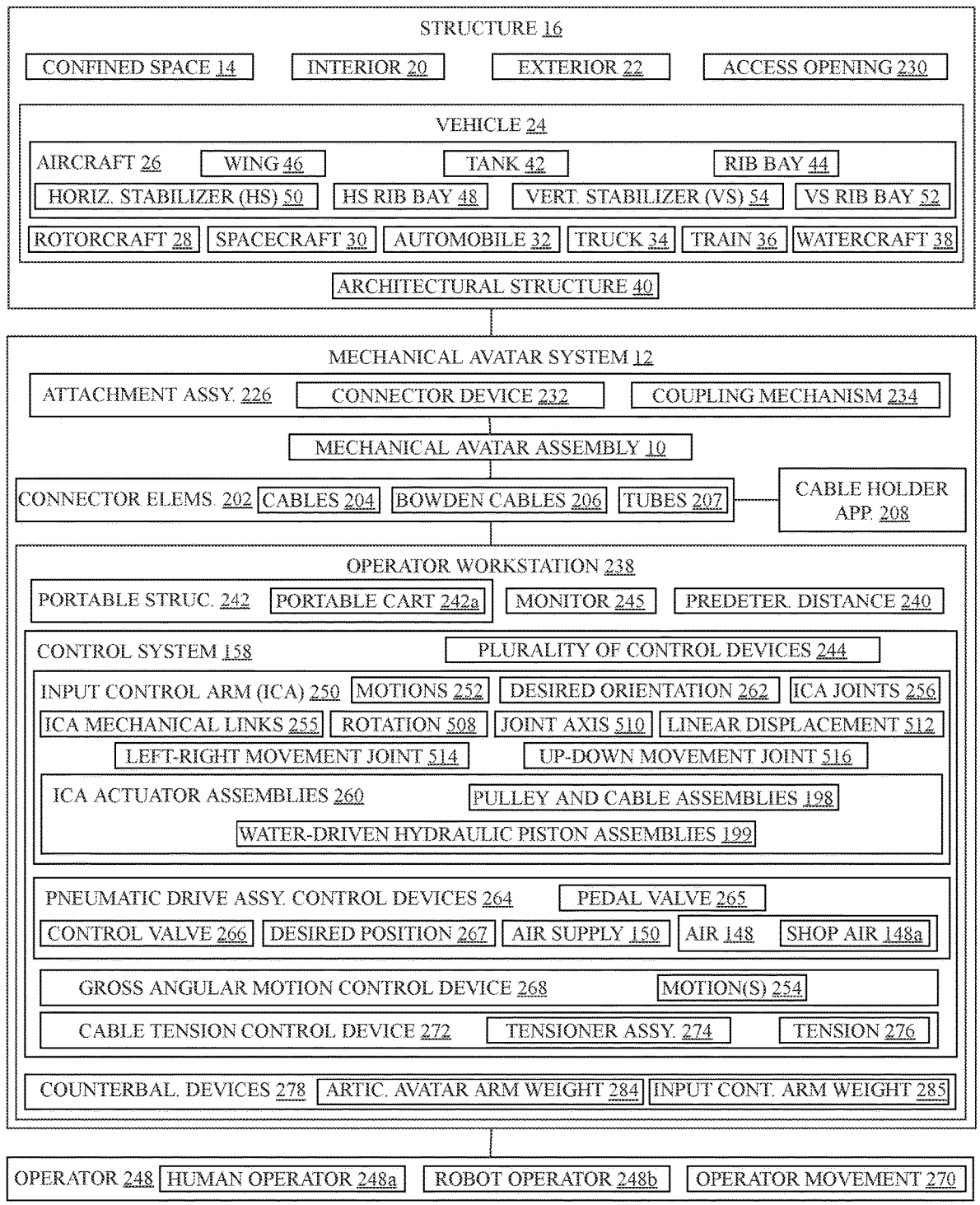
FIG. 1B is an illustration of a functional block diagram showing an exemplary version of a mechanical avatar system of the disclosure.

Now referring to the Figures, FIG. 1A is an illustration of a functional block diagram showing an exemplary version of a mechanical avatar assembly 10 of the disclosure. FIG. 1B is an illustration of a functional block diagram showing an exemplary version of a mechanical avatar system 12 of the disclosure that includes the mechanical avatar assembly 10.

The blocks in FIGS. 1A-1B represent elements, and lines connecting the various blocks do not imply any particular dependency of the elements. Furthermore, the connecting lines shown in FIGS. 1A-1B are intended to represent example functional relationships and/or physical couplings between the various elements, but it is noted that other alternative or additional functional relationships or physical connections may be present in versions disclosed herein.

The mechanical avatar assembly 10 and the mechanical avatar system 12 are designed for use in, and with, a confined space 14 (see FIG. 1B) in a structure 16 (see FIG. 1B), in which one or more confined space operations 18 (see FIG. 1A) are performed in an interior 20 (see FIG. 1B) of the confined space 14, and remotely controlled and operated outside an exterior 22 (see FIG. 1B) of the confined space 14. As shown in FIG. 1A, the one or more confined space operations 18 may comprise one or more of, inspection 18a, sealing 18b, painting 18c, primer application 18d, fastening 18e, cleaning 18f, installing 18g, or another suitable confined space operation. The confined space operation 18 of inspection 18a may include a visual quality inspection, a gap check inspection, for example, a gap check inspection of a rib and spar interface to panel in a vehicle 24 (see FIGS. 1B, 19), such as an aircraft 26 (see FIGS. 1B, 19), a dimensional check, a measuring action, or another suitable inspection action. The confined space operation 18 of sealing 18b may include fillet sealing, faying surface sealing, cap sealing, edge sealing, brush sealing, or another suitable sealing action or sealing application. The confined space operation 18 of painting 18c may include painting of interior parts, components, or surfaces, or another suitable painting action or paint application. The confined space operation 18 of primer application 18d may include primer touchup to metallic structures or other interior parts, components, or surfaces, or another suitable primer application. The confined space operation 18 of fastening 18e may include fastening a fastener element, for example, a rivet, a bolt, a screw, or another suitable fastener element. The confined space operation 18 of cleaning 18f may include brushing, wiping, spraying, rinsing, washing, or another suitable cleaning action of interior parts, components, or surfaces. The confined space operation 18 of installing 18g may include installing collars, installing systems components, or installing other parts or components in the interior 20 of the confined space 14.

The structure 16 comprises a vehicle 24 (see FIG. 1B) having one or more confined spaces 14, in which one or more confined space operations 18 are performed in the interior 20 of the confined space 14, and remotely controlled and operated outside the interior 20 and the exterior 22 of the confined space 14. As shown in FIG. 1B, the vehicle 24 comprises an aircraft 26 (see also FIG. 19), a rotorcraft 28, a spacecraft 30, an automobile 32, a truck 34, a train 36, a watercraft 38, such as a ship or boat, or another suitable vehicle. The structure 16 (see FIG. 1B) further comprises an architectural structure 40 (see FIG. 1B) having one or more confined spaces 14, in which one or more confined space operations 18 are performed in the interior 20 of the confined space 14, and remotely controlled and operated outside the interior 20 and the exterior 22 of the confined space 14. The architectural structure 40 may comprise a building, for example an industrial building, a residential building, an educational building, a retail building, a business building, a storage building, an institutional building, or another suitable building, or the architectural structure 40 may comprise a stadium, a monument, or another suitable architectural structure having one or more confined spaces 14. The structure 16 may further comprise other suitable structures having one or more confined spaces 14, in which one or more confined space operations 18 are performed in the interior 20 of the confined space 14, and remotely controlled and operated outside the interior 20 and the exterior 22 of the confined space 14.

When the structure 16 comprises an aircraft 26, the confined space 14 may comprise, for example, a tank 42 (see FIG. 1B), a rib bay 44 (see FIGS. 1B, 19), or another confined space 14 in a wing 46 (see FIGS. 1B, 19) of the aircraft 26. Additionally, when the structure 16 comprises an aircraft 26, the confined space 14 may comprise, for example, a horizontal stabilizer rib bay 48 (see FIGS. 1B, 19) in a horizontal stabilizer 50 (see FIGS. 1B, 19) of the aircraft 26, or a vertical stabilizer rib bay 52 (see FIGS. 1B, 19) in a vertical stabilizer 54 (see FIGS. 1B, 19) of the aircraft 26.

As shown in FIG. 1A, the mechanical avatar assembly 10 comprises a rail assembly 56. The rail assembly 56 is preferably in the form of a modular rail assembly 56a (see FIGS. 1A, 4A). The rail assembly 56 comprises two or more rail segments 58 (see FIGS. 1A, 4A) coupled together in an interlocking configuration 60 (see FIGS. 1A, 4A) to form an elongated base 62 (see FIGS. 1A, 4A) having a length 64 (see FIGS. 1A, 4A). The elongated base 62 has a front end 66 (see FIGS. 1A, 4A), or leading end, and a rear end 68 (see FIGS. 1A, 4A), or trailing end. The rail segments 58 are preferably interlocking rail segments. In one version, the rail assembly 56 comprises two rail segments 58 (see FIG. 4A), including a first rail segment 58a and a second rail segment 58b. In another version, the rail assembly 56 comprises three rail segments 58 (see FIG. 5A), including a first rail segment 58a, a second rail segment 58b, and a third rail segment 58c. In another version, the rail assembly 56 comprises four rail segments 58 (see FIG. 6A), including a first rail segment 58a, a second rail segment 58b, a third rail segment 58c, and a fourth rail segment 58d. In other versions, the rail assembly 56 may comprise more than four rail segments 58.

Figure 3A:
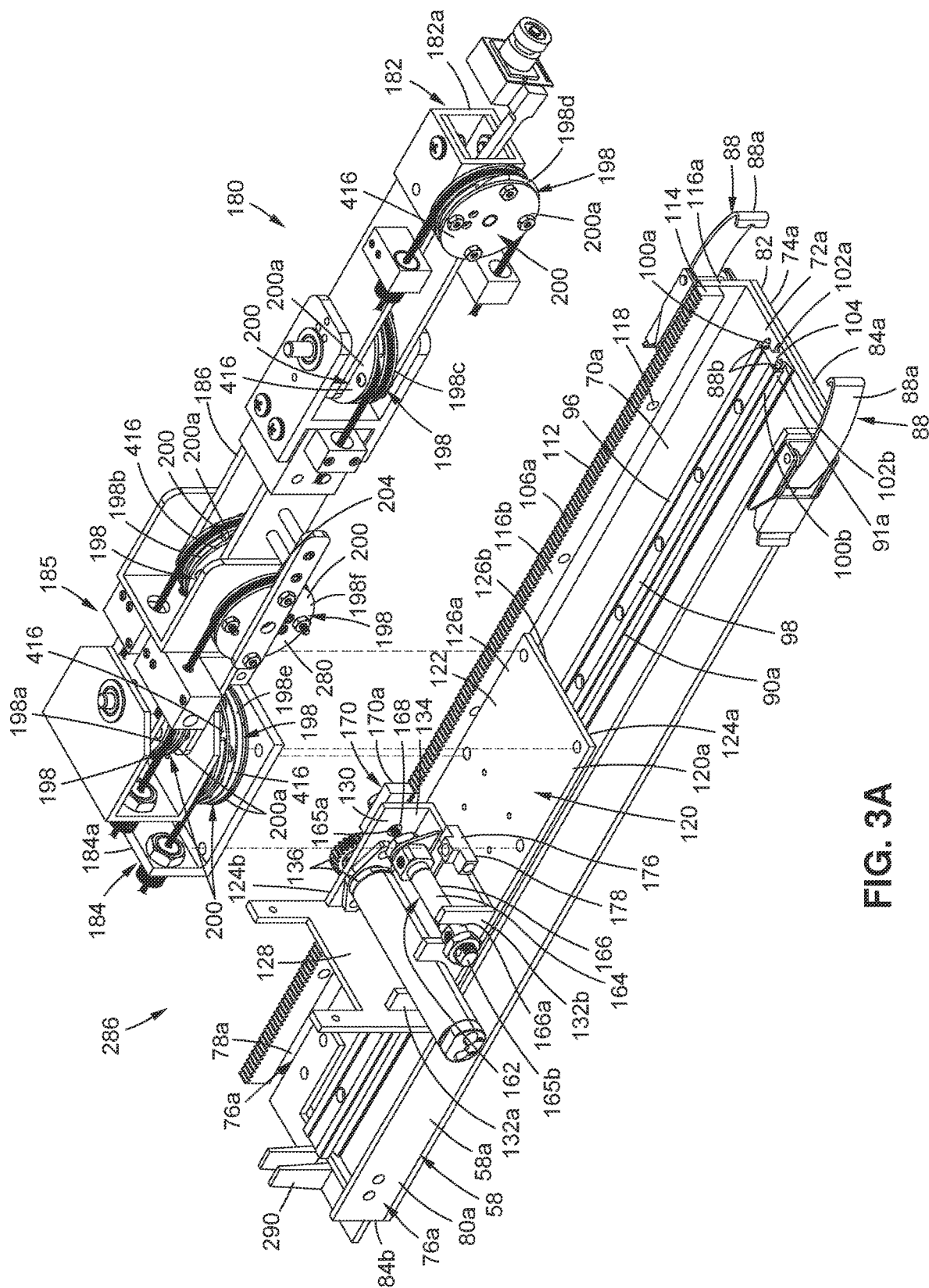
FIG. 3A is an illustration of an exploded left perspective view of the articulating avatar arm of FIG. 2 and a first rail segment in a disassembled configuration.
Figure 4A:
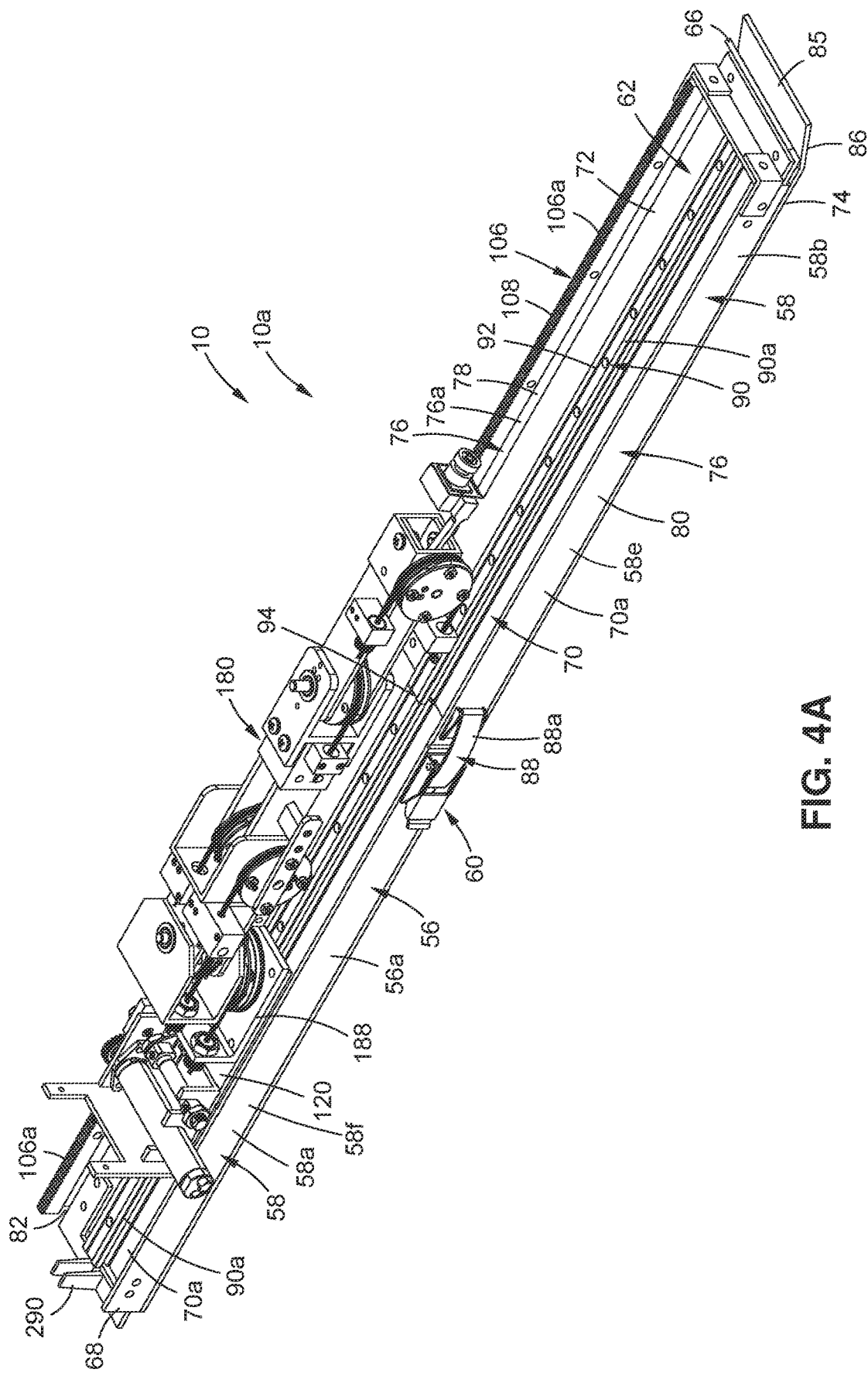
FIG. 4A is an illustration of a left perspective view of a version of a mechanical avatar assembly of the disclosure, with a rail assembly having two rail segments.
Figure 5A:
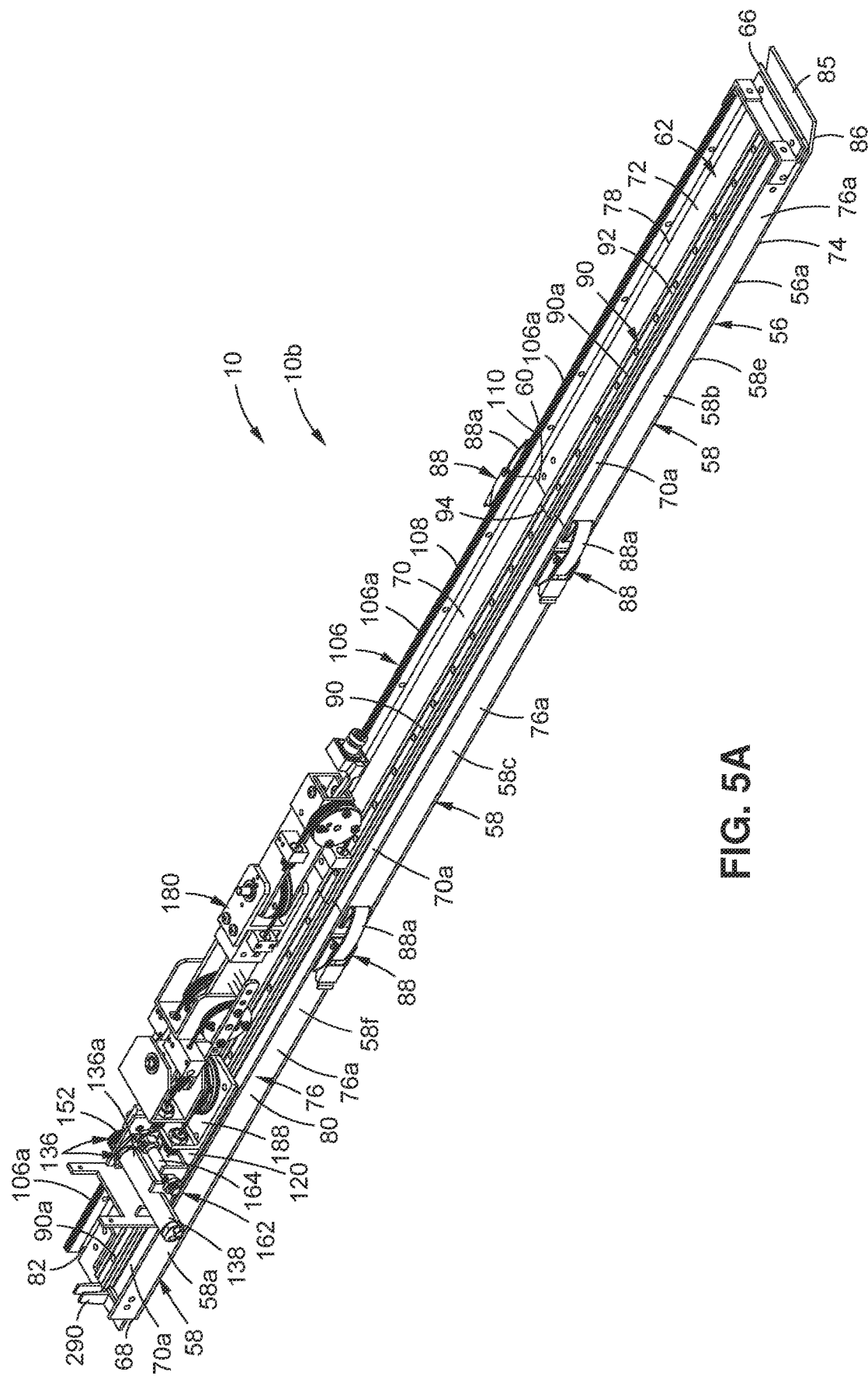
FIG. 5A is an illustration of a left perspective view of another version of a mechanical avatar assembly of the disclosure, with a rail assembly having three rail segments.
Figure 6A:
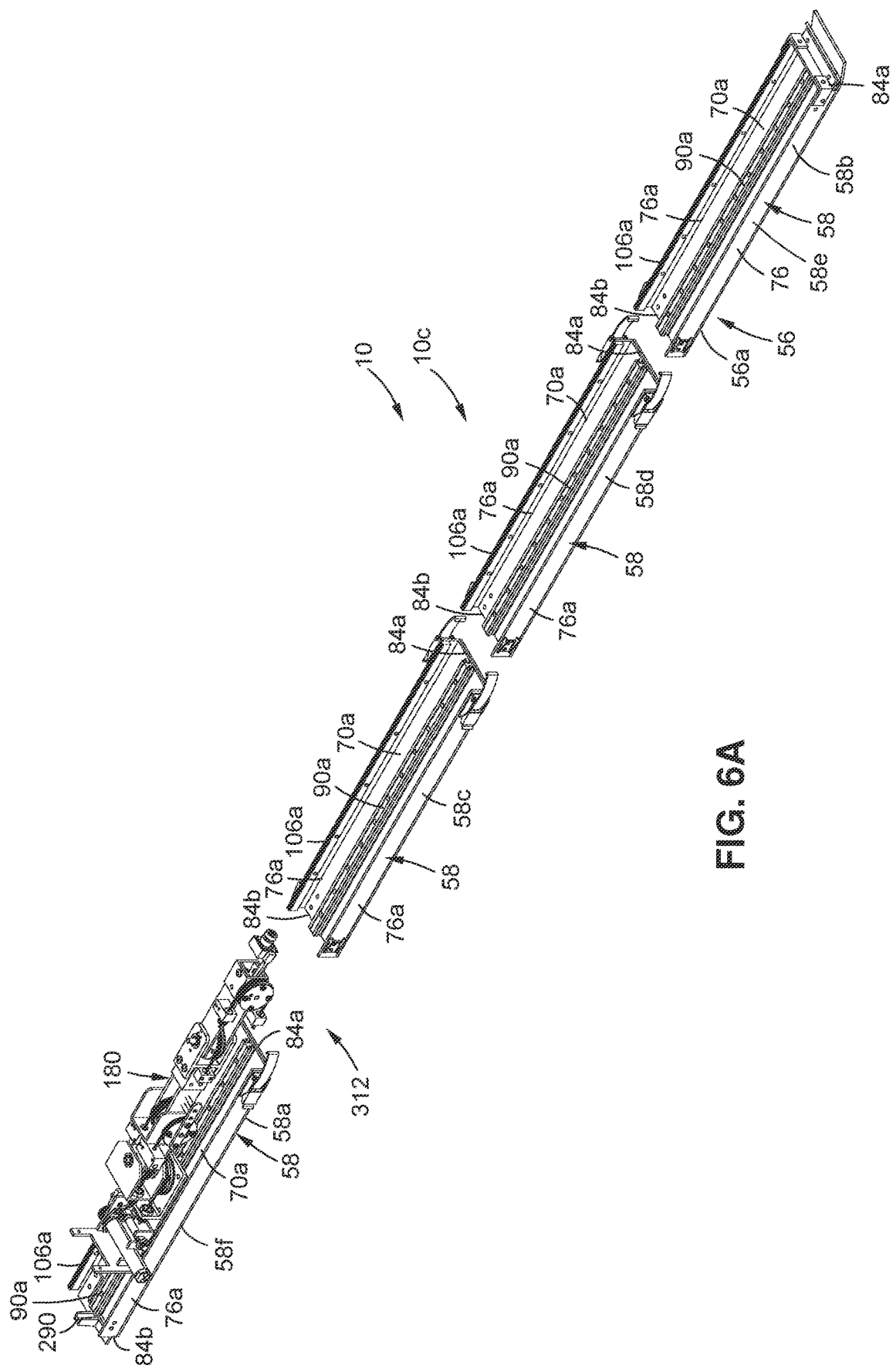
FIG. 6A is an illustration of an exploded left perspective view of yet another version of a mechanical avatar assembly of the disclosure, in a disassembled configuration, with a rail assembly having four rail segments.
Figure 6B:
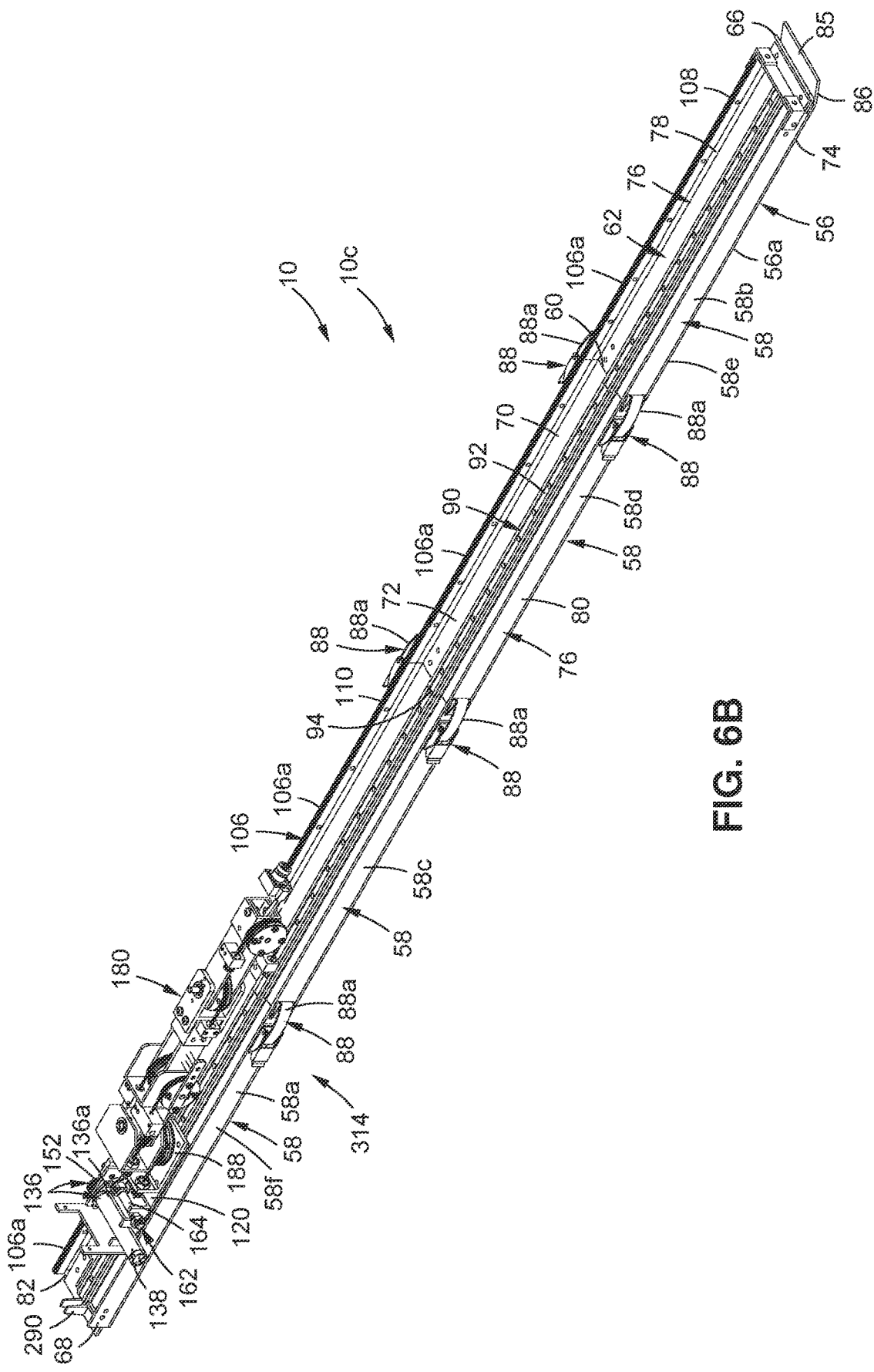
FIG. 6B is an illustration of a left perspective view of the mechanical avatar assembly of FIG. 6A, in an assembled configuration.

The elongated base 62, as shown in FIGS. 4A, 5A, 6B, comprises an elongated base plate 70 having a top side 72 and a bottom side 74, and the elongated base 62 comprises opposing sidewalls 76 in the form of a first sidewall 78 and a second sidewall 80. The elongated base plate 70 and the opposing sidewalls 76 together form a C-channel configuration 82 (see FIGS. 4A, 5A, 6A). As shown in FIGS. 3A, 4A, 5A, 6A, each rail segment 58 comprises a base plate portion 70a of the elongated base plate 70, and each base plate portion 70a has a top side 72a and a bottom side 74a, and each rail segment 58 further comprises opposing sidewall portions 76a in the form of a first sidewall portion 78a and a second sidewall portion 80a. The base plate portion 70a and the opposing sidewall portions 76a of each rail segment 58 form a C-channel configuration 82 (see FIG. 4A). As shown in FIGS. 3A, 4A, 5A, 6A, each rail segment 58 has a first end 84a and a second end 84b.

The front end 66, or the leading end, of the elongated base 62 of the rail assembly 56 preferably has a guide portion 85 (see FIGS. 1A, 4A) having an upward angled configuration 86 (see FIGS. 1A, 4A), or sled-shaped configuration. The rail segment 58 with the guide portion 85 is a forward rail segment 58e (see FIGS. 4A, 5A, 6A, 6B) of the rail assembly 56 of any length or number of rail segments 58. The upward angled configuration 86 of the guide portion 85 is designed to enable and facilitate moving or sliding the rail assembly 56 over raised parts, or portions, of uneven shape in the confined space 14, for example, contours, stiffeners, stringers 322 (see FIG. 9A), and/or ribs 343 (see FIG. 10C), where the structure 16 comprises an aircraft 26. The guide portion 85 may be made of a synthetic plastic material, such as nylon, or another suitable plastic material, or other material, to facilitate sliding or moving of the rail assembly 56 within the confined space 14.

The two or more rail segments 58 of the rail assembly 56 are each coupled together with one or more coupling elements 88 (see FIGS. 1A, 4A). As shown in FIG. 1A, the coupling elements 88 may comprise one or more of, latches 88a, alignment pins 88b, a magnet assembly 88c, clamps 88d, spring-loaded pins 88e, clips 88f, or other suitable coupling elements. For example, as shown in FIG. 4D, discussed in further detail below, the coupling elements 88 comprise latches 88a designed to couple, and attach, the first rail segment 58a to the second rail segment 58b, and comprise alignment pins 88b on a rail portion 90a of the first rail segment 58a. The snap together design of the rail assembly 56, such as the modular rail assembly 56a, allows for flexibility and customizability. The rail assembly 56, such as the modular rail assembly 56a, preferably has a small size and volume and is adaptable for use to confined spaces 14 or work environments of various sizes and volumes. In an exemplary version, a rail segment 58 has a weight of approximately 4 pounds to 10 pounds, a width of approximately 2 inches to 8 inches, a height of approximately 2 inches to 4 inches high, and a length of approximately 15 inches to 24 inches. However, each rail segment 58 may have another suitable weight, width, height, and length. The length 64 of the elongated base 62 is customizable as needed, depending on how many rail segments 58 are interlocked together, based on the size and volume of the confined space 14.

As further shown in FIG. 1A, the rail assembly 56 comprises a rail 90 coupled, or attached, to the top side 72 (see FIG. 4A) of the elongated base plate 70, and extending along the length 64 of the elongated base 62. The rail 90 may be in the form of a center rail 92 (see FIG. 4A). Each rail segment 58, as shown in FIGS. 3A, 4A, 5A, 6A, comprises a rail portion 90a, and when the rail segments 58 are coupled together in the interlocking configuration 60 to form the rail assembly 56, the rail portions 90a form the rail 90 having a continuous rail configuration 94 (see FIGS. 4A, 5A, 6A). The rail portions 90a, and the rail 90 formed by the rail portions 90a, have an elevated top surface 96 (see FIGS. 3A, 4A) having a recessed track portion 98 (see FIGS. 3A, 4A) formed along the length of the rail portions 90a, and the rail 90 formed by the rail portions 90a. The rail portions 90a, and the rail 90 formed by the rail portions 90a, further have a first sidewall 100a and a second sidewall 100b, each depending downwardly on opposite sides of the elevated top surface 96, where the first sidewall 100a has a first sidewall channel 102a that extends along the length of the rail portion 90a, and where the second sidewall 100b has a second sidewall channel 102b that extends along the length of the rail portion 90a. The first sidewall 100a and the second sidewall 100b oppose each other, and the first sidewall channel 102a and the second sidewall channel 102b oppose each other. The rail portions 90a, and the rail 90 formed by the rail portions 90a, have an I-shaped cross-section profile 104 (see FIGS. 3A, 4D). However, the rail portions 90a, and the rail 90 formed by the rail portions 90a, may have another suitable cross-section profile. The bottom of the rail portions 90a, and the rail 90 formed by the rail portions 90a, is generally planar.

As further shown in FIG. 1A, the rail assembly 56 comprises a gear rack 106 coupled, or attached, to the first sidewall 78 of the elongated base 62, and extending along the length 64 (see FIG. 4B) of the elongated base 62. The gear rack 106 may be in the form of a side gear rack 108 (see FIG. 4A). Each rail segment 58, as shown in FIGS. 3A, 4A, 5A, 6A, comprises a gear rack portion 106a, and when the rail segments 58 are coupled together in the interlocking configuration 60 to form the rail assembly 56, the gear rack portions 106a form the gear rack 106 having a continuous gear rack configuration 110 (see FIGS. 4A, 5A, 6A). Each gear rack portion 106a has a plurality of teeth 112 (see FIG. 3A) formed along a top end 114 (see FIG. 3A) of the gear rack portion 106a. An outer side 116a (see FIG. 3A) of the gear rack portion 106a is coupled to the first sidewall portion 78a (see FIG. 3A) with attachment elements 118 (see FIG. 3A), such as screws, bolts, or other suitable attachment elements. An inner side 116b (see FIG. 3A) of the gear rack portion 106a is configured to abut against, and abuts against, a carriage portion 120 (see FIGS. 1A, 3A) coupled to the rail 90, as the carriage portion 120 is driven along the rail 90. The bottom of each gear rack portion 106a is generally planar.

As shown in FIG. 1A, the rail assembly 56 further comprises the carriage portion 120 (see also FIG. 3A), such as in the form of a cradle carriage portion 120a (see FIG. 3A), coupled to the rail 90, and movable relative to the rail 90. As shown in FIG. 3A, the carriage portion 120 comprises a base plate 122 having a first end 124a, or front end, a second end 124b, or rear end, a top side 126a, and a bottom side 126b. The bottom side 126b of the carriage portion 120 is coupled to the rail portion 90a, and is designed to ride or travel along the rail portion 90a. When the rail segments 58 are coupled together in the interlocking configuration 60 to form the rail assembly 56, and the rail portions 90a form the rail 90 having the continuous rail configuration 94, the carriage portion 120 is designed to ride or travel, and rides or travels, along the rail 90. The carriage portion 120 further comprises a base bracket 128 (see FIG. 3A) coupled, or attached, at the second end 124b of the base plate 122. The carriage portion 120 further comprises a cradle portion 130 (see FIG. 3A) coupled, or attached, to the top side 126a of the base plate 122. As further shown in FIG. 3A, the cradle portion 130 has a first cradle 132a, a second cradle 132b, and a cradle portion sidewall 134 that abuts the inner side 116b of the gear rack portion 106a, as the carriage portion 120 rides or travels along the rail 90.

As shown in FIG. 1A, the rail assembly 56 further comprises a drive assembly 136. Preferably, the drive assembly 136 is a non-electronic drive assembly. The drive assembly 136 preferably comprises a pneumatic drive assembly 136a (see FIG. 1A), or another suitable non-electronic drive assembly. The drive assembly 136, such as the pneumatic drive assembly 136a, is coupled to the carriage portion 120 and to the gear rack 106, and is designed to move, and moves, the carriage portion 120 along the rail 90.

Figure 3B:
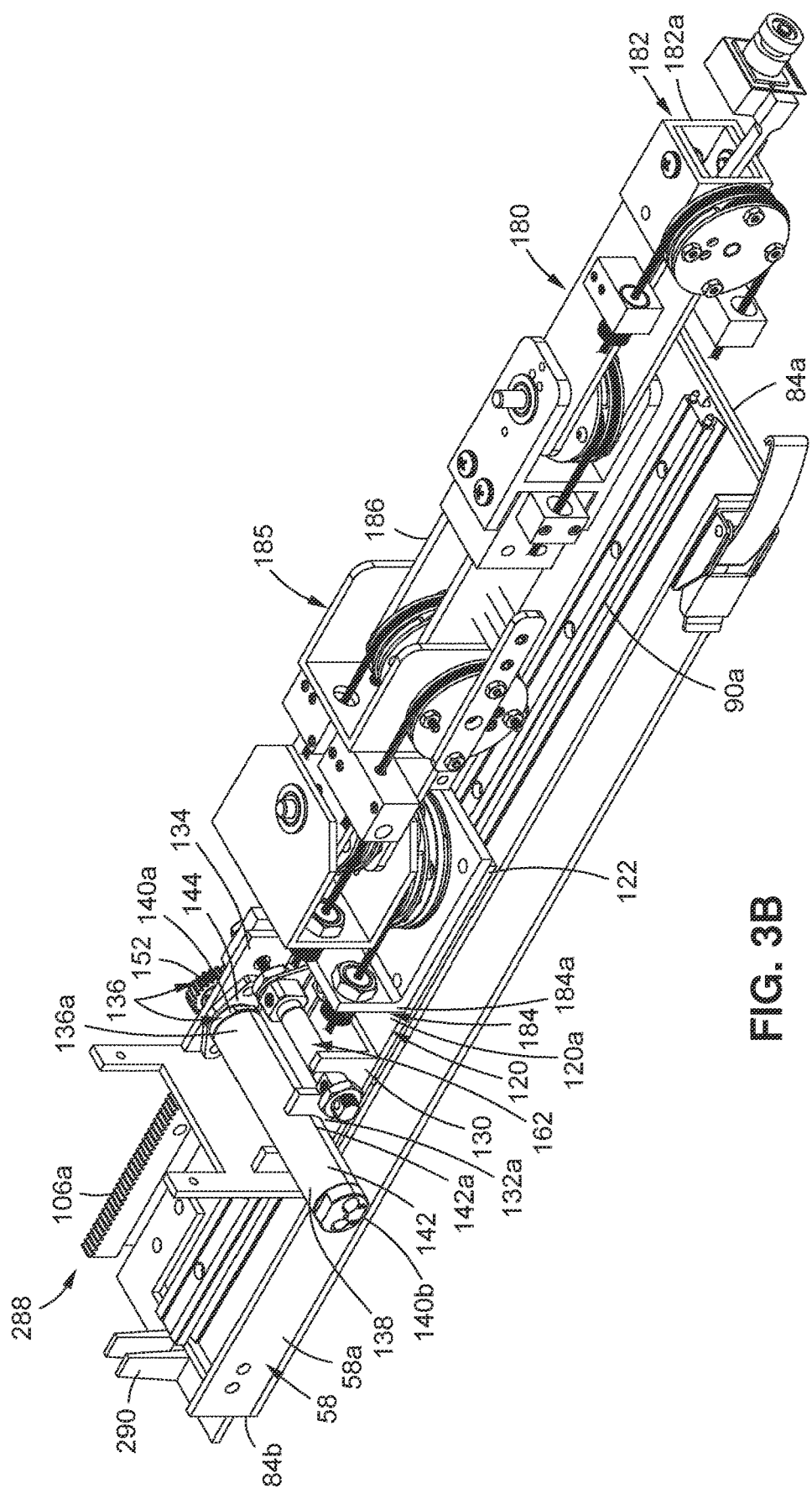
FIG. 3B is an illustration of a left perspective view of the articulating avatar arm and the first rail segment of FIG. 3A, in an assembled configuration.

The drive assembly 136, such as the pneumatic drive assembly 136a, comprises an air motor 138 (see FIGS. 1A, 3B) coupled to the carriage portion 120. In one version, as shown in FIG. 3A, the air motor 138 is coupled to the cradle portion 130 of the carriage portion 120 of the rail assembly 56. As shown in FIG. 3B, the air motor 138 comprises a first end 140a, a second end 140b, and a cylindrical body 142 disposed between the first end 140a and the second end 140b. In one version, the first end 140a of the air motor 138 is coupled to a flange 144 (see FIG. 3B) and inserted through an opening 146 (see FIG. 7B) through the cradle portion sidewall 134. As shown in FIG. 3B, a cylindrical body portion 142a of the air motor 138 is coupled to the first cradle 132a of the cradle portion 130.

The air motor 138 is powered by air 148 (see FIG. 1B), for example, shop air 148a (see FIG. 1B), from an air supply 150 (see FIG. 1B), located outside of the confined space 14. The drive assembly 136, such as the pneumatic drive assembly 136a, further comprises a gear 152 (see FIG. 1A, 3B) coupled to the first end 140a of the air motor 138. The gear 152 is designed to interlock, and interlocks, with the gear rack 106, including with each gear rack portion 106a of the gear rack 106, and the gear 152 is designed to rotate, and rotates, along the gear rack 106, and along the one or more gear rack portions 106a of the gear rack 106. The gear 152 has a plurality of teeth 154 (see FIG. 3B) disposed around the circumference of the gear 152. The gear 152 has a central opening 156 (see FIG. 7B) configured to receive, and receiving, the first end 140a of the air motor 138. A control system 158 (see FIG. 1B), discussed in further detail below, is coupled to, and remotely controls, the mechanical avatar assembly 10 and is located outside of the confined space 14. The control system 158 is designed to control, and controls, a speed 160 (see FIG. 1A) and a direction 161 (see FIG. 1A) of the air motor 138.

As shown in FIG. 1A, the rail assembly 56 may further comprise a brake assembly 162. The brake assembly 162 comprises an air cylinder 164 (see FIG. 1A) coupled to the carriage portion 120. As shown in FIG. 3B, a first end 165a of the air cylinder 164 is inserted through a hole 168 formed through the cradle portion sidewall 134, and a cylindrical body portion 166a of the air cylinder 164 is coupled to the second cradle 132b of the cradle portion 130. The air cylinder 164 is preferably in the form of a single acting, pull-type air cylinder that allows for synchronizing gross motion and braking.

The brake assembly 162 further comprises a brake device 170 (see FIGS. 1A, 3A), such as in the form of a brake block 170a (see FIG. 3A). The brake device 170 is coupled to the first end 165a of the air cylinder 164, and the brake device 170 has a plurality of teeth 172 (see FIG. 3C) along a bottom end 174 (see FIG. 3C) of the brake device 170. The plurality of teeth 172 of the brake device 170 are designed to interlock with the plurality of teeth 112 of the gear rack 106. The brake device 170 is deployed by the air cylinder 164 to stop, or brake, the carriage portion 120 from moving along the rail 90. The brake assembly 162 further comprises a shuttle valve 176 (see FIGS. 1A, 3A) having a bottom end 178 (see FIG. 3A) coupled to the base plate 122 of the carriage portion 120. The shuttle valve 176 is designed to synchronize, and synchronizes, the air cylinder 164 and the air motor 138, regardless of direction. The brake assembly 162 further comprises the gear rack 106 (see FIG. 1A, such as the side gear rack 108 (see FIG. 4A), made up of gear rack portions 106a (see FIG. 4A) that are interlocking from the side. The brake assembly 162 advantageously has a low profile.

As shown in FIG. 1A, the mechanical avatar assembly 10 further comprises an articulating avatar arm 180. The articulating avatar arm 180 is coupled, or attached, to the rail assembly 56, and in particular, is coupled, or attached, to the base plate 122 of the carriage portion 120, on the rail segment 58, such as the first rail segment 58a. The articulating avatar arm 180 is coupled to, and movable via, the carriage portion 120, along the rail 90.

Figure 2:
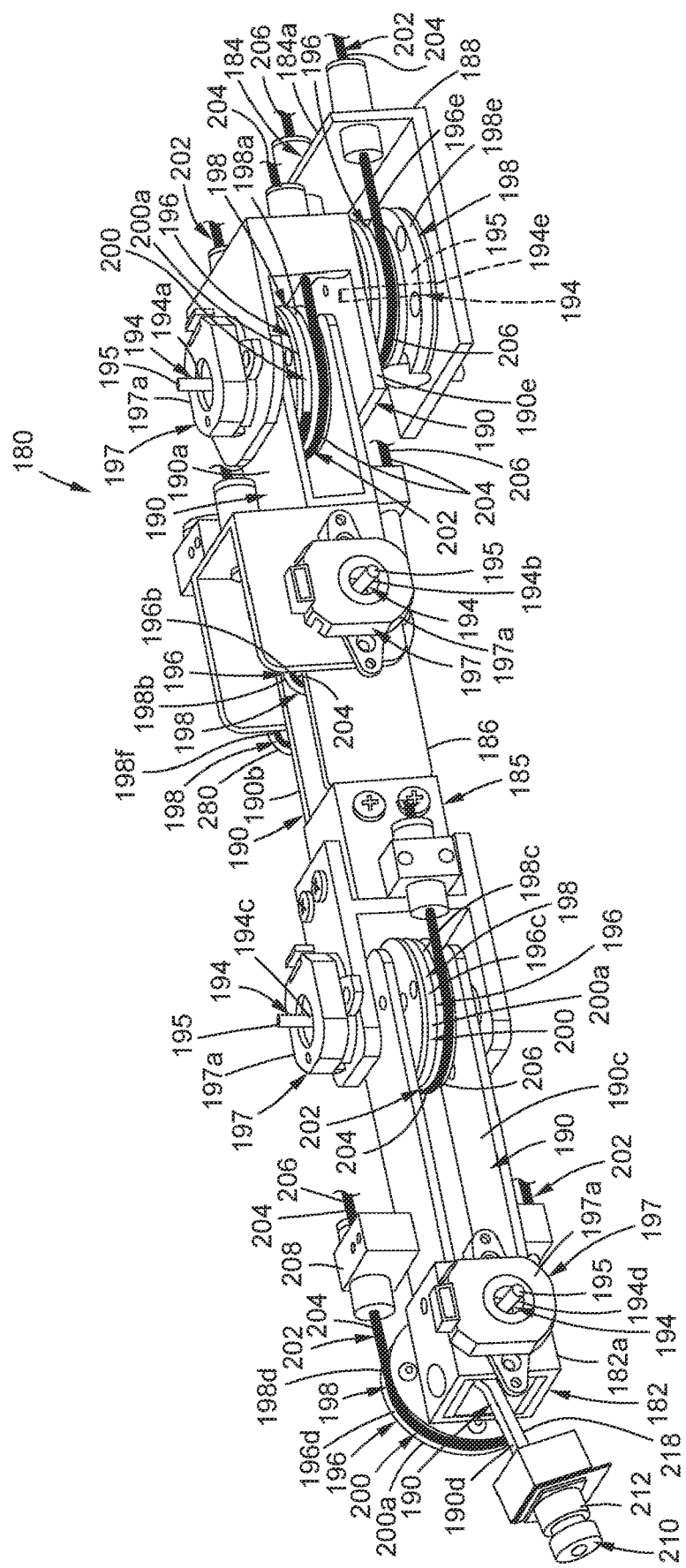
FIG. 2 is an illustration of a right perspective view of an exemplary version of an articulating avatar arm of the mechanical avatar assembly of the disclosure.

Now referring to FIG. 2, FIG. 2 is an illustration of a right perspective view of an exemplary version of the articulating avatar arm 180 of the mechanical avatar assembly 10 of the disclosure. As shown in FIG. 2, the articulating avatar arm 180 comprises a first end 182, such as a forward end 182a, a second end 184, such as an aft end 184a, and a body 185 comprising an arm portion 186 coupled to a base portion 188, with the base portion 188 at the second end 184. As shown in FIG. 2, the body 185 of the articulating avatar arm 180 comprises a plurality of mechanical links 190. The plurality of mechanical links 190 are preferably movable links 192 (see FIG. 1A). As shown in FIG. 2, in one version, the plurality of mechanical links 190 comprise a first mechanical link 190a, a second mechanical link 190b, a third mechanical link 190c, a fourth mechanical link 190d, and a fifth mechanical link 190e. In other versions, the articulating avatar arm 180 may have one mechanical link 190 to four mechanical links 190, or greater than five mechanical links 190. As shown in FIG. 2, the first mechanical link 190a, the second mechanical link 190b, the third mechanical link 190c, and the fourth mechanical link 190d are part of the arm portion 186, and the fifth mechanical link 190e is attached to the base portion 188 and is controlled by a gross angular motion control device 268 (see FIG. 1B), discussed in further detail below. The plurality of mechanical links 190 are preferably made of a high strength metal material or metal alloy, such as aluminum, steel, aluminum alloy, steel alloy, or another suitable high strength metal material or metal alloy. The high strength metal material used for the plurality of mechanical links 190 is preferably chosen based on weight and rigidity requirements.

As shown in FIG. 2, the articulating avatar arm 180 further comprises a plurality of joints 194 coupling the plurality of mechanical links 190 together. As shown in FIG. 2, in one version, the plurality of joints 194 comprise a first joint 194a, a second joint 194b, a third joint 194c, a fourth joint 194d, and a fifth joint 194e. In other versions, the articulating avatar arm 180 may have one joint 194 to four joints 194, or greater than five joints 194. As shown in FIG. 2, the first joint 194a, the second joint 194b, the third joint 194c, and the fourth joint 194d are part of the arm portion 186, and the fifth joint 194e is part of the base portion 188. The plurality of joints 194 may be in the form of up-down movement joints, left-right movement joints, or another suitable type of joint. Each of the plurality of joints 194 preferably has a rotating shaft 195 (see FIG. 2), or pin, coupled to an actuator assembly 196. Each of the plurality of joints 194 use the rotating shaft 195, or pin, that defines a joint axis 500 (see FIG. 1A), about which the joint 194 rotates, or undergoes a rotation 502 (see FIG. 1A), which enables a left-right movement joint 504 (see FIG. 1A) or an up-down movement joint 506 (see FIG. 1A). Preferably, the joints 194 are open joints for routing one or more connector elements 202 (see FIG. 1B), such as cables 204 (see FIG. 1B), for example, Bowden cables 206 (see FIG. 1B).

As shown in FIG. 2, the articulating avatar arm 180 further comprises a plurality of actuator assemblies 196. Preferably, one actuator assembly 196 is coupled at each joint 194, to actuate a mechanical link 190, via the rotating shaft 195. In one version, as shown in FIG. 2, the actuator assemblies 196 comprise a first actuator assembly 196a, a second actuator assembly 196b, a third actuator assembly 196c, a fourth actuator assembly 196d, and a fifth actuator assembly 196e. In other versions, the articulating avatar arm 180 may have one actuator assembly 196 to four actuator assemblies 196, or greater than five actuator assemblies 196. As shown in FIG. 2, the first actuator assembly 196a, the second actuator assembly 196b, the third actuator assembly 196c, and the fourth actuator assembly 196d are part of the arm portion 186, and the fifth actuator assembly 196e is part of the base portion 188.

As shown in FIG. 2, the articulating avatar arm 180 may further optionally comprise one or more sensor devices 197, such as a rotary encoder device 197a, coupled, or attached, to one or more joints 194, if the sensor device 197 is used in a structure 16 where sparking is not an issue, or the sensor device 197 is housed in a device that makes it safe against potential sparking. As shown in FIG. 2, the articulating avatar arm 180 may comprise the sensor device 197, such as the rotary encoder device 197a, coupled, or attached, at the first joint 194a, at the second joint 194b, at the third joint 194c, and at the fourth joint 194d. The sensor device 197, such as the rotary encoder device 197a, is a type of position sensor used for determining the angular position of the rotating shaft 195. The rotary encoder device 197a is an electro-mechanical device that converts the angular position or motion of the rotating shaft 195 to analog or digital output signals.

As shown in FIG. 1A, the plurality of actuator assemblies 196 may be in the form of a plurality of pulley and cable assemblies 198, a plurality of water-driven hydraulic piston assemblies 199, or another suitable actuator assembly. One or more pulley and cable assemblies 198, one or more water-driven hydraulic piston assemblies 199, or another suitable actuator assembly, is/are coupled at each joint 194, to actuate one or more of the mechanical links 190.

As shown in FIGS. 2, 3A, in one version, the plurality of actuator assemblies 196 comprise a plurality of pulley and cable assemblies 198 comprising a first pulley and cable assembly 198a, a second pulley and cable assembly 198b, a third pulley and cable assembly 198c, a fourth pulley and cable assembly 198d, and a fifth pulley and cable assembly 198e, preferably, all in the form of a sandwich pulley and cable assembly 416 (see FIG. 3A). As shown in FIG. 2, the first pulley and cable assembly 198a, the second pulley and cable assembly 198b, the third pulley and cable assembly 198c, and the fourth pulley and cable assembly 198d are part of the arm portion 186, and the fifth pulley and cable assembly 198e is part of the base portion 188. As shown in FIG. 3A, each sandwich pulley and cable assembly 416 comprises a pulley 200, such as in the form of a sandwich pulley 200a. The sandwich pulley 200a structure is discussed in further detail below with respect to FIGS. 15A-15B. In other versions, the articulating avatar arm 180 may have one sandwich pulley and cable assembly 416 to four sandwich pulley and cable assembly 416, or greater than five sandwich pulley and cable assembly 416.

As shown in FIGS. 2, 3A, the pulley and cable assembly 198 further comprises a pulley and cable assembly 198, such as a sixth pulley and cable assembly 198f, such as in the form of a counterbalance pulley and cable assembly 280. The counterbalance pulley and cable assembly 280, along with a weight 282 (see FIGS. 11C, 13), counterbalance an articulating avatar arm weight 284 (see FIG. 1B) of the articulating avatar arm 180. As shown in FIG. 3A, the counterbalance pulley and cable assembly 280 comprises a pulley 200 coupled to a cable 204.

As shown in FIG. 2, each pulley and cable assembly 198 further comprises one or more connector elements 202, such as in the form of cables 204, for example, Bowden cables 206, coupled, or attached, to the pulley 200. Each sandwich pulley 200a, as shown in FIG. 2, preferably has two cables 204 coupled, or attached, to each sandwich pulley 200a. In one version, as shown in FIG. 2, the cables 204 comprise one or more Bowden cables 206. The Bowden cable 206 structure is discussed in further detail below with respect to FIG. 15C. The cables 204, such as in the form of Bowden cables 206, may be secured and managed with a cable holder apparatus 208 (see FIG. 2). The cable holder apparatus 208 structures are discussed in further detail below with respect to FIGS. 16A-16E. For the water-driven hydraulic piston assemblies 199, the one or more connector elements 202 comprise tubes 207 (see FIG. 1B), flexible pipes, or another suitable flow containing element.

As shown in FIGS. 1A, 2, the mechanical avatar assembly 10 further comprises an image capturing device 210 coupled, or attached, to the articulating avatar arm 180, and preferably, coupled, or attached, at the first end 182 of the articulating avatar arm 180. As shown in FIGS. 1A, 2, the image capturing device 210 preferably comprises a camera 212. The camera 212 may comprise a wireless camera, a digital camera, a wireless digital camera, a smartphone camera, a camcorder, or another suitable camera. The image capturing device 210 may also comprise image sensors, or other suitable image capturing devices. The image capturing device 210, such as the camera 212, is designed to take and record images 214 (see FIG. 1A), such as still images or moving images, of the interior 20 of the confined space 14. The image capturing device 210, such as the camera 212, is further designed to provide output images 216 (see FIG. 1A), such as still output images or moving output images, to a location remotely located outside of the confined space 14. The image capturing device 210 may include one or more of, an image sensor, a processor, one or more microphones, a wide-angle lens, a zoom lens, a recorder, or other suitable components or features.

The image capturing device 210 is preferably compact in size and easily attached and detached to and from the articulating avatar arm 180. As shown in FIG. 2, the image capturing device 210, such as the camera 212, is movable up and down with a camera arm 218 attached to the articulating avatar arm 180. For confined spaces 14, such as tanks 42 (see FIG. 1B), for example, fuel tanks, the image capturing device 210, such as the camera 212, may be specially packaged, or placed into an enclosure that is non-electronic, to prevent the image capturing device 210, such as the camera 212, from creating a spark or from acting as an ignition source in the confined space 14.

As shown in FIG. 1A, the mechanical avatar assembly 10 may further comprise an end effector tool assembly 220 coupled, or attached, to the articulating avatar arm 180, and preferably, coupled, or attached, at the first end 182 of the articulating avatar arm 180. The image capturing device 210, such as the camera 212, may be used for a confined space operation 18, such as inspection 18a, and may also be used together with the end effector tool assembly 220, which may be used to perform other confined space operations 18, such as sealing 18b, painting 18c, primer application 18d, fastening 18e, cleaning 18f, installing 18g, or another suitable confined space operation.

As shown in FIG. 1A, the end effector tool assembly 220 (see also FIG. 10B) comprises an end effector 222 (see also FIG. 10B) and a tool 224 (see also FIG. 10B) coupled, or attached, to the end effector 222. The tool 224 may be changed or modified depending on the type of confined space operations 18 performed, or to be performed. As shown in FIG. 1A, the tool 224 may comprise a sealant tool 224a, such as a sealant gun 224b, a paint tool 224c, a primer tool 224d, a fastener tool 224e, a cleaning tool 224f, an installation tool 224g, or another suitable tool, that is configured to perform, and performs, one or more confined space operations 18 in the confined space 14. Preferably, the end effector tool assembly 220 has a weight of between 0.04 ounce to twenty pounds. The sealant tool 224a, such as the sealant gun 224b, is discussed in further detail below with respect to FIGS. 10A-10C.

As shown in FIG. 1B, the mechanical avatar system 12 comprises the mechanical avatar assembly 10. As further shown in FIG. 1B, the mechanical avatar system 12 further comprises an attachment assembly 226. The attachment assembly 226 is designed to attach, and attaches, at least one portion 56b (see FIG. 8A) of the rail assembly 56 (see FIGS. 1A, 8A) of the mechanical avatar assembly 10 to an edge 228 (see FIG. 8A, 9E) of an access opening 230 (see FIGS. 1B, 8A) that opens into the confined space 14 (see FIG. 1B) of a structure 16 (see FIG. 1B), such as a vehicle 24 (see FIG. 1B), or an architectural structure 40 (see FIG. 1B). As shown in FIG. 1B, the attachment assembly 226 comprises a connector device 232 and a coupling mechanism 234. The connector device 232 is connected to the at least one portion 56b of the rail assembly 56, and the coupling mechanism 234 couples the connector device 232 relative to the edge 228 of the access opening 230. The coupling mechanism 234 may comprise spring pins, latches, clips, or another suitable connector device. The coupling mechanism 234 may comprise a clamp assembly 235 (see FIG. 8A) with clamps 236 (see FIG. 8A), such as in the form of dual-sided clamps 236a (see FIG. 8A). Preferably, the clamps 236 are quick release detachable clamps. The attachment assembly 226 is discussed in further detail below with respect to FIGS. 8A-8B.

As shown in FIG. 1B, the mechanical avatar system 12 further comprises an operator workstation 238 coupled to the mechanical avatar assembly 10. The operator workstation 238 is positioned outside the confined space 14, at a predetermined distance 240 (see FIGS. 1B, 11A) from the mechanical avatar assembly 10, which is attached to the access opening 230 to the confined space 14 in the structure 16. As shown in FIG. 1B, the operator workstation 238 comprises a portable structure 242 (see also FIG. 11A), such as a portable cart 242a (see also FIG. 11A), or another suitable portable structure. The portable structure 242, such as the portable cart 242a, of the operator workstation 238 includes the control system 158 (see FIG. 1B). The control system 158 comprises a plurality of control devices 244 (see FIG. 1B) coupled to the portable structure 242, such as the portable cart 242a. As shown in FIG. 1B, the operator workstation 238 further comprises a monitor 245 (see also FIG. 11A) coupled to the portable structure 242, such as the portable cart 242a, to display one or more output images 216 (see FIG. 1A) from the image capturing device 210. The monitor 245 may be in the form of a computer screen 246 (see FIGS. 11A-11C), or another suitable display device. The monitor 245 may be coupled, or connected, to the portable structure 242, such as the portable cart 242a, via a monitor arm 247 (see FIG. 11A). The operator workstation 238 is operated and controlled by an operator 248 (see FIGS. 1B, 11A). The operator 248 is preferably a human operator 248a (see FIGS. 1B, 11A). However, the operator 248 may also be in the form of a robot operator 248b (see FIG. 1B), or another suitable automated operator.

As shown in FIG. 1B, one of the plurality of control devices 244 of the control system 158 comprises an input control arm 250. In one version of the mechanical avatar system 12, the input control arm 250 is mechanically coupled to the articulating avatar arm 180, with a plurality of connector elements 202 (see FIG. 1B), such as in the form of cables 204 (see FIG. 1B), for example, Bowden cables 206 (see FIG. 1B), to remotely and directly control the articulating avatar arm 180. The articulating avatar arm 180 is designed to mimic, and mimics, one or more motions 252 (see FIG. 1B) of the input control arm 250 operated by the operator 248 (see FIG. 1B). In other versions, the articulating avatar arm 180 may be controlled in another suitable manner, such as with linear actuators, servomotor controlled devices, a joystick, or another suitable control device for controlling the articulating avatar arm 180 remotely and outside of the confined space 14. The articulating avatar arm 180 is remotely controlled with the control system 158 (see FIG. 1B) located outside of the confined space 14 of the structure 16. The control system 158, such as the input control arm 250, directly and remotely controls one or more motions 254 (see FIG. 1B) of the articulating avatar arm 180.

As shown in FIG. 1B, the input control arm 250 comprises a plurality of input control arm (ICA) mechanical links 255. Preferably, the plurality of input control arm mechanical links 255 are equal in number to the plurality of mechanical links 190 of the articulating avatar arm 180. As shown in FIG. 1B, the input control arm 250 further comprises a plurality of input control arm joints 256 coupling the plurality of input control arm mechanical links 255 together. Preferably, the plurality of input control arm joints 256 are equal in number to the plurality of joints 194 of the articulating avatar arm 180. Each input control arm joint 256 has a rotating shaft 258 (see FIG. 12A). As shown in FIG. 1B, the input control arm 250 further comprises a plurality of input control arm actuator assemblies 260. One or more input control arm actuator assemblies 260 is/are coupled at each input control arm joint 256 of the plurality of input control arm joints 256. The operator 248 operates the input control arm 250 to remotely and directly control the articulating avatar arm 180, by mechanically actuating one or more input control arm actuator assemblies 260 coupled to, and corresponding to, the one or more actuator assemblies 196 of the articulating avatar arm 180, to cause the articulating avatar arm 180 to mimic one or more motions 252 (see FIG. 1B) of the input control arm 250, and to orient the articulating avatar arm 180 to a desired orientation 262 (see FIG. 1B). The input control arm 250 is mechanically coupled to the articulating avatar arm 180 with a plurality of connector elements 202 that each translate a rotation 508 (see FIG. 1B) of one of the plurality of input control arm joints 256 on the input control arm 250, about a joint axis 510 (see FIG. 1B), to a linear displacement 512 (see FIG. 1B) of a corresponding cable 204 that causes a corresponding rotation 502 of a corresponding joint 194 on the articulating avatar arm 180, to remotely and directly control the articulating avatar arm 180. For example, articulation of the input control arm 250 may effect a rotation 508 of a left-right movement joint 514 (see FIG. 1B) on the input control arm 250, which rotation 508 may be translated to a linear displacement 512 of one of the plurality of cables 204 that causes rotation 502 of a corresponding left-right movement joint 504 (see FIG. 1A) on the articulating avatar arm 180, to cause the articulating avatar arm 180 to mimic one or more motions 252 of the input control arm 250. In addition, articulation of the input control arm 250 may effect a rotation 508 of an up-down movement joint 516 (see FIG. 1B) on the input control arm 250, which rotation 508 may be translated to a linear displacement 512 of one of the plurality of cables 204 that causes rotation 502 of a corresponding up-down movement joint 506 (see FIG. 1A) on the articulating avatar arm 180, to cause the articulating avatar arm 180 to mimic one or more motions 252 of the input control arm 250. The input control arm 250 is discussed in further detail below with respect to FIGS. 12A-12C.

As shown in FIG. 1B, the plurality of control devices 244 of the control system 158 further comprise pneumatic drive assembly control devices 264 for controlling the drive assembly 136, such as the pneumatic drive assembly 136a, of the mechanical avatar assembly 10. In one version, as shown in FIG. 1B, the pneumatic drive assembly control devices 264 comprise a pedal valve 265 (see also FIG. 11A) and a control valve 266 (see also FIG. 11A). The pedal valve 265 and the control valve 266 are located remotely from the mechanical avatar assembly 10 and outside of the confined space 14. The speed 160 (see FIG. 1A) of the air motor 138 (see FIG. 1A) is controlled by the pedal valve 265. The direction 161 (see FIG. 1A) of the air motor 138 is controlled by the control valve 266. The control valve 266 is preferably a three-state control valve (forward/backward/stop), in that the control valve 266 controls movement in a forward direction and a backward direction, and also stops movement. The pneumatic drive assembly control devices 264 are operated by the operator 248, to remotely control the pneumatic drive assembly 136a, to drive the carriage portion 120 along the rail 90, to move the articulating avatar arm 180 to a desired position 267 (see FIG. 1B) along the rail 90.

Figure 14A:
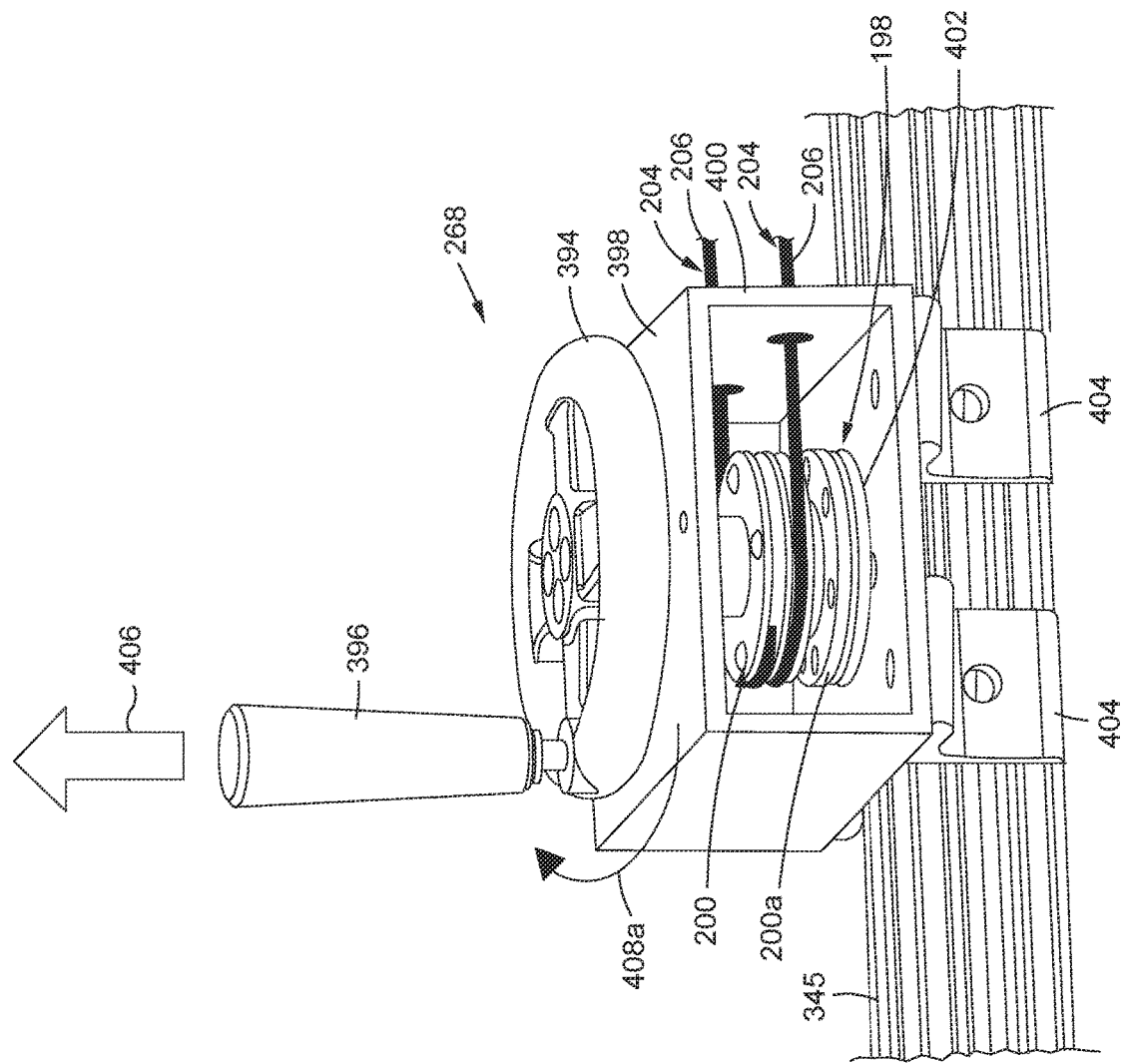
FIG. 14A is an illustration of a right perspective view of a gross angular motion control device used in a version of a mechanical avatar system of the disclosure.

As shown in FIG. 1B, another one of the plurality of control devices 244 of the control system 158 further comprises a gross angular motion control device 268 (see FIGS. 1B, 14A). The gross angular motion control device 268 is located remotely from the mechanical avatar assembly 10 and outside of the confined space 14. The gross angular motion control device 268 is coupled to the base portion 188 of the articulating avatar arm 180, and enables 300 (three hundred) degrees of motion 254 of the articulating avatar arm 180 with a range of 0 (zero) degrees to 90 (ninety) degrees of operator movement 270 (see FIG. 1B) by the operator 248. The gross angular motion control device 268 is discussed in further detail below with respect to FIGS. 14A-14C.

In a version where the input control arm 250 is mechanically coupled to the articulating avatar arm 180, with a plurality of connector elements 202 comprising a plurality of cables 204, such as a plurality of Bowden cables 206, another one of the plurality of control devices 244 may include a cable tension control device 272 (see FIG. 1B). The cable tension control device 272 is preferably in the form of a tensioner assembly 274 (see FIGS. 1B, 11C), and is designed to control a tension 276 (see FIG. 1B) of one or more of the plurality of cables 204, such as the plurality of Bowden cables 206. The cable tension control device 272 is discussed in further detail below with respect to FIG. 11C.

As shown in FIG. 1B, the operator workstation 238 may further comprise one or more counterbalance devices 278 coupled to the portable structure 242, such as the portable cart 242a. Each of the one or more counterbalance devices 278 comprises a pulley and cable assembly 198 (see FIGS. 11C, 13), such as a counterbalance pulley and cable assembly 280 (see FIGS. 11A, 13), coupled to a weight 282 (see FIGS. 11C, 13), to counterbalance one of, an articulating avatar arm weight 284 (see FIG. 1B) of the articulating avatar arm 180, and an input control arm weight 285 (see FIG. 1B) of the input control arm 250. The counterbalance devices 278 are discussed in further detail below with respect to FIG. 11C.

Figure 3C:
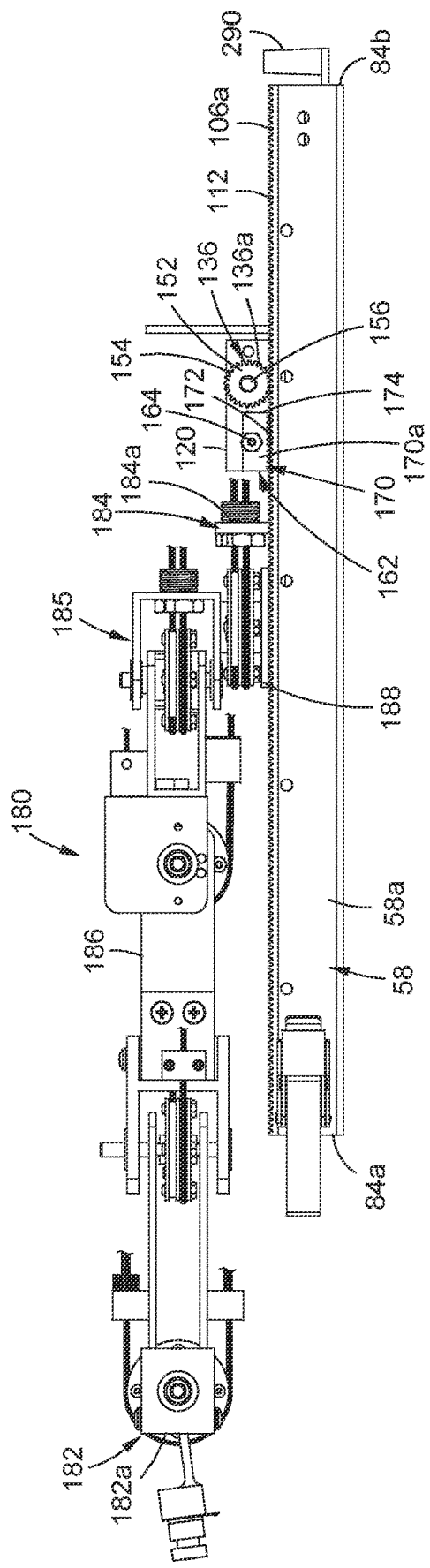
FIG. 3C is an illustration of a right side view of the articulating avatar arm and the first rail segment of FIG. 3B.

Now referring to FIGS. 3A-3C, FIG. 3A is an illustration of an exploded left perspective view of the articulating avatar arm 180 of FIG. 2, and a rail segment 58 comprising a first rail segment 58a, of the rail assembly 56 (see FIG. 1A) of the mechanical avatar assembly 10 of the disclosure. The articulating avatar arm 180 and the rail segment 58, such as the first rail segment 58a, are in a disassembled configuration 286 (see FIG. 3A). FIG. 3B is an illustration of a left perspective view of the articulating avatar arm 180 and the rail segment 58, such as the first rail segment 58a, of FIG. 3A, in an assembled configuration 288. FIG. 3C is an illustration of a right side view of the articulating avatar arm 180 and the rail segment 58, such as the first rail segment 58a, of FIG. 3B.

As shown in FIGS. 3A-3C, the rail segment 58, such as the first rail segment 58a, has the first end 84a and the second end 84b. FIGS. 3A-3C show the first end 182, such as the forward end 182a, of the articulating avatar arm 180, above, and forward to, the first end 84a of the first rail segment 58a, and shows the second end 184, such as the aft end 184a, of the articulating avatar arm 180, above, or attached to, the base plate 122 of the carriage portion 120. As shown in FIGS. 3A-3C, the base portion 188 of the articulating avatar arm 180 is configured for attachment, and is attached to, to the base plate 122 of the carriage portion 120, and the arm portion 186 of the body 185 of the articulating avatar arm 180 is configured to rotate about the base portion 188.

As further shown in FIG. 3A, the rail segment 58, such as the first rail segment 58a, comprises the base plate portion 70a, of the elongated base plate 70 (see FIG. 1A), having the top side 72a and the bottom side 74a. As further shown in FIG. 3A, the rail segment 58, such as the first rail segment 58a, further comprises opposing sidewall portions 76a in the form of the first sidewall portion 78*a* and the second sidewall portion 80*a*. The base plate portion 70*a* and the opposing sidewall portions 76*a* of the rail segment 58, such as the first rail segment 58*a*, together form the C-channel configuration 82 (see FIG. 3A). As further shown in FIG. 3A, the first end 84*a* of the rail segment 58, such as the first rail segment 58*a*, has coupling elements 88, in the form of latches 88*a* attached to each opposing sidewall portions 76*a* of the first rail segment 58*a*. As further shown in FIG. 3A, the rail portion 90*a* has alignment pins 88*b* at a first end 91*a* of the rail portion 90*a*.

As further shown in FIG. 3A, the rail segment 58, such as the first rail segment 58*a*, comprises the rail portion 90*a*, used to form the rail 90 (see FIG. 1A). As further shown in FIG. 3A, the rail portion 90*a* has the elevated top surface 96 having the recessed track portion 98 formed along the length of the rail portion 90*a*, and has the first sidewall 100*a* and the second sidewall 100*b*, each depending downwardly on opposite sides of the elevated top surface 96, where the first sidewall 100*a* has the first sidewall channel 102*a* that extends along the length of the rail portion 90*a*, and where the second sidewall 100*b* has the second sidewall channel 102*b* that extends along the length of the rail portion 90*a*. The first sidewall 100*a* and the second sidewall 100*b* oppose each other, and the first sidewall channel 102*a* and the second sidewall channel 102*b* oppose each other. The rail portion 90*a* has the I-shaped cross-section profile 104 (see FIG. 3A).

As further shown in FIG. 3A, the rail segment 58, such as the first rail segment 58*a*, comprises the gear rack portion 106*a*, used to form the gear rack 106 (see FIG. 1A). The gear rack portion 106*a* has the plurality of teeth 112 (see FIG. 3A) formed along the top end 114 (see FIG. 3A) of the gear rack portion 106*a*. As shown in FIG. 3A, the outer side 116*a* of the gear rack portion 106*a* is coupled to the first sidewall portion 78*a* with attachment elements 118, such as screws, bolts, or other suitable attachment elements, and the inner side 116*b* of the gear rack portion 106*a* is configured to abut against, and abuts against, the carriage portion 120 coupled to the rail portion 90*a*. The bottom of the gear rack portion 106*a* is generally planar.

As shown in FIGS. 3A, 3B, the rail segment 58, such as the first rail segment 58*a*, includes the carriage portion 120, such as in the form of the cradle carriage portion 120*a*, coupled to the rail portion 90*a*, and movable relative to the rail portion 90*a*. As shown in FIG. 3A, the carriage portion 120 comprises the base plate 122 having the first end 124*a*, or front end, the second end 124*b*, or rear end, the top side 126*a*, and the bottom side 126*b*. The bottom side 126*b* of the carriage portion 120 is coupled to the rail portion 90*a*, and is designed to ride or travel along the rail portion 90*a*. As shown in FIG. 3A, the carriage portion 120 further comprises the base bracket 128 coupled, or attached, at the second end 124*b* of the base plate 122, and further comprises the cradle portion 130 coupled, or attached, to the top side 126*a* of the base plate 122. FIG. 3A shows the first cradle 132*a*, the second cradle 132*b*, and the cradle portion sidewall 134.

FIGS. 3A-3B shows the drive assembly 136, such as the pneumatic drive assembly 136*a*. As shown in FIG. 3B, the drive assembly 136, such as the pneumatic drive assembly 136*a*, is coupled to the carriage portion 120 and to the gear rack portion 106*a*, and designed to move, and moves, the carriage portion 120 along the rail portion 90*a*. The drive assembly 136, such as the pneumatic drive assembly 136*a*, comprises the air motor 138 (see FIG. 3B) coupled to the cradle portion 130 of the carriage portion 120. As shown in FIG. 3B, the air motor 138 comprises the first end 140*a* coupled to the flange 144 and inserted through the opening 146 (see FIG. 7B) through the cradle portion sidewall 134, the second end 140*b*, and the cylindrical body 142. As shown in FIG. 3B, the cylindrical body portion 142*a* of the air motor 138 is coupled to the first cradle 132*a* of the cradle portion 130. FIGS. 3B, 3C further shows the gear 152 of the drive assembly 136, such as the pneumatic drive assembly 136*a*. The gear 152 is coupled to the first end 140*a* (see FIG. 3B) of the air motor 138. As shown in FIG. 3C, the gear 152 is designed to interlock, and interlocks, with the gear rack portion 106*a*, and the gear 152 is designed to rotate, and rotates, along the gear rack portion 106*a*. The gear 152 has the plurality of teeth 154 (see FIG. 3C) disposed around the circumference of the gear 152. The gear 152 has the central opening 156 (see FIG. 3C) configured to receive, and receiving, the first end 140*a* (see FIG. 3B) of the air motor 138.

FIGS. 3A-3C shows the brake assembly 162. As shown in FIG. 3A, the brake assembly 162 comprises the air cylinder 164 coupled to the second cradle 132*b* of the carriage portion 120. As shown in FIG. 3A, the air cylinder 164 comprises the first end 165*a*, the second end 165*b*, and the cylindrical body 166 disposed between the first end 165*a* and the second end 165*b*. As shown in FIG. 3A, the first end 165*a* of the air cylinder 164 is inserted through the hole 168 formed through the cradle portion sidewall 134, and the cylindrical body portion 166*a* of the air cylinder 164 is coupled to the second cradle 132*b* of the cradle portion 130. FIGS. 3A, 3C shows the brake device 170, such as in the form of a brake block 170*a*, of the brake assembly 162. The brake device 170 is coupled to the first end 165*a* of the air cylinder 164, and the brake device 170 has a plurality of teeth 172 (see FIG. 3C) along a bottom end 174 (see FIG. 3C) of the brake device 170. The plurality of teeth 172 of the brake device 170 are designed to interlock with the plurality of teeth 112 of the gear rack portion 106*a*. When the brake device 170 is deployed by the air cylinder 164, the brake device 170 stops, or brakes, the carriage portion 120 from moving along the rail portion 90*a*. The brake assembly 162 further comprises a shuttle valve 176 (see FIG. 3A) having a bottom end 178 (see FIG. 3A) coupled to the base plate 122 of the carriage portion 120. The shuttle valve 176 is designed to synchronize, and synchronizes, the air cylinder 164 and the air motor 138.

FIGS. 3A-3C further show a cable carrier rail mount 290. The cable carrier rail mount 290 is mounted on, and attached to, the second end 84*b* of the rail segment 58, such as the first rail segment 58*a*. The cable carrier rail mount 290 is designed to hold or carry one or more cables 204 (see FIG. 1B), such as Bowden cables 206, or other cables, tubes 207 (see FIG. 1B), wires, or the like, attached to the articulating avatar arm 180.

Figure 4B:
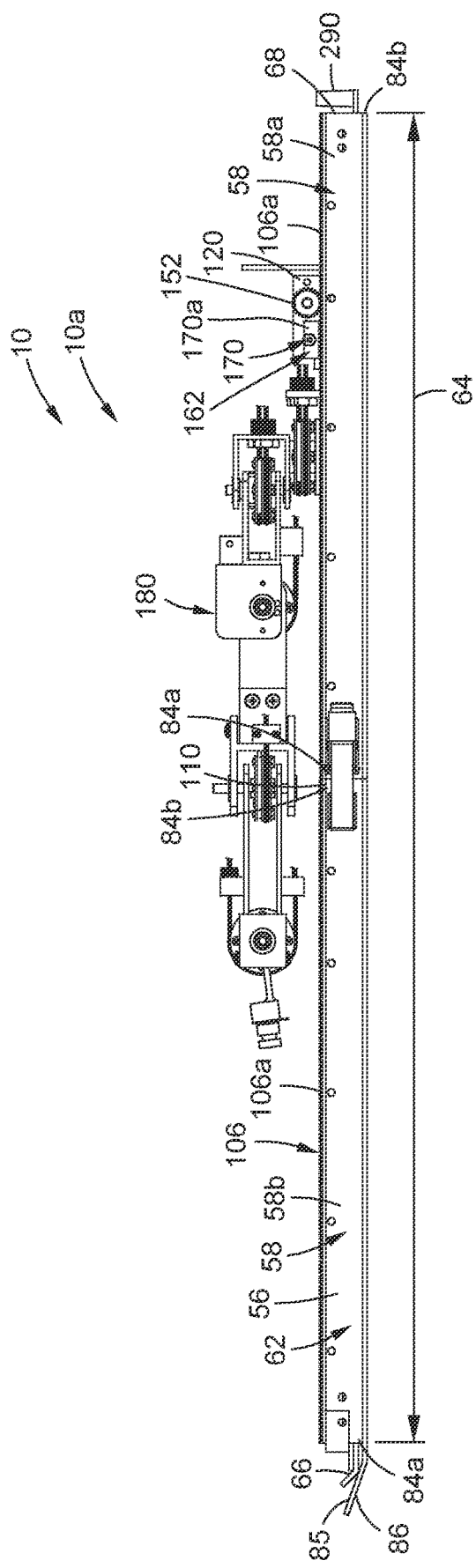
FIG. 4B is an illustration of a right side view of the mechanical avatar assembly of FIG. 4A.
Figure 4C:
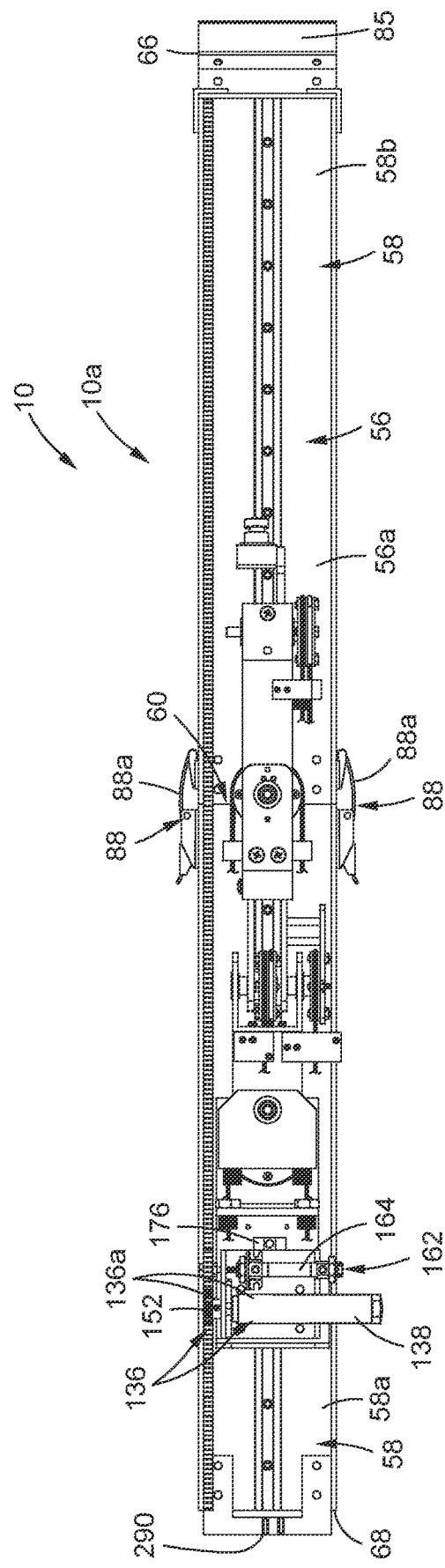
FIG. 4C is an illustration of a top view of the mechanical avatar assembly of FIG. 4A.
Figure 4D:
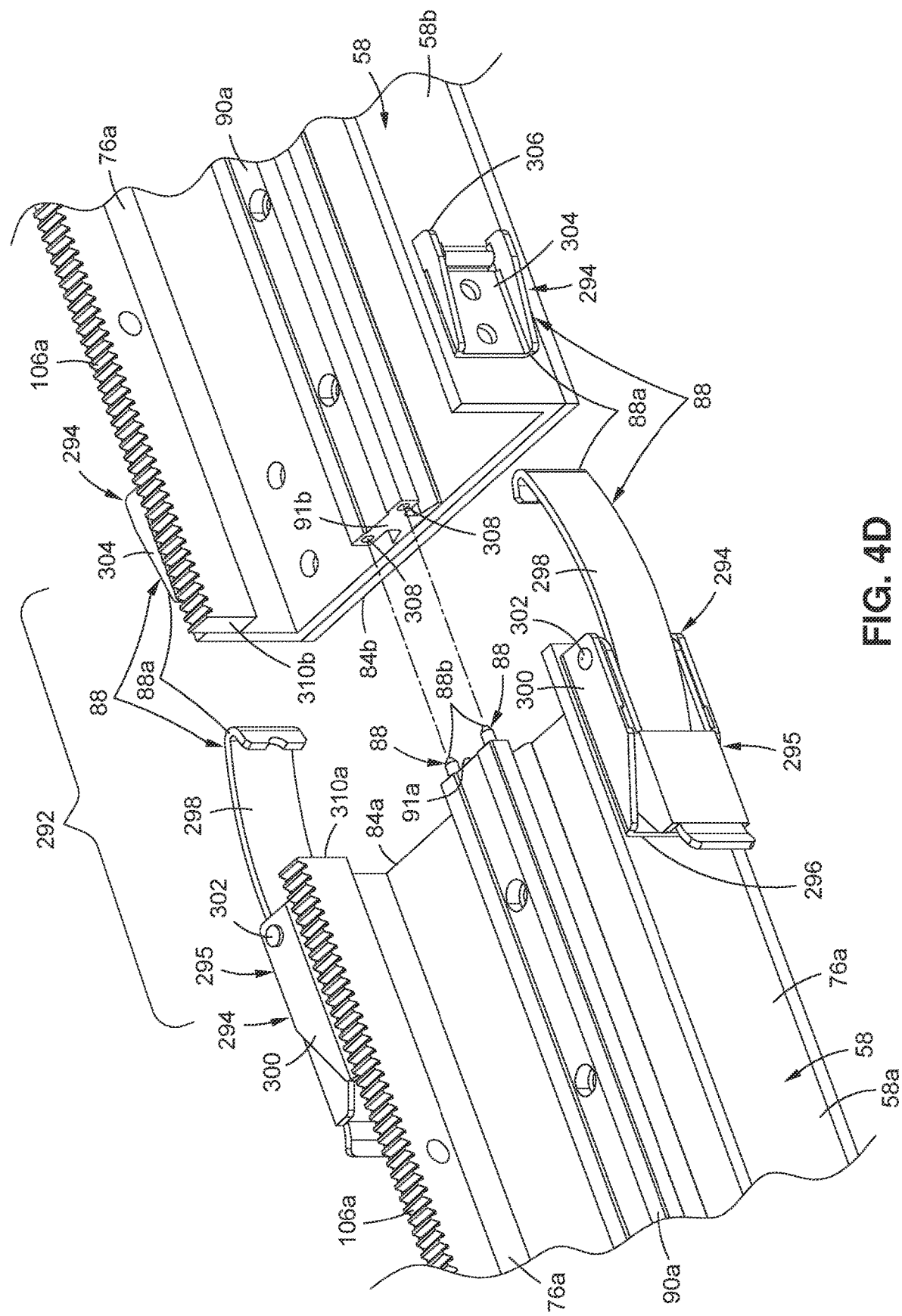
FIG. 4D is an illustration of an enlarged left perspective view of coupling elements of the rail segments of FIG. 4A.

Now referring to FIGS. 4A-4C, FIG. 4A is an illustration of a left perspective view of a version of a mechanical avatar assembly 10 of the disclosure, with a rail assembly 56 having two rail segments 58 and the articulating avatar arm 180 attached to the rail assembly 56. The mechanical avatar assembly 10 is in the form of a two-rail-segment mechanical avatar assembly 10*a* (see FIGS. 4A-4C). FIG. 4B is an illustration of a right side view of the mechanical avatar assembly 10, such as in the form of the two-rail-segment mechanical avatar assembly 10*a*, of FIG. 4A. FIG. 4C is an illustration of a top view of the mechanical avatar assembly 10, such as in the form of the two-rail-segment mechanical avatar assembly 10*a*, of FIG. 4A.

As shown in FIGS. 4A-4C, the mechanical avatar assembly 10, such as in the form of the two-rail-segment mechanical avatar assembly 10a, comprises the rail assembly 56, in the form of a modular rail assembly 56a, and the articulating avatar arm 180 coupled to the first rail segment 58a of the rail assembly 56. As shown in FIGS. 4A-4C, the rail assembly 56 comprises two rail segments 58, including a first rail segment 58a and a second rail segment 58b, that are interlocking rail segments coupled together in an interlocking configuration 60 (see FIGS. 4A, 4C) to form an elongated base 62 having a length 64 (see FIG. 4B). The first rail segment 58a comprises an aft rail segment 58f (see FIG. 4A), or trailing rail segment. The second rail segment 58b comprises the forward rail segment 58e (see FIG. 4A), or leading rail segment. As shown in FIGS. 4A-4C, the elongated base 62 has the front end 66, or leading end, and the rear end 68, or trailing end. As further shown in FIGS. 4A-4C the front end 66, or the leading end, of the elongated base 62 of the rail assembly 56 has the guide portion 85 having an upward angled configuration 86 (see FIGS. 4A, 4B), or sled-shaped configuration, as discussed above.

As shown in FIG. 4A, the elongated base 62 comprises an elongated base plate 70 and opposing sidewalls 76 in the form of a first sidewall 78 and a second sidewall 80. The elongated base plate 70 and the opposing sidewalls 76 together form a C-channel configuration 82 (see FIG. 4A). As shown in FIG. 4A, each rail segment 58 comprises a base plate portion 70a of the elongated base plate 70, and comprises opposing sidewall portions 76a. As shown in FIG. 4B, each rail segment 58 has the first end 84a and the second end 84b.

As shown in FIGS. 4A, 4C, the two rail segments 58 of the rail assembly 56 are coupled together with coupling elements 88, comprising latches 88a. As further shown in FIG. 4A, the rail assembly 56 comprises a rail 90, such as in the form of a center rail 92, coupled, or attached, to the top side 72 of the elongated base plate 70, and extending along the length 64 (see FIG. 4B) of the elongated base 62. Each of the two rail segments 58, as shown in FIG. 4A, comprises the rail portion 90a, and with the two rail segments 58 coupled together in the interlocking configuration 60 to form the rail assembly 56, the rail portions 90a form the rail 90 having a continuous rail configuration 94 (see FIG. 4A). The rail portions 90a, and the rail 90 formed by the rail portions 90a, in FIGS. 4A-4C, similarly have the elevated top surface 96, the recessed track portion 98, the first sidewall 100a, the second sidewall 100b, the first sidewall 100a with the first sidewall channel 102a, the second sidewall 100b with the second sidewall channel 102b and the I-shaped cross-section profile 104, as described, and shown in FIG. 3A.

As further shown in FIGS. 4A, 4B, the rail assembly 56 comprises the gear rack 106 extending along the length 64 of the elongated base 62, and comprised of gear rack portions 106a, and with the two rail segments 58 coupled together in the interlocking configuration 60 to form the rail assembly 56, the gear rack portions 106a form the gear rack 106 having a continuous gear rack configuration 110 (see FIG. 4B). As shown in FIGS. 4A-4C, the rail assembly 56 further comprises the carriage portion 120 with the base portion 188 (see FIG. 4A) of the articulating avatar arm 180 coupled to the carriage portion 120. The carriage portion 120 is designed to ride or travel, and rides or travels, along the rail 90. FIG. 4C shows the drive assembly 136, such as the pneumatic drive assembly 136a, with the air motor 138 and the gear 152 (see also FIG. 4B). FIGS. 4B, 4C show the brake assembly 162 with the air cylinder 164 (see FIG. 4C), the brake device 170 (see FIG. 4B), such as in the form of the brake block 170a (see FIG. 4B), and the shuttle valve 176 (see FIG. 4C). FIGS. 4A-4C further show the cable carrier rail mount 290.

Now referring to FIG. 4D, FIG. 4D is an illustration of an enlarged left perspective view of the coupling elements 88 and rail segments 58 of FIG. 4A, with the first rail segment 58a and the second rail segment 58b in an uncoupled configuration 292. As shown in FIG. 4D, the coupling elements 88 comprise latches 88a. The latches 88a may be in the form of draw latches 294 (see FIG. 4D). As shown in FIG. 4D, each draw latch 294 comprises a hook assembly 295 attached to an exterior portion 296 of the opposing sidewall portions 76a at the first end 84a of the first rail segment 58a. As further shown in FIG. 4D, the hook assembly 295 comprises a hook portion 298 coupled to a hinge portion 300 having a hinge pin 302. The draw latch 294 further comprises a keeper portion 304 (see FIG. 4D) attached to an exterior portion 306 (see FIG. 4D) of the opposing sidewall portions 76a at the second end 84b of the second rail segment 58b.

FIG. 4D further shows coupling elements 88 in the form of alignment pins 88b coupled at the first end 91a of the rail portion 90a of the first rail segment 58a. The alignment pins 88b comprise two alignment pins 88b, and the alignment pins 88b are configured for insertion into mating holes 308 formed in a second end 91b of the rail portion 90a of the second rail segment 58b. As further shown in FIG. 4D, when the first rail segment 58a is coupled, or attached, to the second rail segment 58b, and the coupling elements 88, such as the latches 88a, are locked, and the alignment pins 88b are inserted into the mating holes 308, a first end 310a of the gear rack portion 106a of the first rail segment 58a abuts, and is adjacent to, a second end 310b of the gear rack portion 106a of the second rail segment 58b.

Figure 4E:
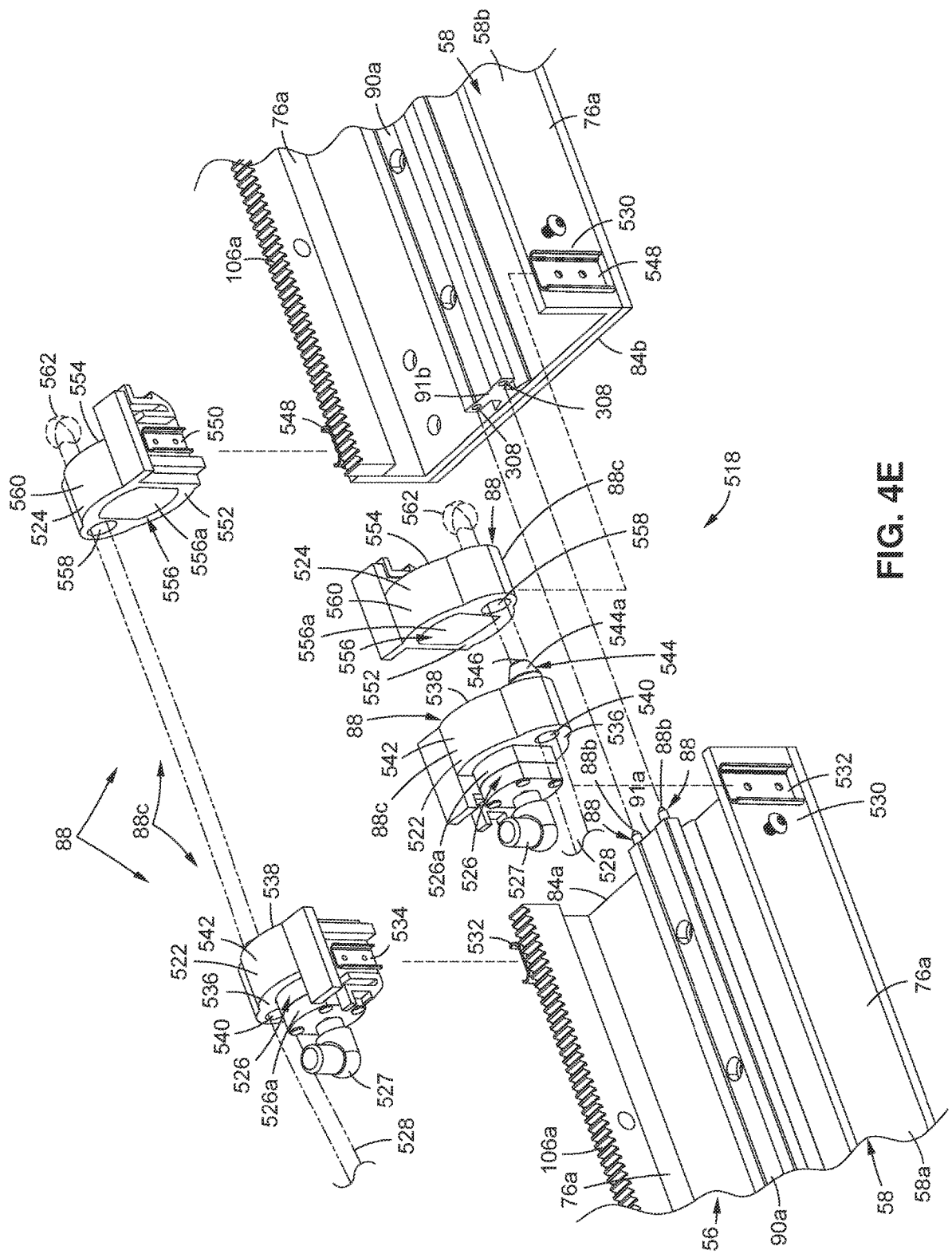
FIG. 4E is an illustration of an enlarged left perspective view of another version of coupling elements for rail segments in an uncoupled configuration.
Figure 4F:
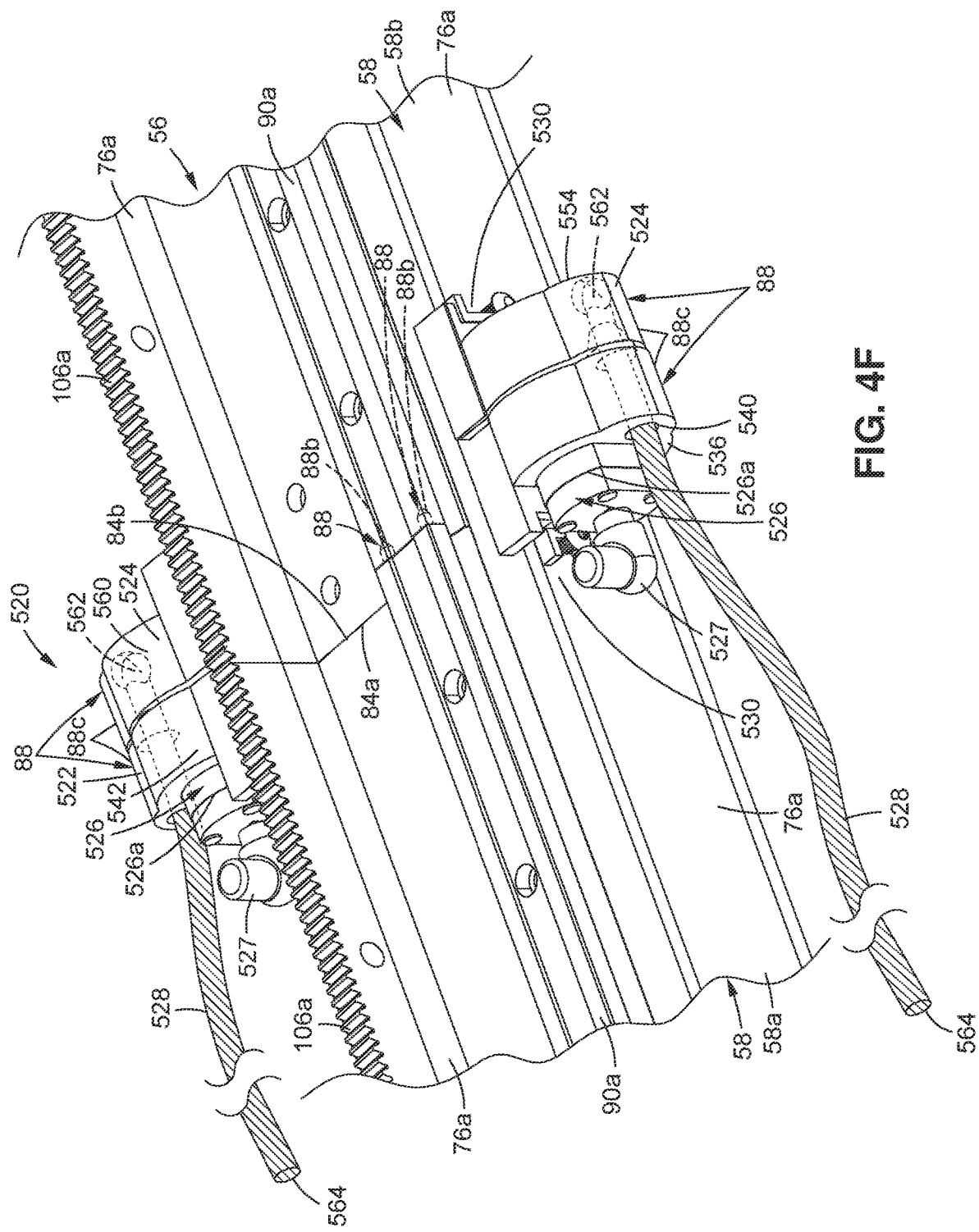
FIG. 4F is an illustration of an enlarged left perspective view of the coupling elements and rail segments of FIG. 4E in a coupled configuration.

Now referring to FIGS. 4E-4F, FIG. 4E is an illustration of an enlarged left perspective view of another version of coupling elements 88, such as in the form of a magnet assembly 88c, for rail segments 58, with the first rail segment 58a and the second rail segment 58b and each magnet assembly 88c in an uncoupled configuration 518. FIG. 4F is an illustration of an enlarged left perspective view of the coupling elements 88, such as in the form of the magnet assembly 88c, and the rail segments 58, with the first rail segment 58a and the second rail segment 58b and each magnet assembly 88c, of FIG. 4E, in a coupled configuration 520. In this version, the coupling elements 88, such as in the form of the magnet assembly 88c, are used instead of the latches 88a (see FIG. 4D).

As shown in FIGS. 4E-4F, in this version, the coupling elements 88, comprise the magnet assemblies 88c comprising a pair of male blocks 522 configured to mate with, and mating with, a pair of female blocks 524, and coupling, or attaching, the pair of male blocks 522 to the pair of female blocks 524 using a pair of magnets 526 and a pair of ropes 528. Each magnet assembly 88c comprises the male block 522 with the magnet 526, the female block 524, and the rope 528 inserted through the male block 522 and the female block 524. As shown in FIGS. 4E-4F, each male block 522 of the pair of male blocks 522 is configured to be coupled, or attached, and is coupled, or attached, to an exterior 530 of each opposing sidewall portion 76a of the first rail segment 58a of the rail assembly 56, via a male drawer slide 532 (see FIG. 4E). An interior side 534 (see FIG. 4E) of each male block 522 is designed to be coupled to, and couples to, the male drawer slide 532. In one version, each male block 522 is attachable to, and detachable from, the male drawer slide 532, by sliding the interior side 534 of the male block 522 against the male drawer slide 532 and clicking the interior side 534 into place against the male drawer slide 532. In another version, the male block 522 is permanently attached to the male drawer slide 532, and the male drawer slide 532 is permanently attached to the exterior 530 of each opposing sidewall portion 76a of the first rail segment 58a of the rail assembly 56.

As shown in FIGS. 4E-4F, each male block 522 comprises a first end 536 and a second end 538. As shown in FIGS. 4E-4F, the magnet 526, such as in the form of an on-off magnet 526a, is attached to the first end 536 of each male block 522, and inserted into a body 542 of the male block 522. The magnet 526, such as the on-off magnet 526a, is turned on and off using a knob 527 (see FIGS. 4E-4F) attached to the magnet 526 at the first end 536 of the male block 522.

As further shown in FIG. 4E, each male block 522 has a through hole 540 (see also FIG. 4F) formed through the body 542 of the male block 522, and each male block 522 has a projecting portion 544, such as a cone-shaped projecting portion 544a, having a hollow interior 546 that is coaxial with the through hole 540. The projecting portion 544, such as the cone-shaped projecting portion 544a, projects outwardly from the through hole 540 on the second end 538 of each male block 522. The through hole 540 and the projecting portion 544, such as the cone-shaped projecting portion 544a, with the hollow interior 546, of each male block 522 is designed to receive, and receives, the rope 528. The rope 528 is preferably a heat-resistant para-aramid synthetic fiber with a molecular structure of many inter-chain bonds that is strong and has a high tensile strength-to-weight ratio. Preferably, each rope 528 has a length of at least 20 inches. However, the rope 528 may have another suitable length.

As shown in FIGS. 4E-4F, each female block 524 of the pair of female blocks 524 is configured to be coupled, or attached, and is coupled, or attached, to the exterior 530 of each opposing sidewall portion 76a of the second rail segment 58b of the rail assembly 56, via a female drawer slide 548 (see FIG. 4E). An interior side 550 (see FIG. 4E) of each female block 524 is designed to be coupled to, and couples to, the corresponding female drawer slide 548. In one version, each female block 524 is attachable to, and detachable from, the female drawer slide 548, by sliding the interior side 550 of the female block 524 against the female drawer slide 548 and clicking the interior side 550 into place against the female drawer slide 548. In another version, the female block 524 is permanently attached to the female drawer slide 548, which is permanently attached to the exterior 530 of each opposing sidewall portion 76a of the second rail segment 58b of the rail assembly 56.

As shown in FIG. 4E, each female block 524 comprises a first end 552 and a second end 554 (see also FIG. 4F). As shown in FIG. 4E, the female block 524 has a metal plate 556, such as in the form of an iron plate 556a, disposed in, and on, the first end 552 of the female block 524. The metal plate 556, such as the iron plate 556a, of each female block 524 is configured to couple, or attach, and couples, or attaches, to the second end 538 of the male block 522, when the magnet 526, such as the on-off magnet 526a, is turned on. The magnet 526, such as the on-off magnet 526a, pulls the metal plate 556, such as the iron plate 556a, of the female block 524 to the magnet 526 of the male block 522. As further shown in FIG. 4E, each female block 524 has a through hole 558 formed through a body 560 of the female block 524. When the male block 522 and the female block 524 are coupled, or attached, together, the projecting portion 544, such as the cone-shaped projecting portion 544a, is inserted into the through hole 558 of the female block 524. The hollow interior 546 of the projecting portion 544, such as the cone-shaped projecting portion 544a, is coaxial with the through hole 558 of the female block 524 when the male block 522 is coupled to the female block 524. The through hole 558 of each female block 524 is also designed to receive, and receives, the rope 528.

Each rope 528 has a fixed end 562 (see FIGS. 4E-4F) and a free end 564 (see FIG. 4F). The fixed end 562 of each rope 528 is tied in a knot, or fixed in some other manner, to, or in, the second end 554 (see FIGS. 4E-4F) of each female block 524, and each rope 528 is inserted through the through hole 558 (see FIG. 4E) of each female block 524. Each rope 528 is further inserted through the projecting portion 544 (see FIG. 4E), such as the cone-shaped projecting portion 544a (see FIG. 4E), of each male block 522, and is inserted through the through hole 540 (see FIG. 4F) of each male block 522. The free end 564 of each rope 528 hangs loose and is designed to be held and pulled by the operator 248 (see FIG. 11A).

When the operator 248 desires to attach the first rail segment 58a to the second rail segment 58b, the operator 248 pulls on the free ends 564 of the pair of ropes 528, to pull the first rail segment 58a and the second rail segment 58b together. The projecting portion 544 (see FIG. 4E), such as the cone-shaped projecting portion 544a (see FIG. 4E), of each male block 522 aligns with the through hole 558 of each female block 524, to align the first rail segment 58a to the second rail segment 58b. Further, as shown in FIGS. 4E-4F, the first rail segment 58a has coupling elements 88, such as alignment pins 88b (see also FIG. 4D), coupled at the first end 91a (see FIG. 4E) of the rail portion 90a of the first rail segment 58a. The alignment pins 88b comprise two alignment pins 88b, and the alignment pins 88b are configured for insertion into mating holes 308 (see FIG. 4E) formed in the second end 91b (see FIG. 4E) of the rail portion 90a (see FIG. 4E) of the second rail segment 58b. As further shown in FIG. 4F, when the first rail segment 58a is coupled, or attached, to the second rail segment 58b, and the coupling elements 88, such as the magnet assembly 88c on each side of the rail assembly 56, are coupled together, and the alignment pins 88b are inserted into the mating holes 308, the gear rack portion 106a (see also FIGS. 4E-4F) of the first rail segment 58a abuts, and is adjacent to, the gear rack portion 106a (see also FIGS. 4E-4F) of the second rail segment 58b, and the first end 84a (see FIGS. 4E-4F) of the first rail segment 58a abuts the second end 84b (see FIGS. 4E-4F) of the second rail segment 58b.

Figure 5B:
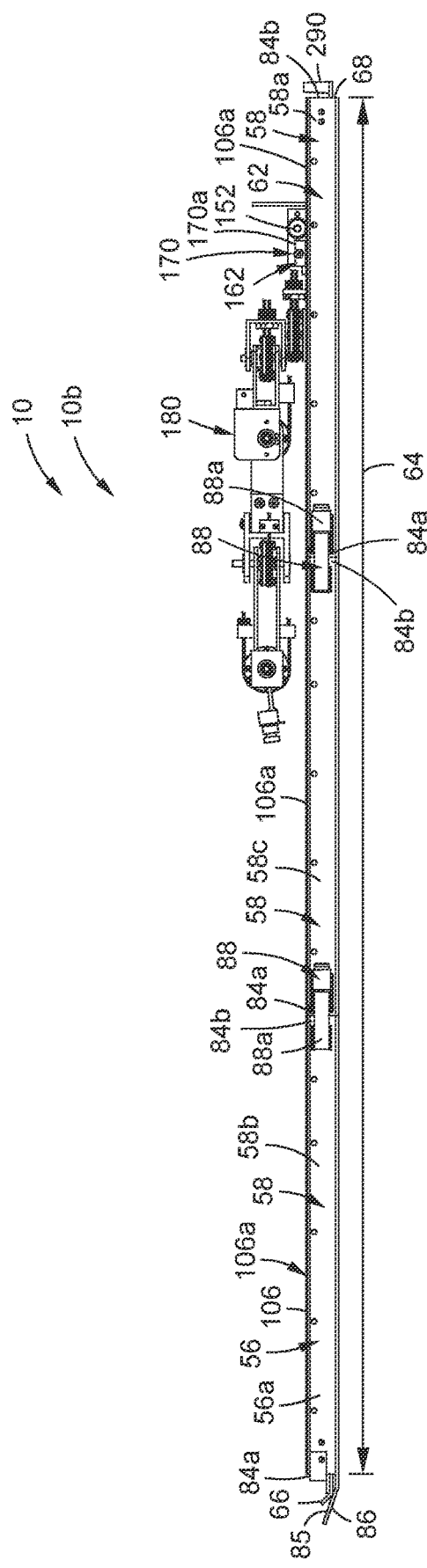
FIG. 5B is an illustration of a right side view of the mechanical avatar assembly of FIG. 5A.

Now referring to FIGS. 5A-5B, FIG. 5A is an illustration of a left perspective view of another version of a mechanical avatar assembly 10 of the disclosure, with a rail assembly 56 having three rail segments 58 and the articulating avatar arm 180 coupled to the rail assembly 56. The mechanical avatar assembly 10 is in the form of a three-rail-segment mechanical avatar assembly 10b (see FIGS. 5A-5B). FIG. 5B is an illustration of a right side view of the mechanical avatar assembly 10, such as in the form of the three-rail-segment mechanical avatar assembly 10b, of FIG. 5A.

As shown in FIGS. 5A-5B, the mechanical avatar assembly 10, such as in the form of the three-rail-segment mechanical avatar assembly 10b, comprises the rail assembly 56, in the form of the modular rail assembly 56a, and the articulating avatar arm 180 coupled to the first rail segment 58a of the rail assembly 56. As shown in FIGS. 5A-5B, the rail assembly 56 comprises three rail segments 58, including a first rail segment 58a, a second rail segment 58b, and a third rail segment 56c, that are interlocking rail segments coupled together in an interlocking configuration 60 (see FIG. 5A) to form an elongated base 62 having a length 64 (see FIG. 5B). The first rail segment 58a comprises the aft rail segment 58f (see FIG. 5A), or trailing rail segment. As shown in FIG. 5A, the second rail segment 58b comprises the forward rail segment 58e, or leading rail segment, and the third rail segment 58c is coupled between the first rail segment 58a and the second rail segment 58b. As shown in FIGS. 5A-5B, the elongated base 62 has the front end 66, or leading end, and the rear end 68, or trailing end. As further shown in FIGS. 5A-5B the front end 66, or the leading end, of the elongated base 62 of the rail assembly 56 has the guide portion 85 having an upward angled configuration 86, or sled-shaped configuration, as discussed above.

As shown in FIG. 5A, the elongated base 62 comprises an elongated base plate 70 and opposing sidewalls 76 in the form of a first sidewall 78 and a second sidewall 80. The elongated base plate 70 and the opposing sidewalls 76 together form a C-channel configuration 82 (see FIG. 5A). As shown in FIG. 5A, each rail segment 58 comprises the base plate portion 70a of the elongated base plate 70, and comprises opposing sidewall portions 76a. As shown in FIG. 5B, each rail segment 58 has the first end 84a and the second end 84b.

As shown in FIGS. 5A-5B, the three rail segments 58 of the rail assembly 56 are coupled together with coupling elements 88, comprising latches 88a. As further shown in FIG. 5A, the rail assembly 56 comprises the rail 90, such as in the form of the center rail 92, coupled, or attached, to the top side 72 of the elongated base plate 70, and extending along the length 64 (see FIG. 5B) of the elongated base 62. Each of the three rail segments 58, as shown in FIG. 5A, comprises the rail portion 90a, and with the three rail segments 58 coupled together in the interlocking configuration 60 to form the rail assembly 56, the rail portions 90a form the rail 90 having the continuous rail configuration 94. The rail portions 90a, and the rail 90 formed by the rail portions 90a, in FIG. 5A, similarly have the elevated top surface 96, the recessed track portion 98, the first sidewall 100a, the second sidewall 100b, the first sidewall 100a with the first sidewall channel 102a, the second sidewall 100b with the second sidewall channel 102b and the I-shaped cross-section profile 104, as described, and shown in FIG. 3A.

As further shown in FIGS. 5A-5B, the rail assembly 56 comprises the gear rack 106 extending along the length 64 (see FIG. 5B) of the elongated base 62, and comprised of gear rack portions 106a, and with the three rail segments 58 coupled together in the interlocking configuration 60 to form the rail assembly 56, the gear rack portions 106a form the gear rack 106 having the continuous gear rack configuration 110 (see FIG. 5A). As shown in FIG. 5A, the rail assembly 56 further comprises the carriage portion 120 with the base portion 188 of the articulating avatar arm 180 coupled to the carriage portion 120. The carriage portion 120 is designed to ride or travel, and rides or travels, along the rail 90. FIG. 5A shows the drive assembly 136, such as the pneumatic drive assembly 136a, with the air motor 138 and the gear 152 (see also FIG. 5B). FIGS. 5A-5B show the brake assembly 162 with the air cylinder 164 (see FIG. 5A), and the brake device 170 (see FIG. 5B), such as in the form of the brake block 170a (see FIG. 5B). FIGS. 5A-5B further show the cable carrier rail mount 290.

Figure 6C:
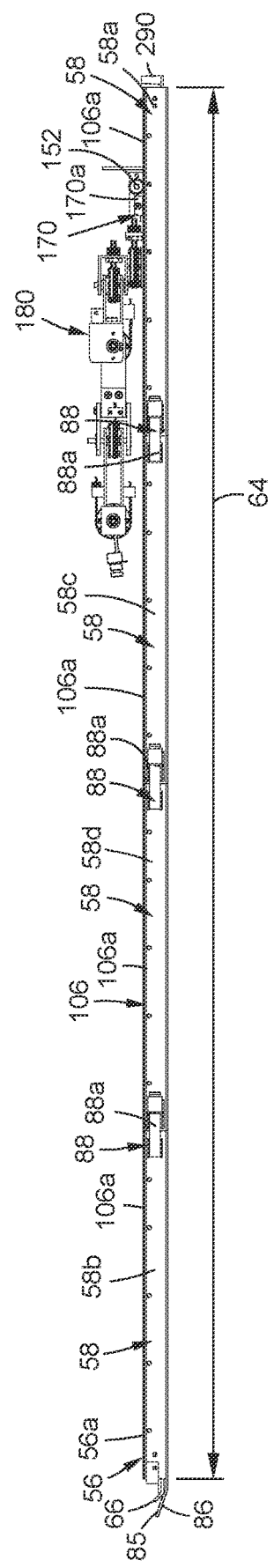
FIG. 6C is an illustration of a right side view of the mechanical avatar assembly of FIG. 6B.

Now referring to FIGS. 6A-6C, FIG. 6A is an illustration of an exploded left perspective view of yet another version of a mechanical avatar assembly 10 of the disclosure, with the rail assembly 56 having four rail segments 58 and the articulating avatar arm 180 coupled to the first rail segment 58a of the rail assembly 56, and the mechanical avatar assembly 10 in an uncoupled configuration 312. The mechanical avatar assembly 10 is in the form of a four-rail-segment mechanical avatar assembly 10c (see FIGS. 6A-6C). FIG. 6B is an illustration of a left perspective view of the mechanical avatar assembly 10, such as in the form of the four-rail-segment mechanical avatar assembly 10c, of FIG. 6A, in a coupled configuration 314. FIG. 6C is an illustration of a right side view of the mechanical avatar assembly 10, such as in the form of the four-rail-segment mechanical avatar assembly 10c, of FIG. 6B.

As shown in FIGS. 6A-6C, the mechanical avatar assembly 10, such as in the form of the four-rail-segment mechanical avatar assembly 10c, comprises the rail assembly 56, in the form of the modular rail assembly 56a, and the articulating avatar arm 180 coupled to the first rail segment 58a of the rail assembly 56. As shown in FIGS. 6A-6C, the rail assembly 56 comprises four rail segments 58, including a first rail segment 58a, a second rail segment 58b, a third rail segment 56c, and a fourth rail segment 56d, that are interlocking rail segments coupled together in an interlocking configuration 60 (see FIG. 6B) to form an elongated base 62 (see FIG. 6B) having a length 64 (see FIG. 6C). The first rail segment 58a comprises the aft rail segment 58f (see FIGS. 6A-6B), or trailing rail segment. As shown in FIGS. 6A-6B, the second rail segment 58b comprises the forward rail segment 58e, or leading rail segment, and the third rail segment 58c and the fourth rail segment 58d are coupled between the first rail segment 58a and the second rail segment 58b. As shown in FIG. 6B, the elongated base 62 has the front end 66, or leading end, and the rear end 68, or trailing end. As further shown in FIG. 6B the front end 66, or the leading end, of the elongated base 62 of the rail assembly 56 has the guide portion 85 having an upward angled configuration 86, or sled-shaped configuration, as discussed above.

As shown in FIG. 6B, the elongated base 62 comprises an elongated base plate 70 and opposing sidewalls 76 in the form of a first sidewall 78 and a second sidewall 80. The elongated base plate 70 and the opposing sidewalls 76 together form a C-channel configuration 82 (see FIG. 6B). As shown in FIG. 6A, each rail segment 58 comprises the base plate portion 70a of the elongated base plate 70, and comprises opposing sidewall portions 76a. As shown in FIG. 6A, each rail segment 58 has the first end 84a and the second end 84b.

As shown in FIGS. 6B-6C, the four rail segments 58 of the rail assembly 56 are coupled together with coupling elements 88, comprising latches 88a. As further shown in FIG. 6B, the rail assembly 56 comprises the rail 90, such as in the form of the center rail 92, coupled, or attached, to the top side 72 of the elongated base plate 70, and extending along the length 64 (see FIG. 6C) of the elongated base 62. Each of the four rail segments 58, as shown in FIG. 6A, comprises the rail portion 90a, and with the four rail segments 58 coupled together in the interlocking configuration 60 (see FIG. 6B) to form the rail assembly 56, the rail portions 90a form the rail 90 having the continuous rail configuration 94 (see FIG. 6B). The rail portions 90a, and the rail 90 formed by the rail portions 90a, in FIG. 6B, similarly have the elevated top surface 96, the recessed track portion 98, the first sidewall 100a, the second sidewall 100b, the first sidewall 100a with the first sidewall channel 102a, the second sidewall 100b with the second sidewall channel 102*b* and the I-shaped cross-section profile 104, as described, and shown in FIG. 3A.

As further shown in FIGS. 6B-6C, the rail assembly 56 comprises the gear rack 106 extending along the length 64 (see FIG. 6C) of the elongated base 62, and comprised of gear rack portions 106*a* (see also FIG. 6A), and with the four rail segments 58 coupled together in the interlocking configuration 60 to form the rail assembly 56, the gear rack portions 106*a* form the gear rack 106 having the continuous gear rack configuration 110 (see FIG. 6B). As shown in FIG. 6B, the rail assembly 56 further comprises the carriage portion 120 with the base portion 188 of the articulating avatar arm 180 coupled to the carriage portion 120. The carriage portion 120 is designed to ride or travel, and rides or travels, along the rail 90. FIG. 6B shows the drive assembly 136, such as the pneumatic drive assembly 136*a*, with the air motor 138 and the gear 152 (see also FIG. 6C). FIG. 6B shows the brake assembly 162 with the air cylinder 164. FIG. 6C shows the brake device 170, such as in the form of the brake block 170*a*. FIGS. 6A-6C further show the cable carrier rail mount 290.

Figure 7A:
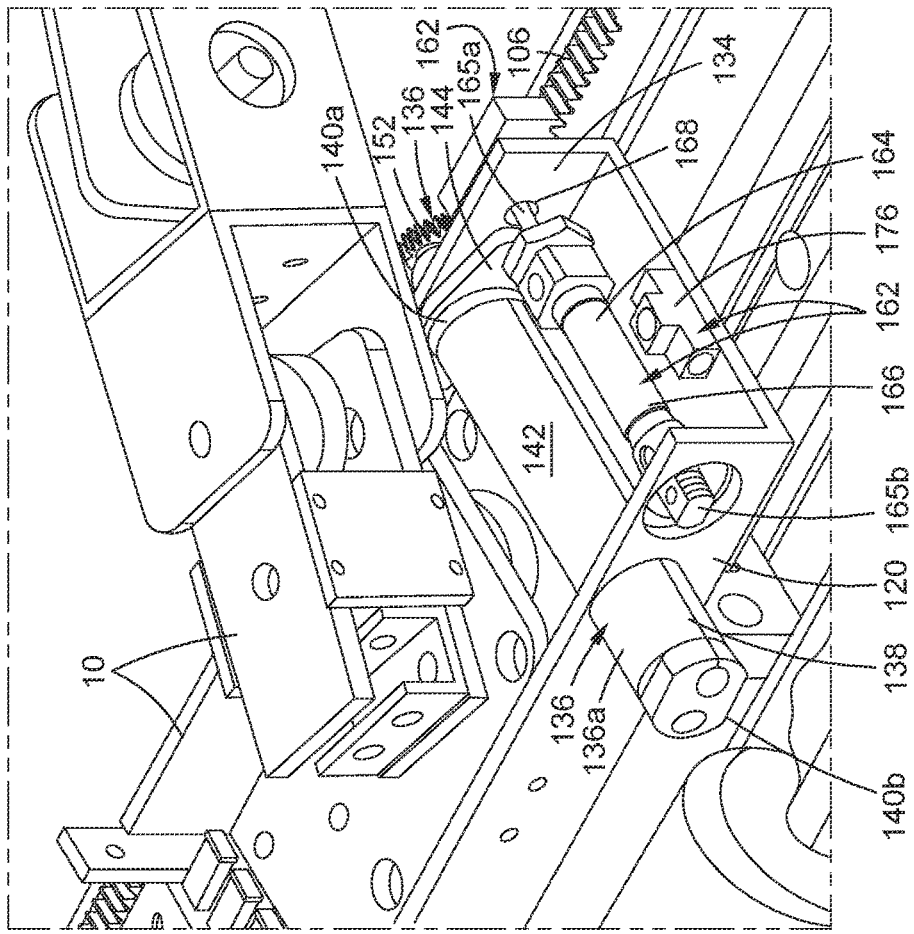
FIG. 7A is an illustration of an enlarged left perspective view of a drive assembly and a brake assembly for an exemplary version of a mechanical avatar assembly of the disclosure.
Figure 7B:
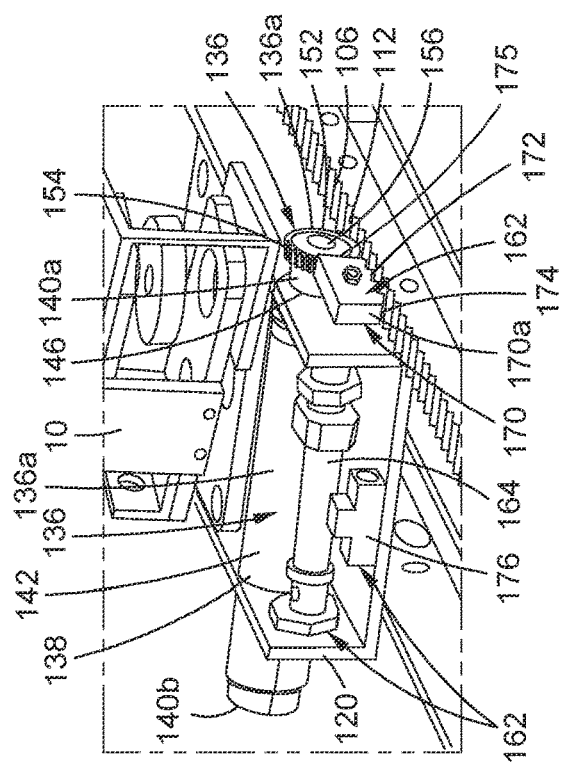
FIG. 7B is an illustration of an enlarged front perspective view of the drive assembly and the brake assembly of FIG. 7A.

Now referring to FIGS. 7A-7B, FIG. 7A is an illustration of an enlarged left perspective view of a drive assembly 136, such as a pneumatic drive assembly 136*a*, and a brake assembly 162 for an exemplary version of a mechanical avatar assembly 10 of the disclosure. FIG. 7B is an illustration of an enlarged front perspective view of the drive assembly 136, such as a pneumatic drive assembly 136*a*, and the brake assembly 162, of FIG. 7A.

As shown in FIGS. 7A-7B, the drive assembly 136, such as the pneumatic drive assembly 136*a*, comprises the air motor 138 coupled to the carriage portion 120, and the air motor 138 comprises the first end 140*a* coupled to the flange 144 (see FIG. 7A) and inserted through the opening 146 (see FIG. 7B), the second end 140*b*, and the cylindrical body 142 disposed between the first end 140*a* and the second end 140*b*.

FIGS. 7A-7B further show the gear 152 of the drive assembly 136, such as the pneumatic drive assembly 136*a*, coupled to the first end 140*a* of the air motor 138. The gear 152 is designed to interlock, and interlocks, with the gear rack 106 (see FIGS. 7A-7B). The gear 152 has the plurality of teeth 154 (see FIG. 7B) disposed around the circumference of the gear 152. The gear 152 has a central opening 156 (see FIG. 7B) configured to receive, and receiving, the first end 140*a* of the air motor 138. The air motor 138 is powered by air 148 (see FIG. 1B), for example, shop air 148*a* (see FIG. 1B), from an air supply 150 (see FIG. 1B), located outside of the confined space 14. As discussed above, the speed 160 (see FIG. 1A) of the air motor 138 is controlled by the pedal valve 265 (see FIG. 1B), and the direction 161 (see FIG. 1A) of the air motor 138 is controlled by the control valve 266 (see FIG. 1B), such as a three-state control valve (forward/backward/stop).

FIGS. 7A-7B further show the brake assembly 162 comprising the air cylinder 164 coupled to the carriage portion 120, where the air cylinder 164 comprises the first end 165*a* inserted through the hole 168 (see FIG. 7A) formed through the cradle portion sidewall 134, the second end 165*b*, and the cylindrical body 166. FIG. 7B further shows the brake device 170, such as in the form of the brake block 170*a*, of the brake assembly 162. The brake device 170 is coupled to the first end 165*a* of the air cylinder 164, and the brake device 170 has the plurality of teeth 172 (see FIG. 7B) along the bottom end 174 (see FIG. 7B) of the brake device 170. The plurality of teeth 172 of the brake device 170 are designed to interlock with the plurality of teeth 112 (see FIG. 7B) of the gear rack 106 (see FIG. 7B) and is designed to stop, or brake, the carriage portion 120 from moving along the rail 90. As shown in FIG. 7B, the rear side 175 of the brake device 170 is adjacent the gear 152. The brake assembly 162 further comprises the shuttle valve 176 (see FIGS. 7A-7B) coupled to the carriage portion 120. The shuttle valve 176 is designed to synchronize, and synchronizes, the air cylinder 164 and the air motor 138.

Now referring to FIGS. 8A-8B, FIG. 8A is an illustration of an enlarged rear perspective view of an attachment assembly 226 attaching an exemplary version of a mechanical avatar assembly 10 of the disclosure to an access opening 230 into a confined space 14 in a structure 16. FIG. 8B is an illustration of an enlarged perspective view of a connector device 232 of the attachment assembly 226 of FIG. 8A. As shown in FIG. 8A, the attachment assembly 226 is designed to attach, and attaches, at least one portion 56*b* of the rail assembly 56 of the mechanical avatar assembly 10 to an edge 228 of the access opening 230. As shown in FIG. 8A, the attachment assembly 226 comprises the connector device 232 connected to the at least one portion 56*b* of the rail assembly 56, and the coupling mechanism 234 that couples the connector device 232 relative to the edge 228 of the access opening 230. As shown in FIGS. 8A-8B, the connector device 232 is attached to the opposing sidewall 76 (see FIG. 8A), such as the second sidewall 80, of the elongated base 62 (see FIG. 8A), and is attached to the portion 56*b* of the rail assembly 56 of the mechanical avatar assembly 10. As shown in FIGS. 8A-8B, in one version, the connector device 232 comprises a connector portion 316 with a bolt 318, such as a right angle screw hook bolt, coupled to the connector portion. In other versions, the connector device 232 may also comprise latches, clamps, clips, quick-disconnect elements, or other suitable connector devices.

As shown in FIG. 8A, in one version, the coupling mechanism 234 comprises a clamp assembly 235 with clamps 236, such as in the form of dual-sided clamps 236*a*. As shown in FIG. 8A, the clamps 236, such as the dual-sided clamps 236*a*, have extendable clamp arms 237. Preferably, the clamps 236 are quick-release detachable clamps having a C-clamp configuration. The use of dual-sided clamps 236*a* enables a large range of adjustability for varying geometry of the access opening 230 of the structure 16. In other versions, the coupling mechanism 234 may comprise latches, clips, or other suitable coupling mechanisms.

Figure 9A:
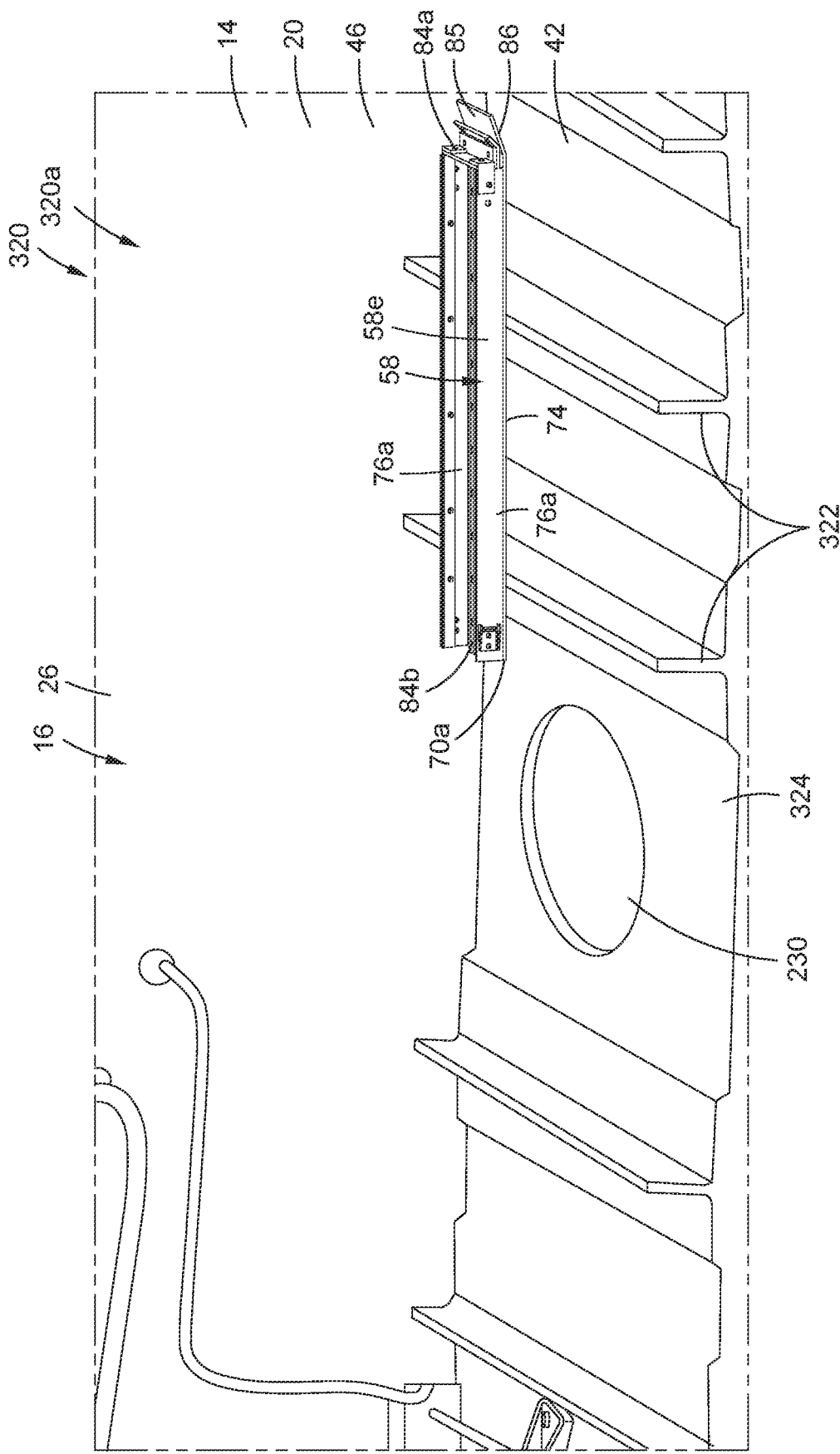
FIG. 9A is an illustration of a left perspective view of an interior of a confined space in a structure showing a forward rail segment installed in the confined space.

Now referring to FIGS. 9A-9E, FIGS. 9A-9E show an exemplary installation process 320 for installing a version of the mechanical avatar assembly 10 (see FIG. 9C) into the interior 20 of a confined space 14 in a structure 16. FIG. 9A is an illustration of a left perspective view of the interior 20 of the confined space 14 in the structure 16, and shows a rail segment 58, such as a forward rail segment 58*e*, installed and placed into the confined space 14, by an operator 248 (see FIG. 1B). As shown in FIG. 9A, the structure 16 comprises an aircraft 26 with a tank 42 in a wing 46 of an aircraft 26. FIG. 9A shows an installing forward rail segment step 320*a* of the installation process 320. The forward rail segment 58*e* is inserted through the access opening 230 and into the interior 20 of the confined space 14, and the forward rail segment 58*e* is shown with the bottom side 74 placed across, and over, the tops of stringers 322, or stiffeners, which are attached to a floor 324 of the confined space 14. FIG. 9A further shows the forward rail segment 58*e* having the first end 84*a* with the guide portion 85 with the upward angled configuration 86, having the second end 84b, having the base plate portion 70a, and having the opposing sidewall portions 76a.

Figure 9B:
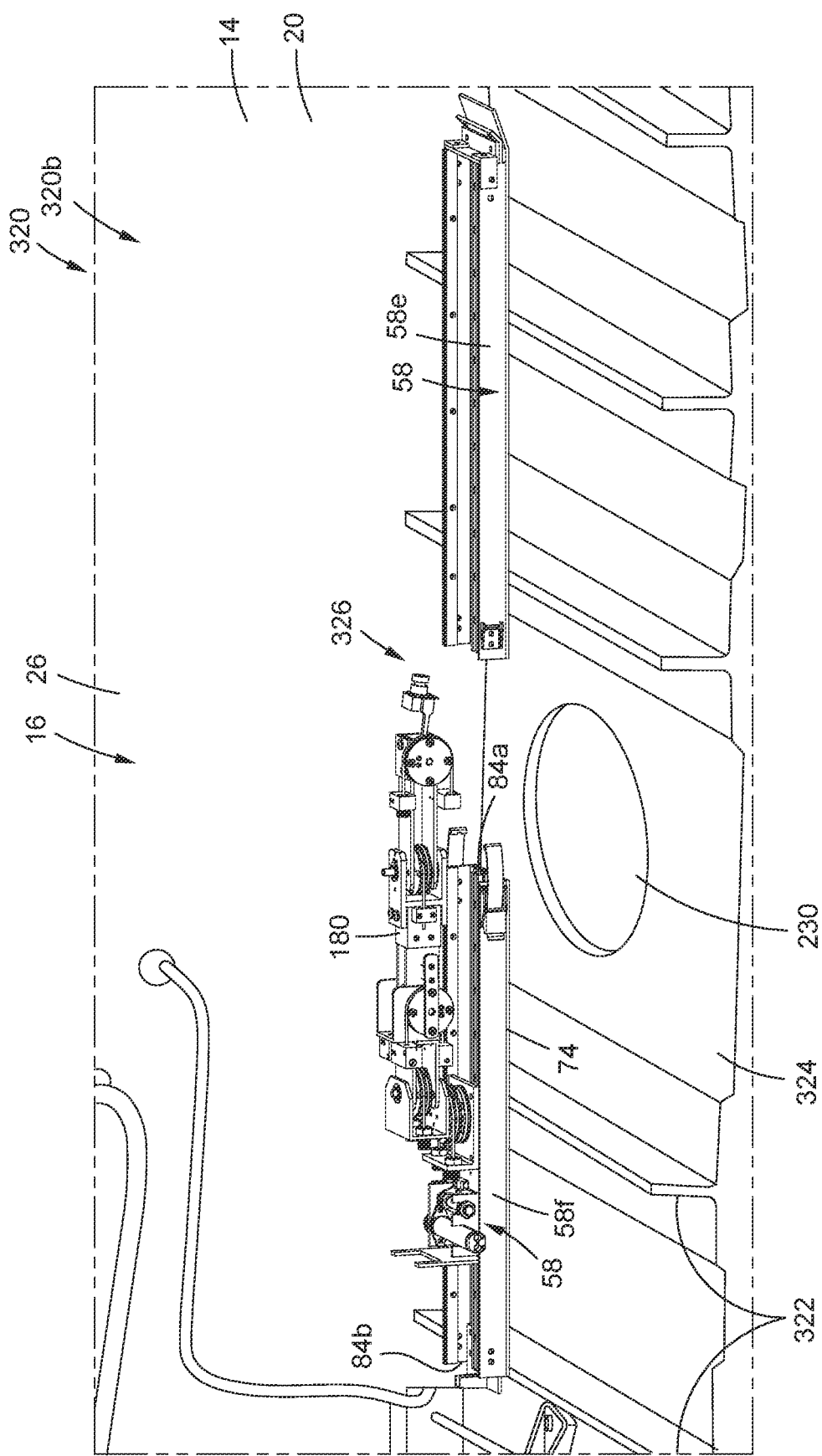
FIG. 9B is an illustration of a left perspective view of the confined space and the forward rail segment of FIG. 9A, and showing an aft rail segment with an attached articulating avatar arm installed in the confined space with the forward rail segment and the aft rail segment in an uncoupled configuration.

FIG. 9B is an illustration of a left perspective view of the interior 20 of the confined space 14 of the structure 16, and the rail segment 58, such as the forward rail segment 58e, of FIG. 9A. FIG. 9B shows an installing aft rail segment with attached articulating avatar arm step 320b of the installation process 320. FIG. 9B shows another rail segment 58, such as the aft rail segment 58f, with an attached articulating avatar arm 180, installed in the interior 20 of the confined space 14 of the structure 16 comprising the aircraft 26. FIG. 9B further shows the forward rail segment 58e and the aft rail segment 58f in an uncoupled configuration 326. The rail segment 58, such as the aft rail segment 58f, with the attached articulating avatar arm 180, is inserted through the access opening 230 and into the interior 20 of the confined space 14, by the operator 248 (see FIG. 1A). The aft rail segment 58f, with the attached articulating avatar arm 180, is shown with the bottom side 74 placed across, and over, the tops of the stringers 322, or stiffeners, which are attached to the floor 324 of the confined space 14. As shown in FIG. 9B, the aft rail segment 58f, with the attached articulating avatar arm 180 is aligned with the forward rail segment 58e, and is positioned behind, or aft to, the forward rail segment 58e.

Figure 9C:
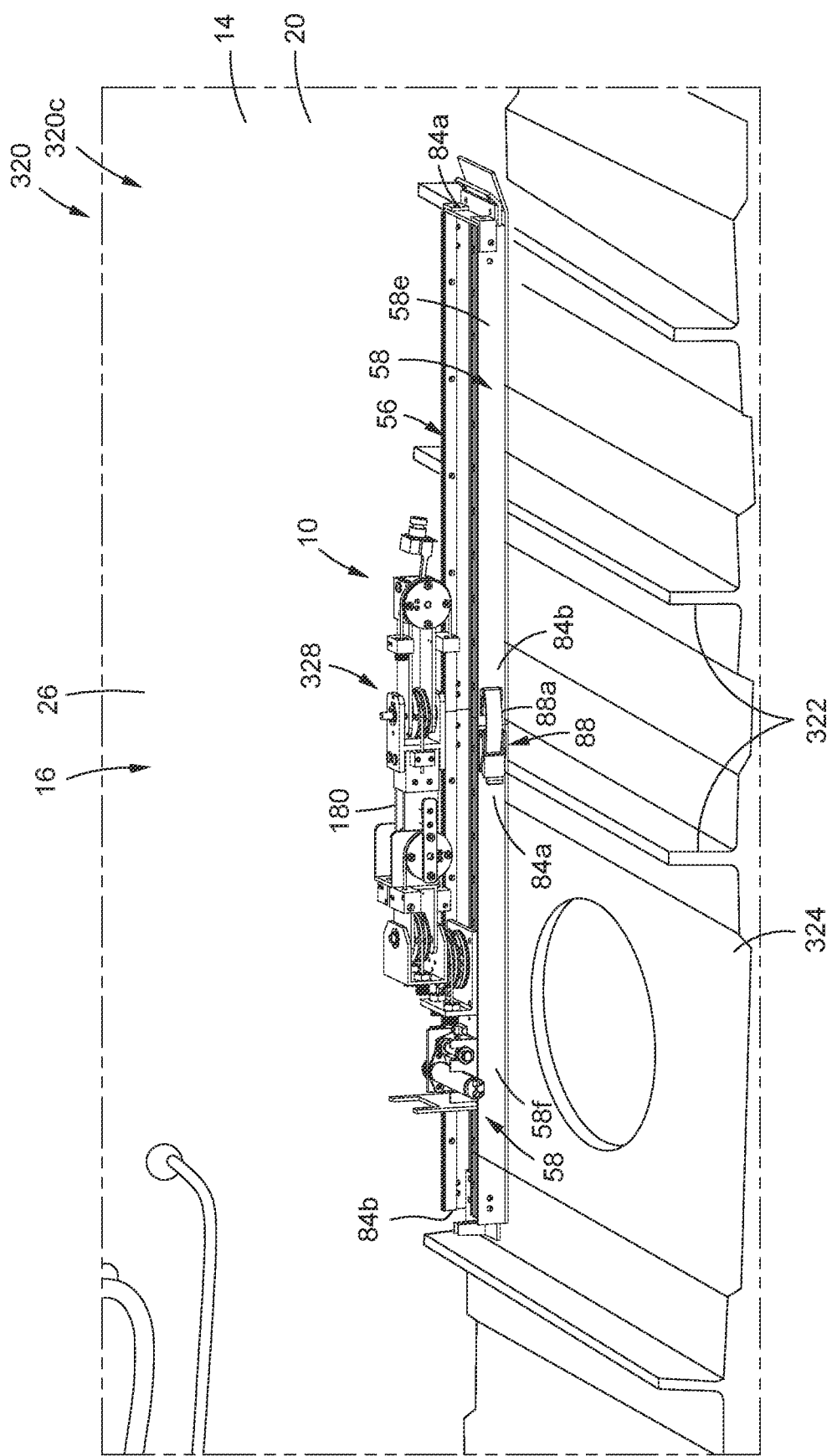
FIG. 9C is an illustration of a left perspective view of the confined space, the aft rail segment with the attached articulating avatar arm, and the forward rail segment of FIG. 9B, showing the aft rail segment with the attached articulating avatar arm and the forward rail segment in a coupled configuration to obtain a mechanical avatar assembly.

FIG. 9C is an illustration of a left perspective view of the interior 20 of the confined space 14, the aft rail segment 58f with the attached articulating avatar arm 180, and the forward rail segment 58e, of FIG. 9B. FIG. 9C shows a coupling rail segments together step 320c of the installation process 320. FIG. 9C shows the rail segment 58, such as the aft rail segment 58f, with the attached articulating avatar arm 180, and the rail segment 58, such as the forward rail segment 58e, in a coupled configuration 328, to obtain the mechanical avatar assembly 10. FIG. 9C shows the first end 84a and the second end 84b of the forward rail segment 58e, and shows the first end 84a and the second end 84b of the aft rail segment 58f. The aft rail segment 58f with the attached articulating avatar arm 180 is coupled to the forward rail segment 58e to form the rail assembly 56 (see FIG. 9C). As shown in FIG. 9C, the first end 84a of the aft rail segment 58f is coupled, or attached, to the second end 84b of the forward rail segment 58e, by the operator 248 (see FIG. 1B), by latching the coupling elements 88, in the form of latches 88a, together, to lock the aft rail segment 58f to the forward rail segment 58e. As shown in FIG. 9C, the aft rail segment 58f, with the attached articulating avatar arm 180, is aligned with the forward rail segment 58e, and is positioned behind, or aft to, the forward rail segment 58e. The mechanical avatar assembly 10 is positioned in the interior 20 of the confined space 14 of the structure 16, comprising the aircraft 26, across, and over, the tops of the stringers 322, or stiffeners, which are attached to the floor 324 of the confined space 14.

Figure 9D:
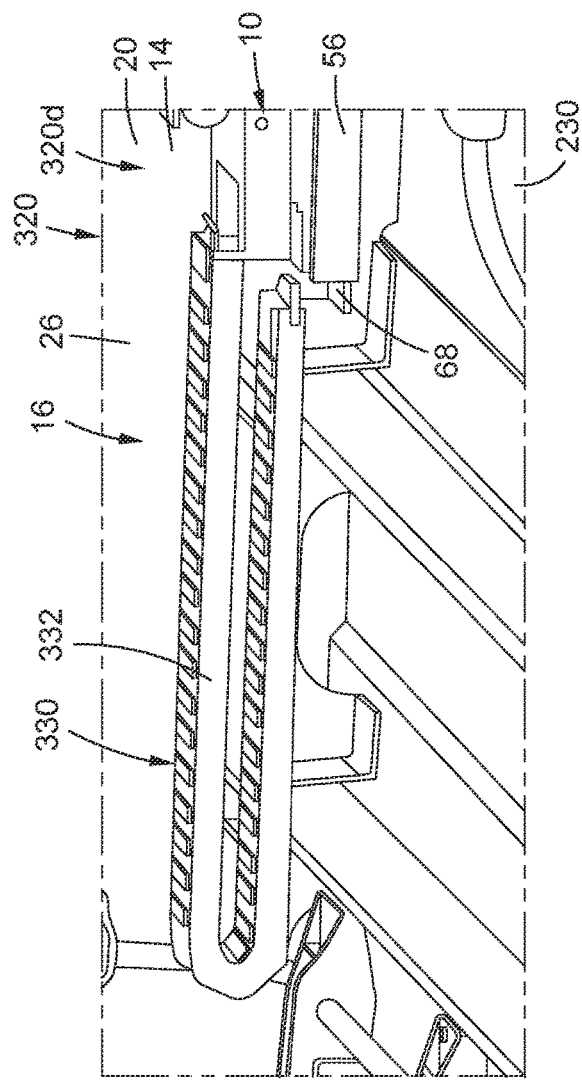
FIG. 9D is an illustration of an enlarged left perspective view of the confined space and a portion of the mechanical avatar assembly of FIG. 9C, and showing a cable management assembly installed in the confined space.

FIG. 9D is an illustration of an enlarged left perspective view of the interior 20 of the confined space 14 of the structure 16, comprising the aircraft 26, of FIG. 9C. FIG. 9D shows an attaching cable management assembly step 320d of the installation process 320. FIG. 9D shows a cable management assembly 330 that has been inserted through the access opening 230 and attached to a rear end 68 of the mechanical avatar assembly 10, of FIG. 9C, by the operator 248 (see FIG. 1B). As shown in FIG. 9D, in one version, the cable management assembly 330 comprises a cable sleeve 332 for securing one or more cables 204 (see FIGS. 1B, 11A) connected to the mechanical avatar assembly 10. The cable management assembly 330, such as the cable sleeve 332, is shown attached to the cable carrier rail mount 290 at the rear end 68 of the rail assembly 56 of the mechanical avatar assembly 10. FIG. 9D further shows the access opening 230.

Figure 9E:
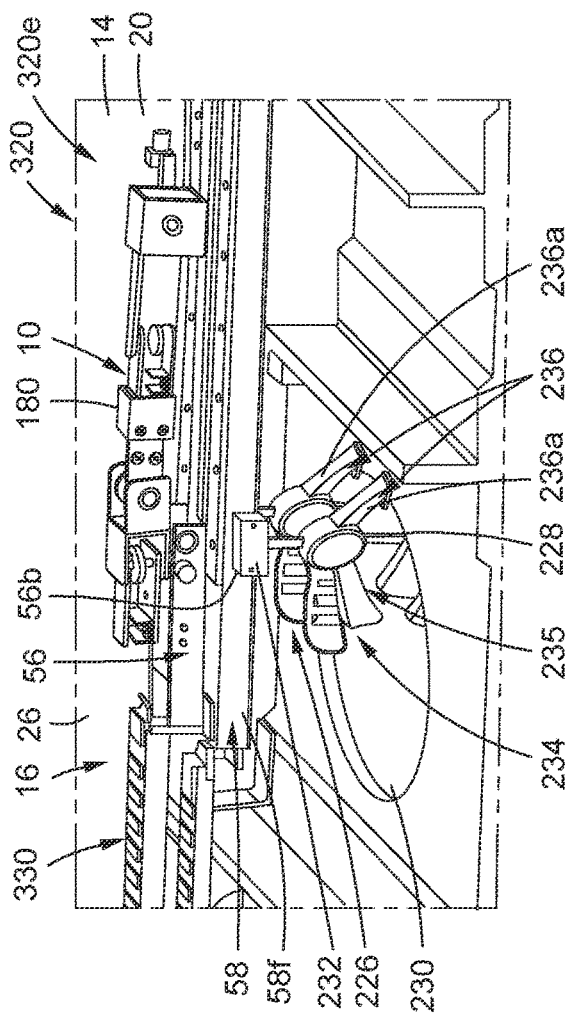
FIG. 9E is an illustration of an enlarged left perspective view of the confined space, the mechanical avatar assembly, and the cable management assembly of FIG. 9D, and showing an attachment assembly attaching the mechanical avatar assembly to an access opening to the confined space.

FIG. 9E is an illustration of an enlarged left perspective view of the interior 20 of the confined space 14 of the structure 16, comprising the aircraft 26, the mechanical avatar assembly 10 comprising the rail assembly 56 coupled to the articulating avatar arm 180, and the cable management assembly 330, of FIG. 9D. FIG. 9E shows an attaching mechanical avatar assembly to access opening step 320e. FIG. 9E shows an attachment assembly 226, attached by the operator 248 (see FIG. 1B), to the rail segment 58, such as the aft rail segment 58f, of the mechanical avatar assembly 10, and attached to an edge 228 of the access opening 230 to the confined space 14 in the structure 16. FIG. 9E shows the attachment assembly 226 comprising the connector device 232 connected to the portion 56b of the rail assembly 56, and the coupling mechanism 234 that couples the connector device 232 relative to the edge 228 of the access opening 230. As shown in FIG. 9E, the coupling mechanism 234 comprises a clamp assembly 235 with clamps 236, such as in the form of dual-sided clamps 236a.

Figure 10C:
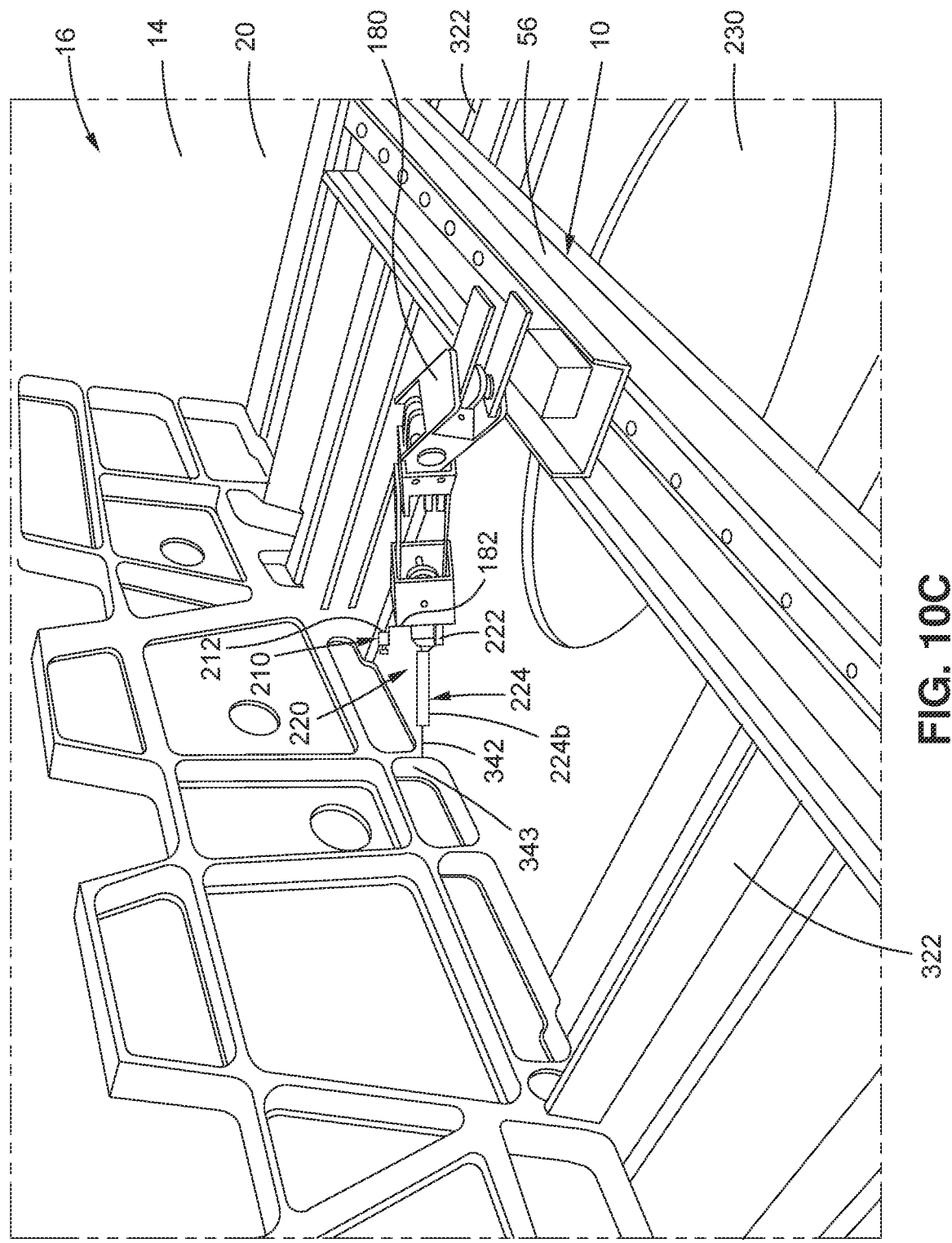
FIG. 10C is an illustration of a right perspective view of a version of a mechanical avatar assembly of the disclosure performing a confined space operation in a confined space in a structure.

Now referring to FIGS. 10A-10B, FIG. 10A is an illustration of a right perspective view of an exemplary version of an end effector tool assembly 220 in an uncoupled configuration 221. FIG. 10B is an illustration of a right perspective view of the end effector tool assembly 220 of FIG. 10A in a coupled configuration 223. The end effector tool assembly 220 is configured for coupling, and is coupled to, the articulating avatar arm 180 (see FIGS. 1A, 10C), such as the first end 182 (see FIG. 10C) of the articulating avatar arm 180, of the mechanical avatar assembly 10.

As shown in FIGS. 10A-10B, the end effector tool assembly 220 comprises an end effector 222 and a tool 224 comprising a sealant tool 224a, such as a sealant gun 224b. As further shown in FIGS. 10A-10B, the end effector 222 comprises a quick disconnect portion 334 having an opening 335 (see FIG. 10A), and a tool side mating portion 336 having a connector portion 337 (see FIG. 10A), such as in the form of a plug or insert, or another suitable connector portion. As further shown in FIGS. 10A-10B, the end effector 222 comprises an adapter 338 coupled to the tool side mating portion 336, and a cradle portion 340 coupled to the side of the adapter 338. The end effector 222 with the quick disconnect portion 334, and the adapter 338, such as a clip-on adapter bracket, with a common interface to the first end 182 (see FIG. 10C) of the articulating avatar arm 180 (see FIG. 10C), enables multiple confined space operations 18 (see FIG. 1A) without extensive equipment changes. The connector portion 337 is designed for insertion into the opening 335 of the quick disconnect portion 334, when the quick disconnect portion 334 is coupled to the tool side mating portion 336 of the end effector 222. As shown in FIG. 10B, the tool 224 comprising the sealant tool 224a, such as the sealant gun 224b, is coupled to the cradle portion 340 of the end effector 222. The tool 224 may be changed or modified depending on the type of confined space operation 18 (see FIG. 1A) performed, or to be performed, by the mechanical avatar assembly 10, and the end effector tool assembly 220. The quick disconnect portion 334 of the end effector 222 allows for easy and fast change of end effectors 222. Preferably, a pivot point of the end effector 222 is aligned with a pivot point of the pulley 200, such that the sealant gun 224b position mimics the human wrist rotation and movement for natural motion.

Now referring to FIG. 10C, FIG. 10C is an illustration of a right perspective view of a version of a mechanical avatar assembly 10 of the disclosure performing a confined space operation 18 in the interior 20 of a confined space 14 in a structure 16. As shown in FIG. 10C, the mechanical avatar assembly 10 comprises the articulating avatar arm 180 coupled, or attached, to the rail assembly 56 and positioned across, and over, the tops of the stringers 322 in the interior 20 of the confined space 14 of the structure 16. The articulating avatar arm 180 has the end effector tool assembly 220 with the end effector 222 coupled to the first end 182 of the articulating avatar arm 180 and with the tool 224, in the form of the sealant gun 224b, coupled, or attached, to the end effector 222. FIG. 10C further shows the sealant gun 224b applying a sealant 342 to a portion of a rib 343 in the interior 20 of the confined space 14 in the structure 16. Dispensing of the sealant 342 is preferably controlled pneumatically via the pedal valve 265 (see FIG. 11A) at the operator workstation 238 (see FIG. 11A). As shown in FIG. 10C, the image capturing device 210, such as the camera 212, is coupled, or attached, to the first end 182 of the articulating avatar arm 180. FIG. 10C further shows the access opening 230 under the mechanical avatar assembly 10.

Figure 11A:
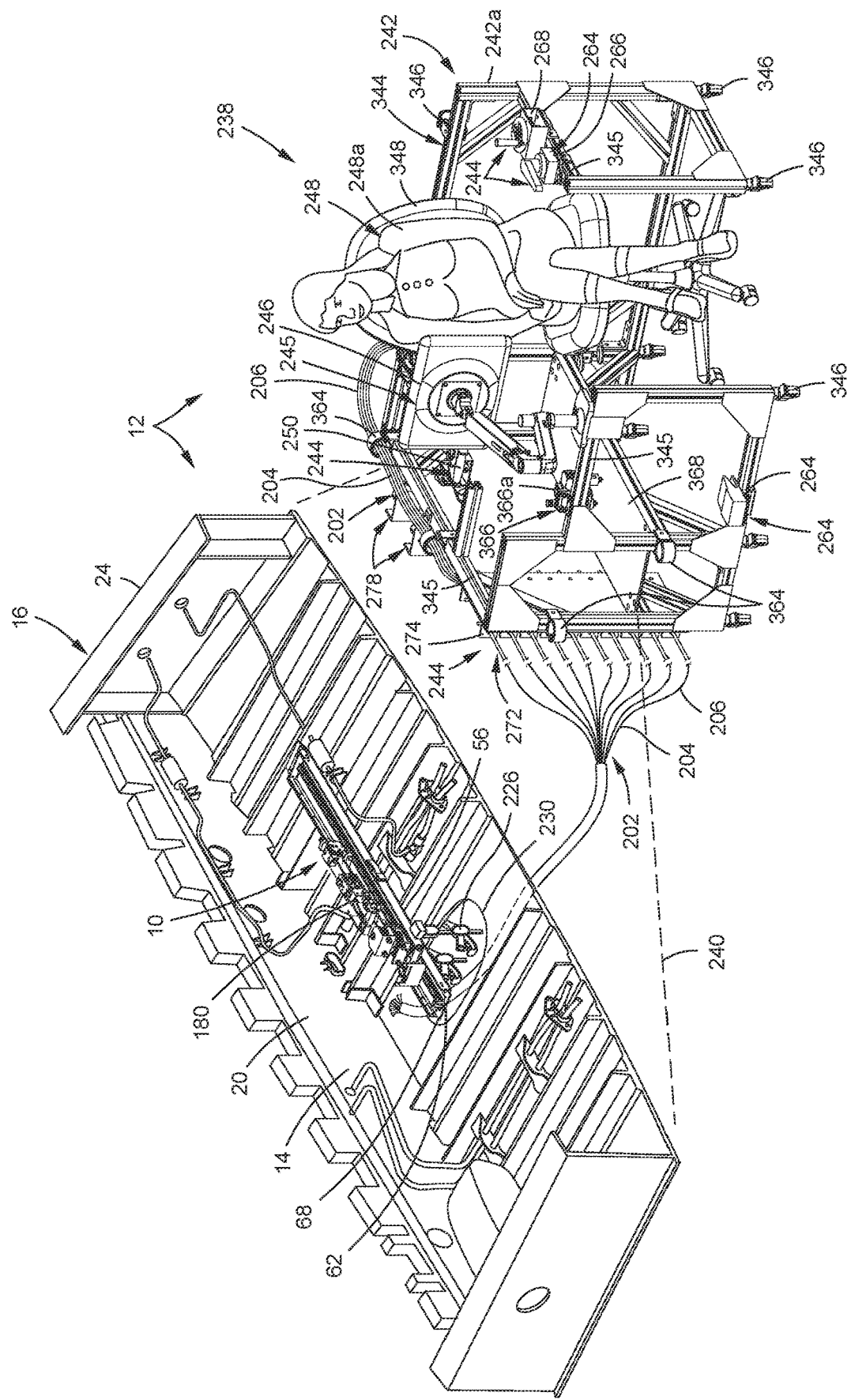
FIG. 11A is an illustration of a perspective view of a version of a mechanical avatar system of the disclosure showing a mechanical avatar assembly coupled to an operator workstation.
Figure 11B:
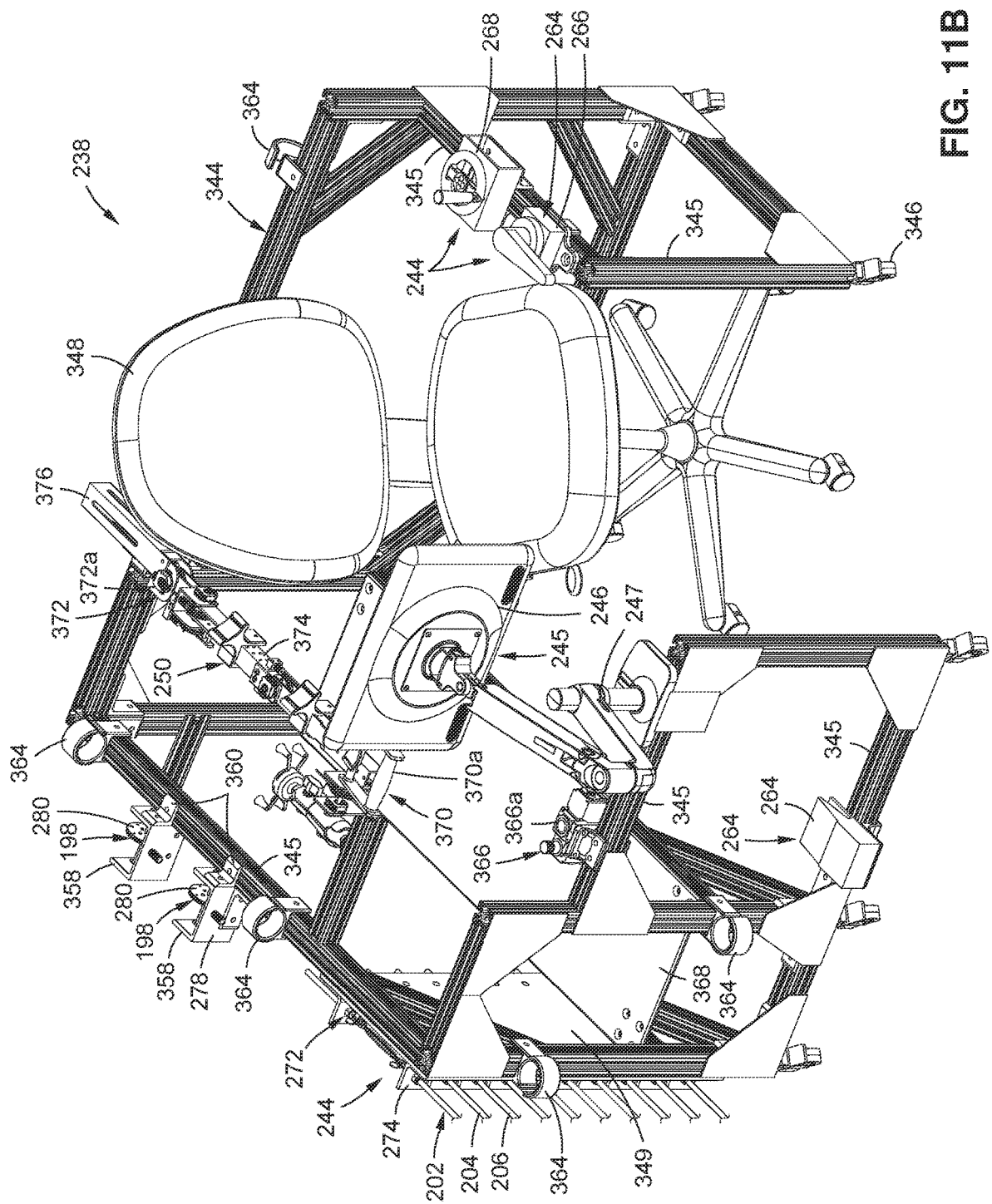
FIG. 11B is an illustration of a front perspective view of the operator workstation of FIG. 11A.
Figure 11C:
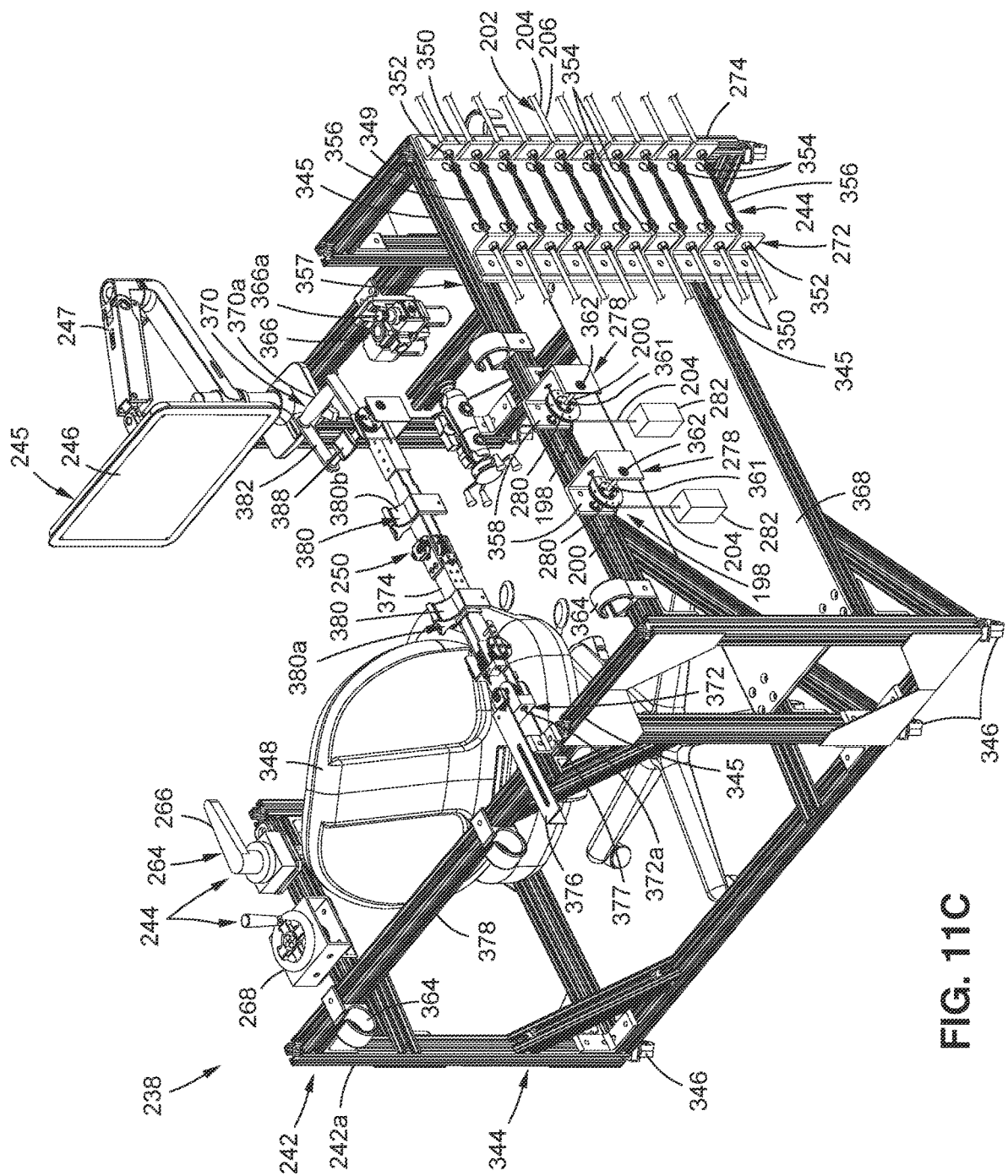
FIG. 11C is an illustration of a rear perspective view of the operator workstation of FIG. 11B.

Now referring to FIGS. 11A-11C, FIG. 11A is an illustration of a perspective view of a version of a mechanical avatar system 12 of the disclosure showing a mechanical avatar assembly 10 coupled to an operator workstation 238. FIG. 11B is an illustration of a front perspective view of the operator workstation 238 of FIG. 11A. FIG. 11C is an illustration of a rear perspective view of the operator workstation 238 of FIG. 11B.

The mechanical avatar system 12, as shown in FIG. 11A, includes the mechanical avatar assembly 10 installed in the interior 20 of a confined space 14 in a structure 16, such as a vehicle 24. FIG. 11A shows the mechanical avatar assembly 10 attached, with the attachment assembly 226, to the access opening 230 to the interior 20 of the confined space 14. In particular, the attachment assembly 226 is coupled, or attached, to the rail assembly 56 of the mechanical avatar assembly 10. FIG. 11A further shows the articulating avatar arm 180 attached to the rail assembly 56 of the mechanical avatar assembly 10, and shows the rear end 68 of the elongated base 62 of the mechanical avatar assembly 10 positioned over the access opening 230 to the interior 20 of the confined space 14 of the structure 16.

FIG. 11A further shows the operator workstation 238 positioned outside the confined space 14 and positioned a predetermined distance 240 from the structure 16. The predetermined distance 240 preferably comprises 1 foot to 40 feet between the operator workstation 238 and the structure 16. However, the predetermined distance 240 may comprise another suitable distance.

In one version, as shown in FIGS. 11A-11C, the operator workstation 238 comprises a portable structure 242, such as in the form of a portable cart 242a. As further shown in FIGS. 11A-11C, the portable structure 242, such as in the form of the portable cart 242a, comprises a frame 344 constructed of a plurality of frame portions 345. The frame portions 345 are preferably made of a metal material such as aluminum, steel, or another suitable metal material. The frame portions 345 may comprise elongated T-slotted modular frame portions that may be easily attached together to form the frame 344 of the portable structure 242, such as the portable cart 242a. As shown in FIGS. 11A-11C, the portable structure 242, such as in the form of the portable cart 242a, comprises wheels 346 coupled to the frame portions 345, so that the portable structure 242, such as in the form of the portable cart 242a, may be easily moved or transported from one location to another location. The wheels 346 may comprise caster wheels and may locked into position and unlocked to move.

As shown in FIG. 11A, the operator workstation 238 comprises a plurality of control devices 244. As shown in FIGS. 11A-11C, in one version, the plurality of control devices 244 comprise the input control arm 250, the pneumatic drive assembly control devices 264 comprising the pedal valve 265 and the control valve 266, the gross angular motion control device 268, and the cable tension control device 272, such as in the form of a tensioner assembly 274.

As shown in FIG. 11A, the operator 248, such as a human operator 248a, is seated in a chair 348 at the operator workstation 238. As shown in FIG. 11A, the operator 248 is seated in front of a monitor 245, such as a computer screen 246. The monitor 245, such as the computer screen 246, is configured to display one or more output images 216 (see FIG. 1B) taken by the image capturing device 210 (see FIGS. 1A, 10C), such as the camera 212 (see FIG. 1A, 10C).

As shown in FIGS. 11A-11C, the articulating avatar arm 180 (see FIG. 11A) of the mechanical avatar assembly 10 is coupled, or connected, to the input control arm 250 at the operator workstation 238, via a plurality of connector elements 202, such as in the form of a plurality of cables 204, for example, a plurality of Bowden cables 206. In a version where the input control arm 250 is mechanically coupled to the articulating avatar arm 180, with the plurality of connector elements 202 comprising the plurality of cables 204, such as the plurality of Bowden cables 206, one of the plurality of control devices 244 includes the cable tension control device 272 (see FIGS. 11A-11C), such as in the form of the tensioner assembly 274 (see FIGS. 11A-11C), and is designed to control a tension 276 (see FIG. 1B) of one or more of the plurality of cables 204, such as the plurality of Bowden cables 206.

As shown in FIG. 11C, in one version, the control device 244, such as the cable tension control device 272, for example, the tensioner assembly 274, comprises a base plate 349, such as a metal base plate, with brackets 350 coupled, or attached, to the base plate 349, with fittings 352 coupled, or attached, to the brackets 350, with wire loops 354 coupled, or attached, to the fittings 352, and with turnbuckles 356 coupled, or attached, between the wire loops 354 and between the brackets 350 and the fittings 352. As shown in FIG. 11C, each connector element 202, such as the cable 204, for example, the Bowden cable 206, is inserted through a fitting 352 and a bracket 350 on each side of the base plate 349, is crimped with the wire loops 354, and is tightened or loosened with the turnbuckle 356. As shown in FIG. 11C, the cable tension control device 272, such as the tensioner assembly 274, is coupled, or attached, to frame portions 345 on a side 357 of the portable structure 242, such as the portable cart 242a.

As further show in FIGS. 11A-11C, the operator workstation 238 comprises two counterbalance devices 278 coupled, or attached, to a frame portion 345 on the side 357 of the portable structure 242, such as the portable cart 242a. The two counterbalance devices 278 comprise a first counterbalance device 278a (see FIGS. 11B, 13) and a second counterbalance device 278b (see FIGS. 11B, 13). Each counterbalance device 278 has a housing 358 (see FIGS. 11B-11C), such as a U-shaped housing, that is coupled, or attached, to the frame portion 345, via a connector bracket 360 (see FIG. 11B). Each counterbalance device 278 comprises a pulley and cable assembly 198 (see FIGS. 11B-

Figure 13:
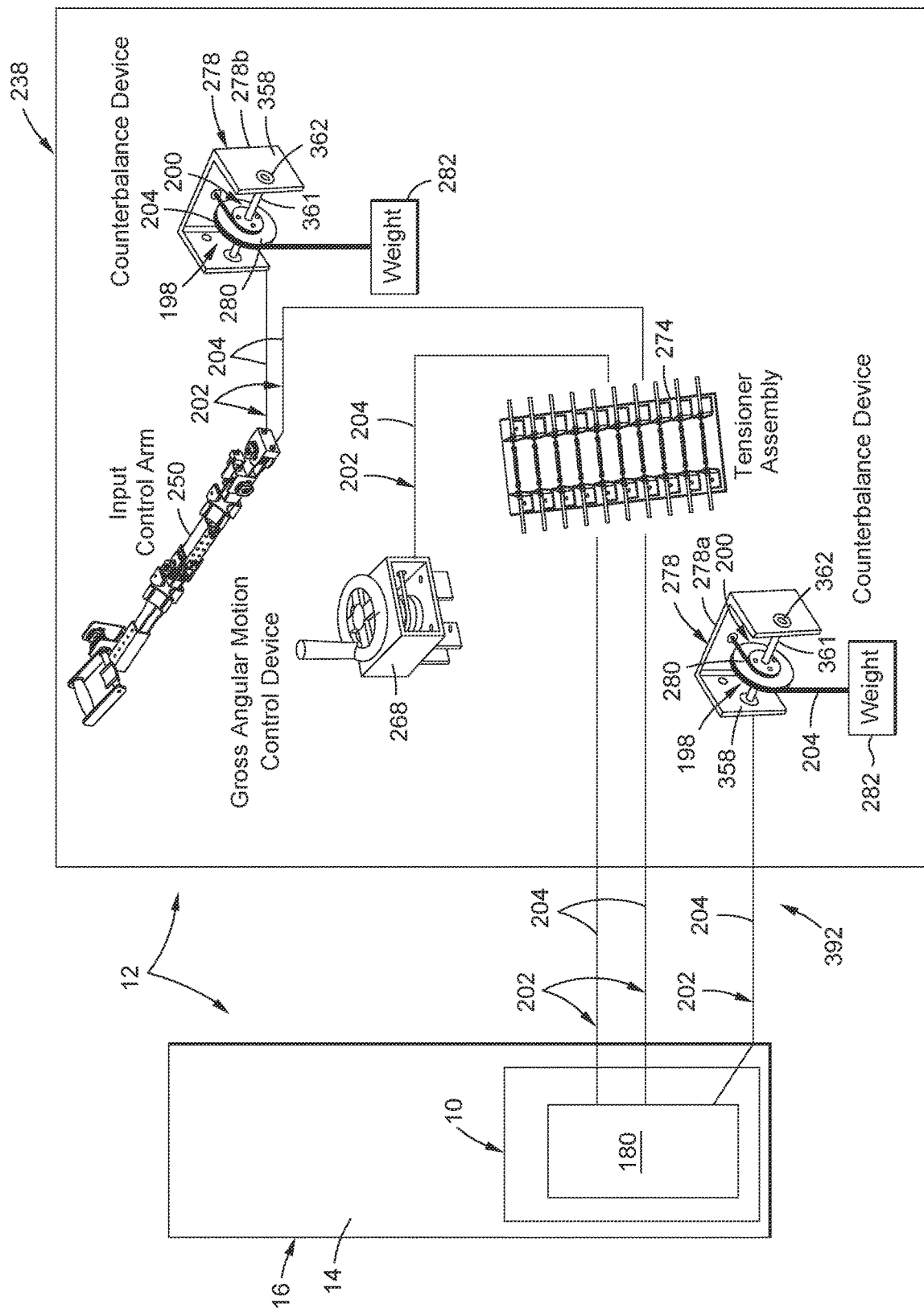
FIG. 13 is an illustration of a schematic diagram of a version of a cable system used in a version of a mechanical avatar system of the disclosure.

11C), such as a counterbalance pulley and cable assembly 280 (see FIGS. 11B-11C), with a pulley 200 (see FIG. 11C) coupled to one or more cables 204 (see FIG. 11C). The pulley and cable assembly 198, such as the counterbalance pulley and cable assembly 280, is housed in the housing 358, and is coupled to the housing 358, via a rod 361 (see FIGS. 11C, 13). The rod 361 is inserted through the center of the pulley 200 and through openings 362 (see FIGS. 11C, 13) in the sides of the housing 358. As shown in FIG. 11C, each counterbalance device 278 has a weight 282 coupled to the cable 204. As shown in FIG. 13, the counterbalance device 278, such as the first counterbalance device 278a, counterbalances the articulating avatar arm weight 284 (see FIG. 1B) of the articulating avatar arm 180, and the counterbalance device 278, such as the second counterbalance device 278b, counterbalances the input control arm weight 285 (see FIG. 1B) of the input control arm 250.

As further shown in FIGS. 11A-11C, the operator workstation 238 includes one or more guide attachments 364 coupled, or attached, at one or more locations on the frame portions 345 of the portable structure 242, such as the portable cart 242a. The guide attachments 364 are designed to guide and hold the connector elements 202, such as the cables 204, for example, the Bowden cables 206, along one or more frame portions 345 of the portable structure 242, such as the portable cart 242a.

As further shown in FIGS. 11A-11C, the operator workstation 238 includes an air prep (preparation) unit 366, such as in the form of an air filter-regulator-lubricator unit 366a, for filtering, regulating, and sometimes lubricating the air 148 (see FIG. 1B), such as the shop air 148a (see FIG. 1B), for example, compressed air. The air prep unit 366, such as in the form of the air filter-regulator-lubricator unit 366a, is coupled to the air supply 150 (see FIG. 1B) of air 148, such as the shop air 148a, for example, compressed air. The air supply 150 (see FIG. 1B) may be located at or near the operator workstation 238. The air prep unit 366, such as in the form of the air filter-regulator-lubricator unit 366a, is also coupled to the drive assembly 136, such as the pneumatic drive assembly 136a, via air flow tubes, air flow pipes, or another suitable air flow device, to supply clean and dry air to the drive assembly 136 (see FIG. 1A), such as the pneumatic drive assembly 136a (see FIG. 1A), for example, to the air motor 138 (see FIG. 1A), or to the air cylinder 164 of the brake assembly 162. The air prep unit 366, such as in the form of the air filter-regulator-lubricator unit 366a, is preferably designed to provide, and provides, a steady flow of clean and dry air to operate and protect the pneumatic components of the drive assembly 136, such as the pneumatic drive assembly 136a. In this version, the filtering component, the regulator component, and the lubricator component are integrated into a single unit. However, in other versions, one or more of the filtering component, the regulator component, and the lubricator component may be separated and positioned at separate locations on or near the portable structure 242, such as the portable cart 242a. As shown in FIG. 11C, the air prep unit 366, such as in the form of an air filter-regulator-lubricator unit 366a, is coupled, or attached, to a frame portion 345 of the portable structure 242, such as the portable cart 242a.

As further shown in FIGS. 11A-11C, the portable structure 242, such as the portable cart 242a, of the operator workstation 238 comprises a shelf 368 to hold the input control arm 250, tools 224 for attachment to the end effector 222, or other parts or components used in the mechanical avatar system 12. Although one shelf 368 is shown in FIGS. 11A-11C, the portable structure 242, such as the portable cart 242a, may comprise more than one shelf 368.

As shown in FIGS. 11A-11C, the input control arm 250 is coupled, or attached, to the portable structure 242, such as the portable cart 242a. As shown in FIGS. 11B-11C, the input control arm 250 comprises a first end 370, such as a forward end 370a, a second end 372, such as an aft end 372a, and a body 374 formed between the first end 370 and the second end 372. As shown in FIGS. 11B-11C, the second end 372, such as the aft end 372a, is coupled, or attached, to an input control arm interface element 376. The input control arm interface element 376 is designed to couple, or attach, the input control arm 250, via a mounting bracket 377 (see FIG. 11C), to a frame portion 345 on a back end 378 (see FIG. 11C) of the portable structure 242, such as the portable cart 242a. As shown in FIG. 11C, the input control arm 250 further includes arm support elements 380, such as a first arm support element 380a and a second arm support element 380b, attached to the input control arm 250, and a wrist support interface element 388 attached to a handle 382.

Figure 12A:
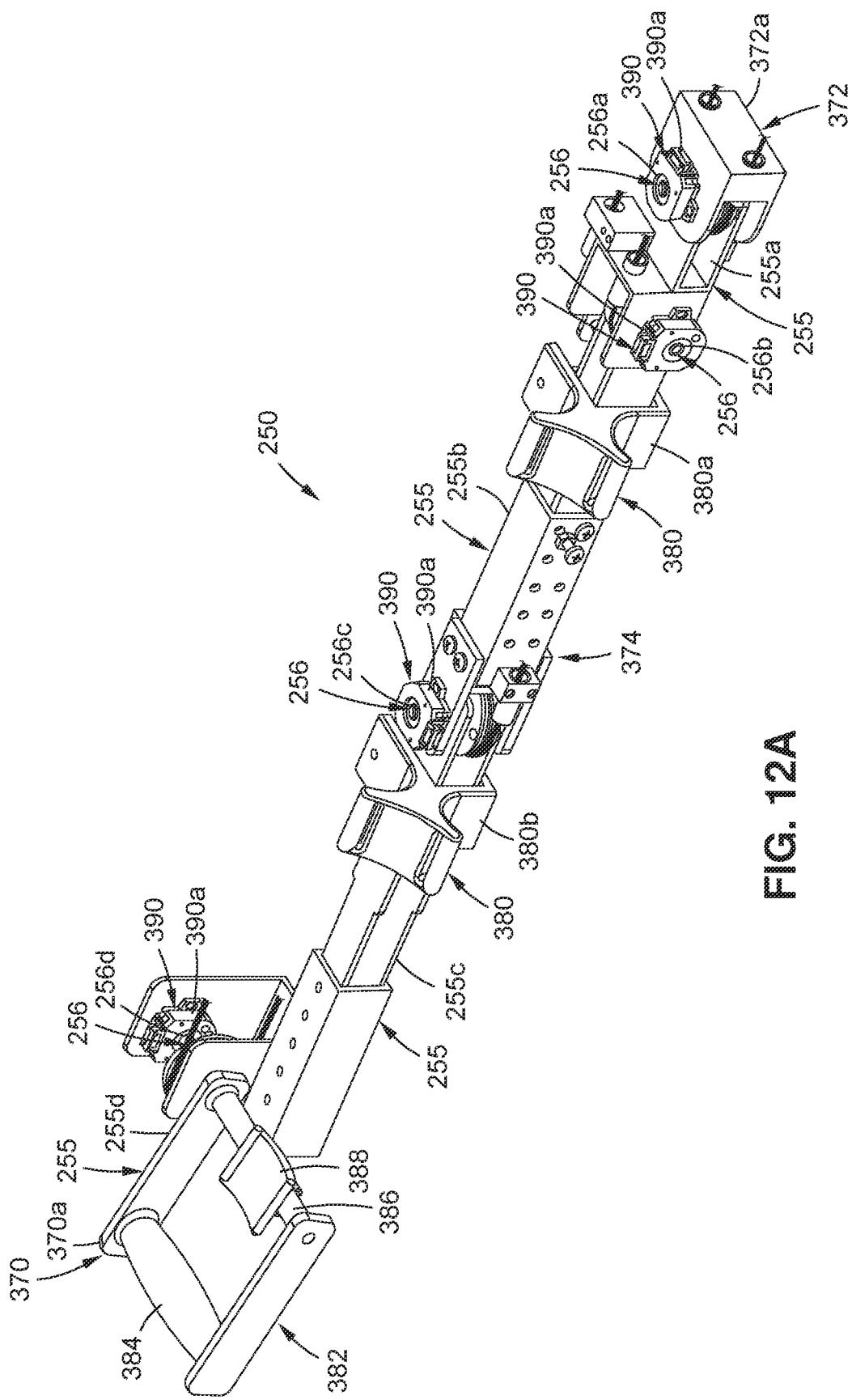
FIG. 12A is an illustration of a right perspective view of an exemplary version of an input control arm with arm support elements attached.
Figure 12B:
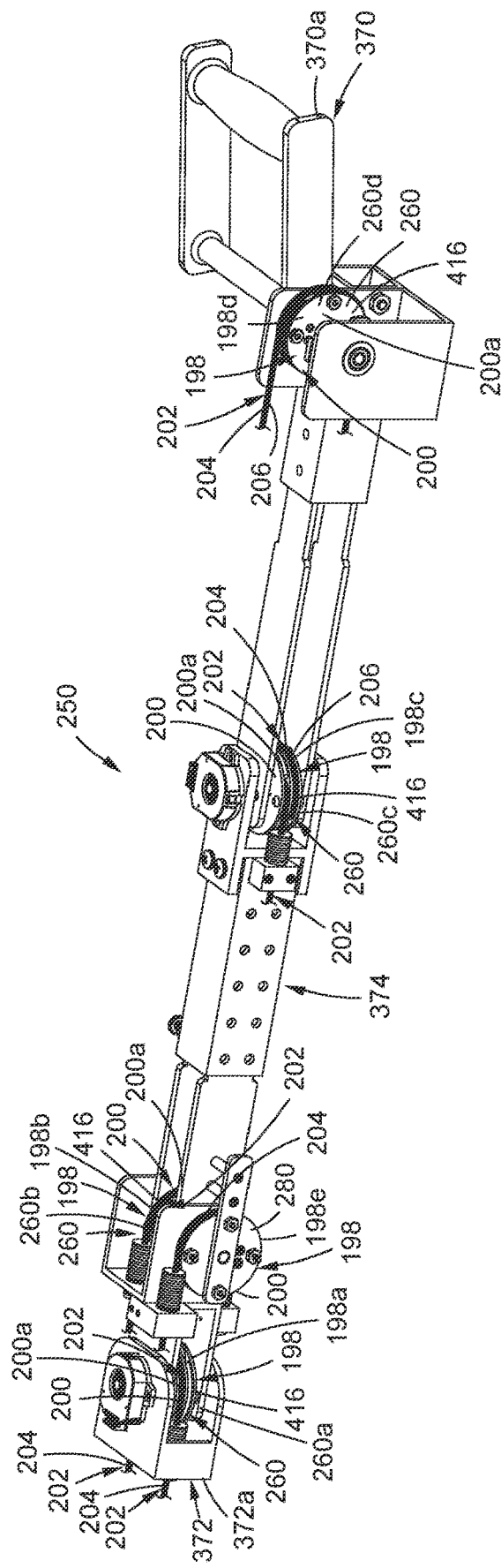
FIG. 12B is an illustration of a left perspective view of the input control arm of FIG. 12A without the arm support elements attached.
Figure 12C:
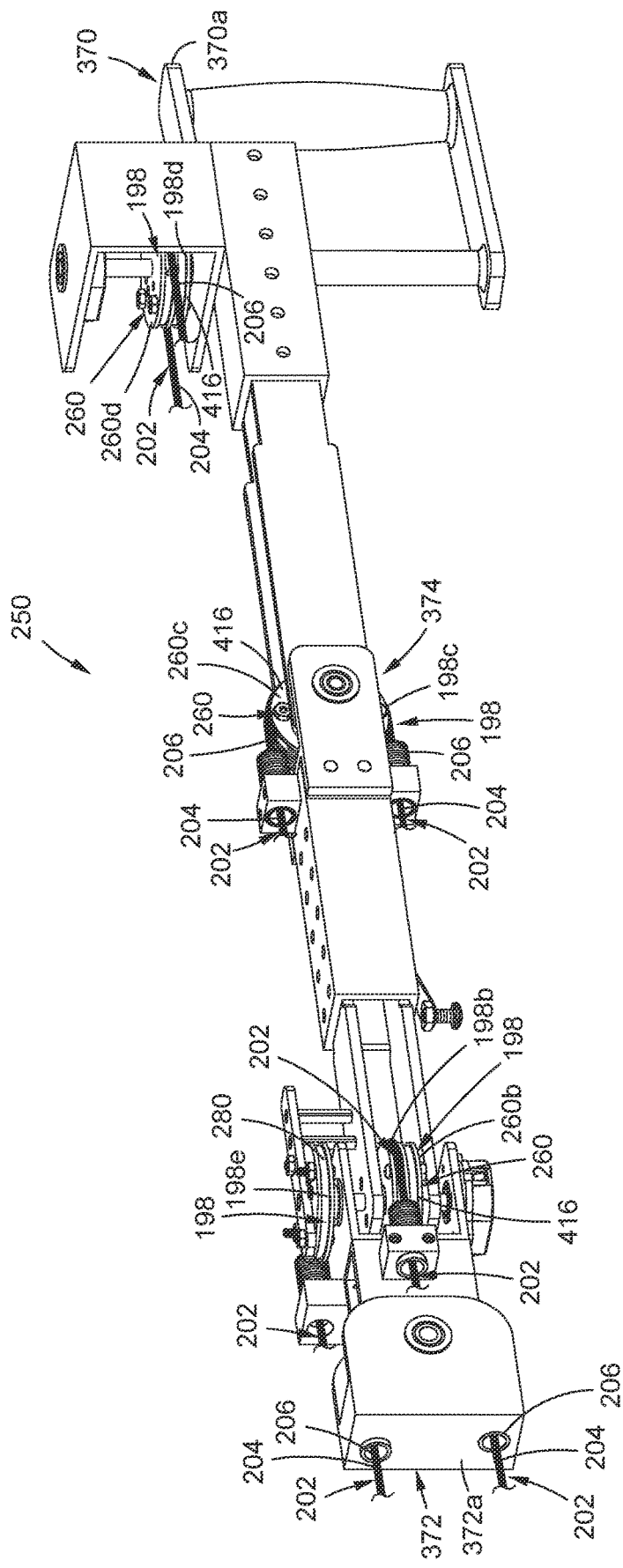
FIG. 12C is a bottom perspective view of the input control arm of FIG. 12B.

Now referring to FIGS. 12A-12C, FIG. 12A is an illustration of a right perspective view of an exemplary version of an input control arm 250 with arm support elements 380 attached, including the first arm support element 380a and the second arm support element 380b. FIG. 12B is an illustration of a left perspective view of the input control arm 250 of FIG. 12A without the arm support elements 380 attached. FIG. 12C is a bottom perspective view of the input control arm 250 of FIG. 12B.

As shown in FIGS. 12A-12C, the input control arm 250 comprises the first end 370, such as the forward end 370a, the second end 372, such as the aft end 372a, and the body 374 formed between the first end 370 and the second end 372. As shown in FIG. 12A, the body 374 of the input control arm 250 comprises the plurality of input control arm (ICA) mechanical links 255 (see also FIG. 1B). The plurality of input control arm mechanical links 255 are preferably movable links 192 (see FIG. 1A). As shown in FIG. 12A, in one version, the plurality of input control arm mechanical links 255 comprise a first input control arm mechanical link 255a, a second input control arm mechanical link 255b, a third input control arm mechanical link 255c, and a fourth input control arm mechanical link 255d. In other versions, the input control arm 250 may have one to three input control arm mechanical links 255, or greater than four input control arm mechanical links 255. Preferably, the first input control arm mechanical link 255a corresponds to a shoulder of a human operator 248a, and corresponds to the first mechanical link 190a (see FIG. 2) of the articulating avatar arm 180. Preferably, the second input control arm mechanical link 255b corresponds to an upper arm or bicep of a human operator 248a, and corresponds to the second mechanical link 190b (see FIG. 2) of the articulating avatar arm 180. Preferably, the third input control arm mechanical link 255c corresponds to a forearm of a human operator 248a, and corresponds to the third mechanical link 190c (see FIG. 2) of the articulating avatar arm 180. Preferably, the fourth input control arm mechanical link 255d corresponds to a hand of a human operator 248a, and corresponds to the fourth mechanical link 190d (see FIG. 2) of the articulating avatar arm 180.

The plurality of input control arm mechanical links 255 are preferably made of a high strength metal material or metal alloy, such as aluminum, steel, aluminum alloy, steel alloy, or another suitable high strength metal material or metal alloy. The high strength metal material used for the plurality of input control arm mechanical links 255 is preferably chosen based on weight and rigidity requirements.

As shown in FIG. 12A, the first arm support element 380a is coupled, or attached, to the second input control arm mechanical link 255b, and the second arm support element 380b is coupled, or attached, to the third input control arm mechanical link 255c. Although two arm support elements 380 are shown attached to the input control arm 250 in FIG. 12A, the input control arm 250 may have one arm support element 380, more than two arm support elements 380, or no arm support elements 380 coupled, or attached, to the input control arm 250. The arm support elements 380 may comprise padded ergonomic arm supports made of plastic and having a padded surface. The arm support elements 380 have an ergonomic design for comfortable operation. Each arm support element 380 may have an attachable/detachable strap (not shown) attached the arm support element 380 to secure the operator's 248 arm to the arm support element 380.

As shown in FIGS. 12A-12C, the fourth input control arm mechanical link 255d may be in the form of a handle 382 with a grip portion 384 and a wrist support rod 386. As shown in FIG. 12A, a wrist support interface element 388 may be optionally coupled, or attached, to the wrist support rod 386 of the handle 382, to provide additional support for the wrist of an operator 248, such as the human operator 248a. The wrist support interface element 388 may comprise a padded ergonomic wrist support made of plastic and having a padded surface. The wrist support interface element 388 has an ergonomic design for comfortable operation.

As shown in FIG. 12A, the input control arm 250 further comprises a plurality of input control arm joints 256 (see also FIG. 1B) coupling the plurality of input control arm mechanical links 255 together. As shown in FIG. 12B, in one version, the plurality of input control arm joints 256 comprise a first input control arm joint 256a, a second input control arm joint 256b, a third input control arm joint 256c, and a fourth input control arm joint 256d. In other versions, the input control arm 250 may have one input control arm joint 256 to three input control arm joints 256, or greater than four input control arm joints 256. Preferably, the first input control arm joint 256a and the second input control arm joint 256b correspond to a shoulder joint of a human operator 248a, and correspond to the first joint 194a (see FIG. 2) and the second joint 194b (see FIG. 2) of the articulating avatar arm 180. Preferably, the third input control arm joint 256c corresponds to an elbow joint of a human operator 248a, and corresponds to the third joint 194c (see FIG. 2) of the articulating avatar arm 180. Preferably, the fourth input control arm joint 256d corresponds to a wrist joint of a human operator 248a, and corresponds to a fourth joint 194d (see FIG. 2) of the articulating avatar arm 180. The plurality of input control arm joints 256 may be in the form of hinged joints, rotational joints, articulated joints, or another suitable type of joint. Each of the plurality of input control arm joints 256 has a rotating shaft 258 (see FIG. 12B).

As shown in FIG. 12A, the input control arm 250 may further optionally comprise a plurality of sensor devices 390, such as the rotary encoder device 390a, coupled, or attached, to one or more input control arm joints 256. As shown in FIG. 12A, the input control arm 250 may comprise the sensor device 390, such as the rotary encoder device 390a, coupled, or attached, at the first input control arm joint 256a, the second input control arm joint 256b, the third input control arm joint 256c, and the fourth input control arm joint 256d. As discussed above, the sensor devices 197, 390, such as the rotary encoder devices 197a, 390a, are a type of position sensor used for determining the angular position of the rotating shaft 258. The rotary encoder device 390a is an electro-mechanical device that converts the angular position or motion of the rotating shaft 258 to analog or digital output signals.

As shown in FIG. 12B, the input control arm 250 further comprises a plurality of input control arm actuator assemblies 260 (see also FIG. 1B). Preferably, one or more input control arm actuator assemblies 260 is/are coupled at each input control arm joint 256 (see FIG. 12A), to actuate one or more of the input control arm mechanical links 255 (see FIG. 12A), when moved by the operator 248 (see FIG. 11A), such as the human operator 248a (see FIG. 11A). In one version, as shown in FIG. 12B, the input control arm actuator assemblies 260 comprise a first input control arm actuator assembly 260a, a second input control arm actuator assembly 260b, a third input control arm actuator assembly 260c, a fourth input control arm actuator assembly 260d, and a fifth input control arm actuator assembly 260e. In other versions, the input control arm 250 may have one input control arm actuator assembly 260 to three input control arm actuator assemblies 260, or greater than five input control arm actuator assemblies 260.

The plurality of input control arm actuator assemblies 260 may be in the form of the plurality of pulley and cable assemblies 198 (see FIG. 12B), the plurality of water-driven hydraulic piston assemblies 199 (see FIG. 1B), or another suitable actuator assembly. Preferably, one or more pulley and cable assemblies 198, one or more water-driven hydraulic piston assemblies 199, or another suitable actuator assembly, is/are coupled at each input control arm joint 256 (see FIG. 12A), to actuate one or more of the input control arm mechanical links 255 (see FIG. 12A), via the operator movements 270 (see FIG. 1B).

As shown in FIG. 12B, in one version, the plurality of input control arm actuator assemblies 260 comprise a plurality of pulley and cable assemblies 198 comprising a first pulley and cable assembly 198a, a second pulley and cable assembly 198b (see also FIG. 12C), a third pulley and cable assembly 198c (see also FIG. 12C), and a fourth pulley and cable assembly 198d (see also FIG. 12C), preferably, all in the form of a sandwich pulley and cable assembly 416 (see also FIGS. 15A-15B). As shown in FIG. 12B, each sandwich pulley and cable assembly 416 comprises a pulley 200, such as in the form of a sandwich pulley 200a. The sandwich pulley 200a structure is discussed in further detail below with respect to FIGS. 15A-15B. In other versions, the input control arm 250 may have one sandwich pulley and cable assembly 416 to three sandwich pulley and cable assembly 416, or greater than four sandwich pulley and cable assembly 416.

As shown in FIGS. 12B-12C, the pulley and cable assembly 198 further comprises a pulley and cable assembly 198, such as a fifth pulley and cable assembly 198e, such as in the form of a counterbalance pulley and cable assembly 280. The counterbalance pulley and cable assembly 280, along with a weight 282 (see FIGS. 11C, 13), counterbalance an input control arm weight 285 (see FIG. 1B) of the input control arm 250. As shown in FIG. 12B, the counterbalance pulley and cable assembly 280 comprises a pulley 200 coupled to a cable 204.

As shown in FIGS. 12B-12C, each pulley and cable assembly 198 further comprises one or more connector elements 202, such as in the form of cables 204, for example, Bowden cables 206, coupled, or attached, to the pulley 200

(see FIG. 12B). Each sandwich pulley 200a, as shown in FIG. 12B, has two cables 204 coupled, or attached, to each sandwich pulley 200a. In one version, as shown in FIG. 12B, the cables 204 comprise one or more Bowden cables 206. The Bowden cable 206 structure is discussed in further detail below with respect to FIG. 15C. The cables 204, such as in the form of Bowden cables 206, may be secured and managed with a cable holder apparatus 208 (see FIG. 16A). The cable holder apparatus 208 structure is discussed in further detail below with respect to FIGS. 16A-16E. For the water-driven hydraulic piston assemblies 199, the one or more connector elements 202 comprise tubes 207 (see FIG. 1B), or flexible pipes.

The input control arm 250 is mechanically coupled to the articulating avatar arm 180 with the plurality of connector elements 202 (see FIG. 11A), to remotely and directly control the articulating avatar arm 180, in real time. The articulating avatar arm 180 mimics one or more motions 252 (see FIG. 1B) of the input control arm 250 operated by the operator 248, such as the human operator 248a. The input control arm 250 is operated by the operator 248, to remotely and directly control the articulating avatar arm 180, by mechanically actuating the one or more input control arm actuator assemblies 260 coupled to, and corresponding to, the one or more actuator assemblies 196 of the articulating avatar arm 180, to cause the articulating avatar arm 180 to mimic the one or more motions 252 (see FIG. 1B) of the input control arm 250, and to orient the articulating avatar arm 180 to a desired orientation 262 (see FIG. 1B). The input control arm 250 is able to accommodate a wide range of arm lengths of the operator 248 (see FIG. 11A), such as the human operator 248a. The length of the second input control arm mechanical link 255b, such as the upper arm, of the input control arm 250 is preferably in a range of 9 inches long to 12.3 inches long. However, the second input control arm mechanical link 255b, such as the upper arm, may also be another suitable length. The length of the third input control arm mechanical link 255c, such as the forearm, of the input control arm 250 is preferably in a range of 8.6 inches long to 11.6 inches long. However, the third input control arm mechanical link 255c, such as the forearm, may also be another suitable length.

Now referring to FIG. 13, FIG. 13 is an illustration of a schematic diagram of a version of a cable system 392 used in a version of a mechanical avatar system 12 of the disclosure. FIG. 13 shows the connector elements 202, such as the cables 204, of the cable system 392 connected between the operator workstation 238 and the mechanical avatar assembly 10 located in the confined space 14 in the structure 16. FIG. 13 shows connector elements 202, such as cables 204, connected between the mechanical avatar assembly 10, such as the articulating avatar arm 180 (see FIGS. 2, 11A) of the mechanical avatar assembly 10, and the tensioner assembly 274, and between the tensioner assembly 274 and the input control arm 250, and between the tensioner assembly 274 and the gross angular motion control device 268. FIG. 13 further shows the connector element 202, such as the cable 204, connected between the mechanical avatar assembly 10, such as the articulating avatar arm 180 (see FIGS. 2, 11A) of the mechanical avatar assembly 10, and the counterbalance device 278, such as the first counterbalance device 278a, having a weight 282. FIG. 13 further shows the connector element 202, such as the cable 204, connected between the input control arm 250 and the counterbalance device 278, such as the second counterbalance device 278b, having a weight 282. The counterbalance device 278, such as the first counterbalance device 278a, counterbalances the articulating avatar arm weight 284 (see FIG. 1B) of the articulating avatar arm 180, and the counterbalance device 278, such as the second counterbalance device 278b, counterbalances the input control arm weight 285 (see FIG. 1B) of the input control arm 250. As shown in FIG. 13, each of the counterbalance devices 278 comprises the pulley and cable assembly 198, such as the counterbalance pulley and cable assembly 280, comprising the pulley 200 coupled to one or more cables 204.

As shown in FIG. 13, each of the counterbalance devices 278 further comprises the housing 358 that houses the pulley and cable assembly 198, such as the counterbalance pulley and cable assembly 280, and further comprises the rod 361 coupled to the openings 362 of the housing 358. As shown in FIG. 13, the pulley 200 of each counterbalance device 278 is inserted through the rod 361.

Now referring to FIG. 14A, FIG. 14A is an illustration of a right perspective view of a gross angular motion control device 268 used in a version of a mechanical avatar system 12 (see FIGS. 1B, 11A) of the disclosure. As shown in FIG. 14A, the gross angular motion control device 268 comprises a gross angular motion wheel 394 with a handle 396, such as in the form of a tapered handle. The gross angular motion wheel 394 is coupled, or attached, to a box housing 398 (see FIG. 14A). In one version, as shown in FIG. 14A, the box housing 398 has one or more open sides 400. In another version, the box housing 398 is closed. The box housing 398 houses a pulley and cable assembly 198 (see FIG. 14A), such as a gross angular motion pulley and cable assembly 402 (sere FIG. 14A). The pulley and cable assembly 198, such as the gross angular motion pulley and cable assembly 402, is coupled to the base portion 188 (see FIG. 14B) of the articulating avatar arm 180 (see FIG. 14B), to enable about 300 (three hundred) degrees of motion 254 (see FIG. 1B) of the articulating avatar arm 180 with a range of 0 (zero) degrees to 90 (ninety) degrees of operator movement 270 (see FIG. 1B) by the operator 248 (see FIG. 11A). As shown in FIG. 14A, the pulley and cable assembly 198, such as the gross angular motion pulley and cable assembly 402, comprises a pulley 200, such as in the form of a sandwich pulley 200a, attached to cables 204, such as Bowden cables 206. The pulley 200, such as the sandwich pulley 200a, inside the box housing 398, drives the cables 204, such as the Bowden cables 206, to connect to the base portion 188 of the articulating avatar arm 180, of the mechanical avatar assembly 10 (see FIG. 14B).

As shown in FIG. 14A, the box housing 398 is attached to a frame portion 345 of the frame 344 (see FIG. 11A) of the portable structure 242 (see FIG. 11A), such as the portable cart 242a (see FIG. 11A), with one or more mounting brackets 404. As shown in FIG. 14A, to operate the gross angular motion control device 268, the handle 396 is pulled in an upward direction 406, and the gross angular motion wheel 394 is rotated in a rotation direction 408a by the operator 248. The gross angular motion control device 268 acts as an angle indexing system and allows the operator 248 (see FIG. 11A) to rotate the articulating avatar arm 180 (see FIGS. 10C, 11A) and work on all sides of the interior 20 (see FIGS. 10C, 11A) of the confined space 14 (see FIGS. 10C, 11A) of the structure 16 (see FIGS. 10C, 11A), without needing to move the input control arm 250 (see FIGS. 11A, 12A-12C).

Figure 14C:
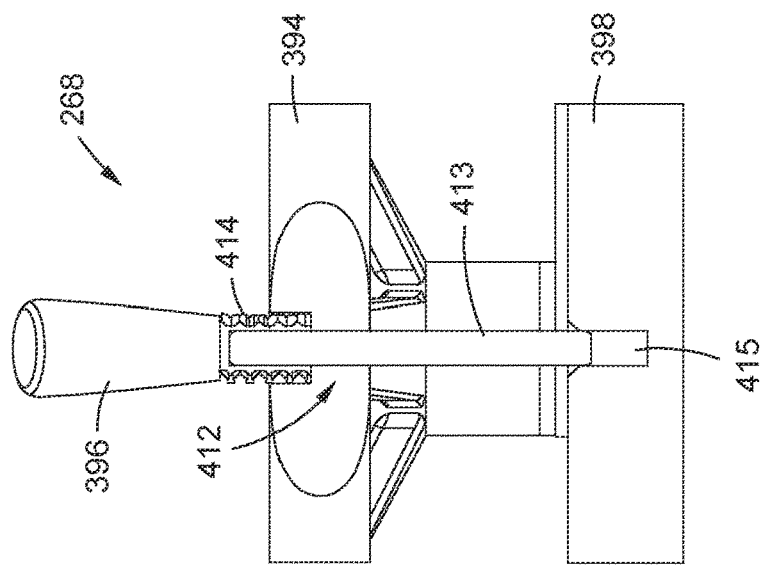
FIG. 14C is an illustration of a cross-sectional front view of the gross angular motion control device of FIG. 14A.
Figure 14B:
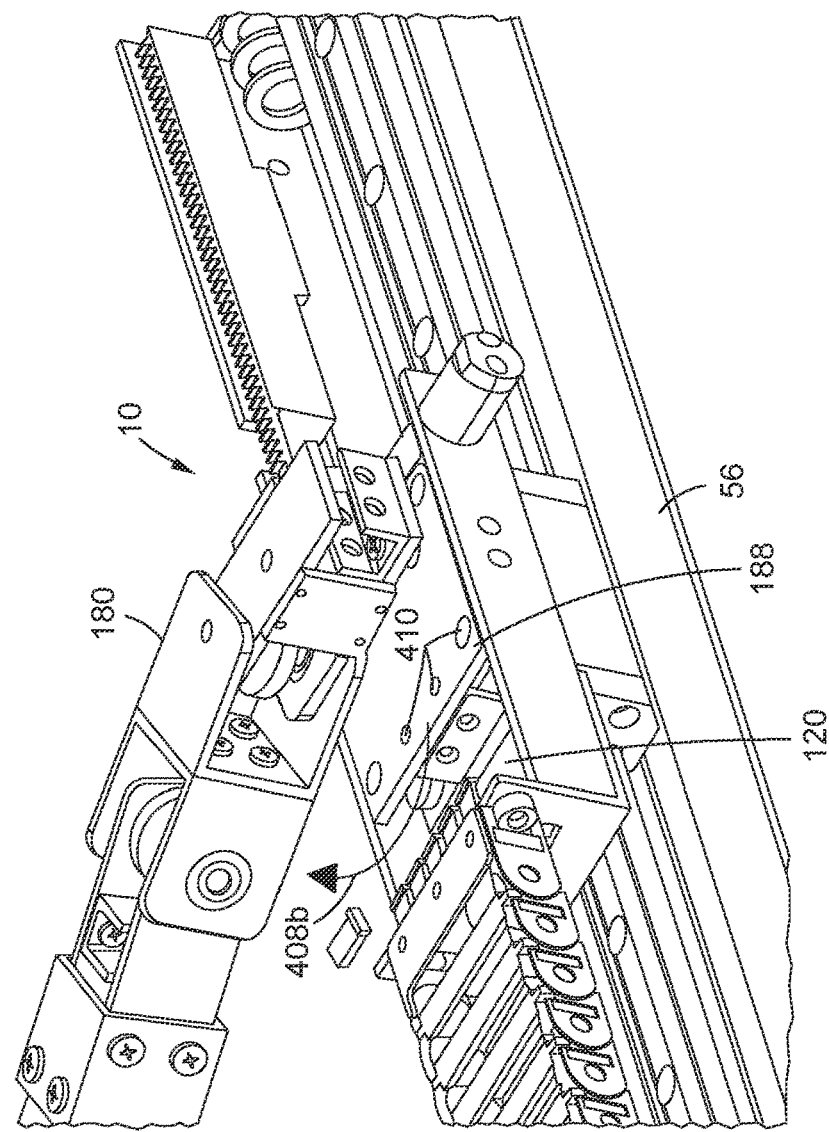
FIG. 14B is an illustration of an enlarged left perspective view of an articulating avatar arm of an exemplary version of a mechanical avatar assembly of the disclosure, showing a rotation direction corresponding to a rotation direction of the gross angular motion control device of FIG. 14A.

Now referring to FIG. 14B, FIG. 14B is an illustration of an enlarged left perspective view of an articulating avatar arm 180 of an exemplary version of the mechanical avatar assembly 10 (see also FIG. 1A) of the disclosure, showing a rotation direction 408b of the base portion 188 of the articulating avatar arm 180, corresponding to the rotation direction 408a of the gross angular motion control device 268 of FIG. 14A. The rotation of the gross angular motion wheel 394 rotates the base portion 188 of the articulating avatar arm 180, and the rotation direction 408b of the base portion 188 of the articulating avatar arm 180 mimics the rotation direction 408a of the gross angular motion wheel 394. As shown in FIG. 14B, multiple attachment elements 410, such as screws, are used to secure the base portion 188 to the carriage portion 120 of the rail assembly 56 of the mechanical avatar assembly 10.

Now referring to FIG. 14C, FIG. 14C is an illustration of a cross-sectional front view of the gross angular motion control device 268 of FIG. 14A. FIG. 14C shows the gross angular motion wheel 394 with the handle 396 and the box housing 398. As further shown in FIG. 14C, in one version, the handle 396 is coupled to a spring-loaded pin assembly 412 comprising a dowel pin 413 coupled to a spring element 414, such as a wave spring or other suitable spring element. The spring-loaded pin assembly 412 is designed to move up and down, and in and out of, a recessed opening 415 in the box housing 398. The operator 248 (see FIG. 11A) retracts the dowel pin 413 of the spring-loaded pin assembly 412, to rotate the gross angular motion wheel 394 in a desired rotation direction.

Now referring to FIGS. 15A-15B, FIG. 15A is an illustration of a perspective view of a pulley and cable assembly 198, such as in the form of a sandwich pulley and cable assembly 416, in an assembled configuration 418, that may be used in a version of a mechanical avatar system 12 (see FIGS. 1B, 11A) of the disclosure. FIG. 15B is an illustration of an exploded perspective view of the pulley and cable assembly 198, such as in the form of the sandwich pulley and cable assembly 416, in a disassembled configuration 420. As shown in FIG. 15A, the pulley and cable assembly 198, such as in the form of the sandwich pulley and cable assembly 416, is installed at a joint 422 between links 424.

As shown in FIGS. 15A-15B, the pulley and cable assembly 198, such as in the form of the sandwich pulley and cable assembly 416, comprises a pulley 200, such as a sandwich pulley 200a, coupled to two connector elements 202, such as cables 204, for example, Bowden cables 206. As further shown in FIGS. 15A-15B, the pulley 200, such as the sandwich pulley 200a, comprises a plurality of pulley plates 425 stacked on top of each other in a sandwich configuration 426.

As shown in FIG. 15B, the number of pulley plates 425 is five. However, the number of pulley plates 425 may be two pulley plates 425 to four pulley plates 425 in number, or greater than five pulley plates 425 in number. Each pulley plate 425 has a center through opening 428 (see FIG. 15B), attachment through openings 429, and a circumference 430 (see FIG. 15B). The center through opening 428 is configured to receive, and receives, a shaft 432 (see FIG. 15A), such as a rotating shaft, or pin, joining the links 424 and the pulley plates 425 at the joint 422. As shown in FIG. 15B, each attachment through opening 429 is configured to receive, and receives, an attachment element 434, such as a button head hex drive screw 434a, attached to a nut 435. As shown in FIG. 15B, each pulley plate 425 has four attachment through openings 429 formed through the pulley plate 425, and designed to receive, four attachment elements 434, such as four button head hex drive screws 434a, each attached to a nut 435. However, each pulley plate 425 may have one attachment through opening 429 to three attachment through openings 429 or greater than four attachment through openings 429.

As further shown in FIG. 15B, in one version, the pulley plates 425 comprise two channel pulley plates 425a and three non-channel pulley plates 425b. In other versions, the pulley plates 425 comprise greater than two channel pulley plates 425a, and/or greater than three non-channel pulley plates 425b. As shown in FIG. 15B, the channel pulley plates 425a each have a channel 436 formed inwardly from the circumference 430 of the pulley plate 425 toward, or near, the center through opening 428 of the pulley plate 425. As shown in FIG. 15B, each connector element 202, such as the cable 204, for example, the Bowden cable 206, enters the channel 436 and is secured by two securing elements 437, such as in the form of two set screws 437a, inserted into through holes 438 formed in the non-channel pulley plate 425b on the top and the non-channel pulley plate 425b on the bottom and formed in the channel pulley plates 425a. Each pulley plate 425 is preferably circular, or substantially circular, in profile, flat, and disk-shaped. Each pulley plate 425 is preferably made of a metal material, such as aluminum, steel, stainless steel, or another suitable metal material.

Figure 15C:
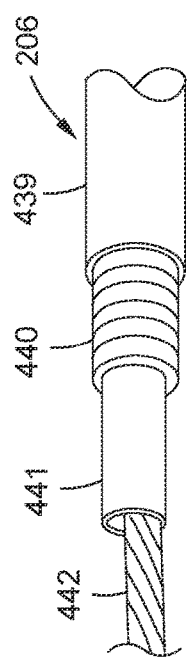
FIG. 15C is an illustration of a cutaway perspective view of an exemplary version of a Bowden cable for use in a sandwich pulley and cable assembly.

Now referring to FIG. 15C, FIG. 15C is an illustration of a cutaway perspective view of an exemplary version of a Bowden cable 206 for use with a version of the pulley and cable assembly 198, such as the sandwich pulley and cable assembly 416, of FIGS. 15A-15B, and/or for use with the pulley and cable assemblies 198 of the articulating avatar arm 180 of FIG. 2 and the pulley and cable assemblies 198 of the input control arm 250 of FIG. 12B, and the pulley and cable assembly 198 of the gross angular motion control device 268 of FIG. 14A. As shown in FIG. 15C, the exemplary Bowden cable 206 comprises an outer housing 439, a metal layer 440, an inner sleeve 441, and an inner cable 442. The outer housing 439, such as in the form of a hollow outer cable housing, preferably comprises a protective plastic or aluminum coating or sheath. The metal layer 440 preferably comprises a steel structure to provide strength to the Bowden cable 206. The inner sleeve 441 preferably comprises a flexible plastic or nylon lining to reduce friction. The inner cable 442 preferably comprises a longitudinally incompressible helical steel wire. As used herein, "Bowden cable" means a type of flexible cable used to transmit mechanical force or energy by the movement of an inner cable relative to an outer housing, such as a hollow outer cable housing.

Figure 15D:
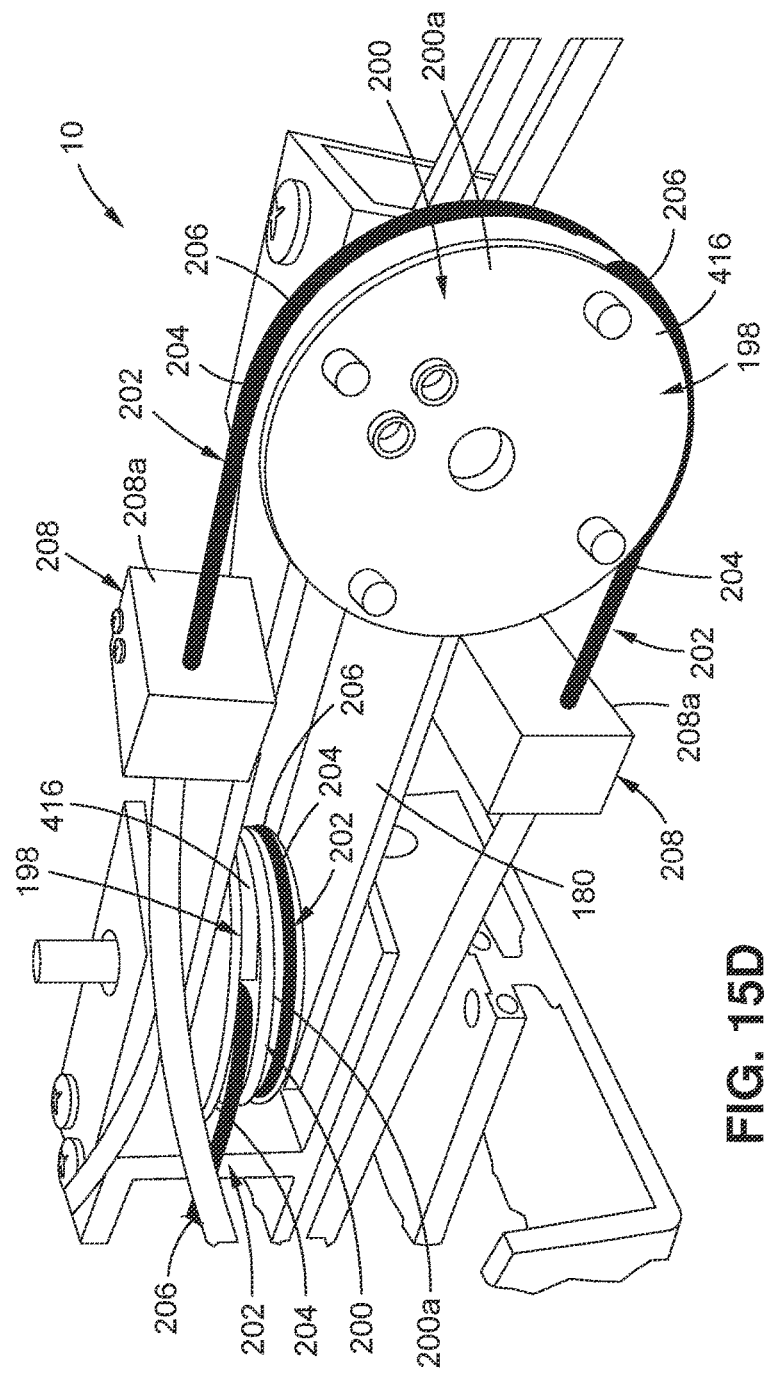
FIG. 15D is an illustration of an enlarged left perspective view of a version of a mechanical avatar assembly of the disclosure with sandwich pulley and cable assemblies.

Now referring to FIG. 15D, FIG. 15D is an illustration of an enlarged left perspective view of a version of a mechanical avatar assembly 10 of the disclosure with pulley and cable assemblies 198, such as sandwich pulley and cable assemblies 416. As shown in FIG. 15D, the pulley and cable assemblies 198, such as sandwich pulley and cable assemblies 416, are coupled to the articulating avatar arm 180 of the mechanical avatar assembly 10. As further shown in FIG. 15D, the pulley and cable assemblies 198, such as sandwich pulley and cable assemblies 416, each comprise a pulley 200, such as a sandwich pulley 200a, coupled to two connector elements 202, such as cables 204, in the form of Bowden cables 206. As further shown in FIG. 15D, one or more of the connector elements 202, such as the cables 204, in the form of the Bowden cables 206, is/are coupled to, and secured and managed with, the cable holder apparatus 208, such as in the form of a service loop cable holder 208a.

Figure 16A:
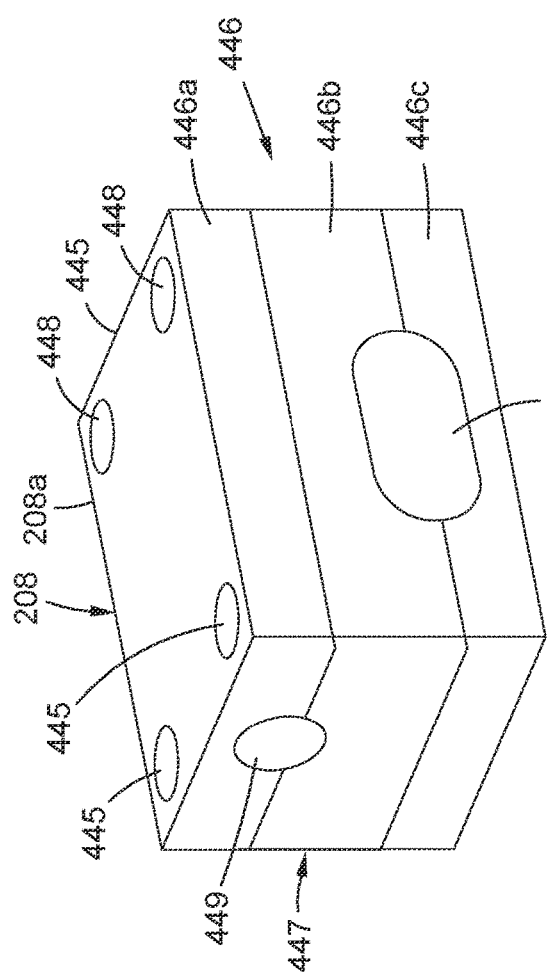
FIG. 16A is an illustration of a perspective view of a version of a cable holder apparatus that may be used with a version of a mechanical avatar system of the disclosure.
Figure 16B:
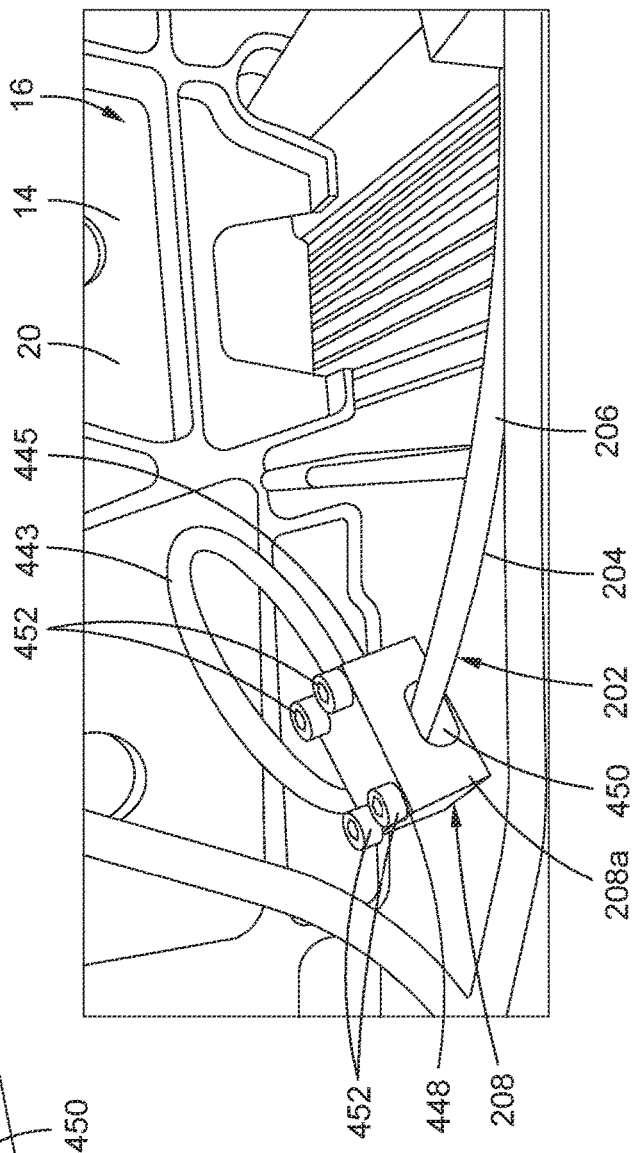
FIG. 16B is an illustration of a perspective view of the cable holder apparatus of FIG. 16A holding a cable.

Now referring to FIGS. 16A-16B, FIG. 16A is an illustration of a perspective view of a version of a cable holder apparatus 208, such as in the form of the service loop cable holder 208a, that may be used with a version of the mechanical avatar system 12 (see FIGS. 1B, 11A) of the disclosure. FIG. 16B is an illustration of a perspective view of the cable holder apparatus 208, such as in the form of the service loop cable holder 208a, of FIG. 16A holding a connector element 202, such as a cable 204, for example, a Bowden cable 206.

As shown in FIGS. 16A-16B, the cable holder apparatus 208, such as in the form of the service loop cable holder 208a, is preferably used to create a loop 443 (see FIG. 16B) at the second end 184 (see FIG. 2), such as the aft end 184a (see FIG. 2), of the articulating avatar arm 180 (see FIG. 2) to remove cable 204 that is loose along the articulating avatar arm 180. Preferably, all of the loose cable 204 is kept in the loop 443, and the loop 443 increases and decreases in size with bending movements of the articulating avatar arm 180. For example, the loop 443 increases in size with the connector element 202, such as the cable 204, for example, the Bowden cable 206, held loosely against the articulating avatar arm 180. The connector elements 202, such as the cables 204, for example, the Bowden cables 206, remain against the articulating avatar arm 180.

As shown in FIG. 16A, in one version, the cable holder apparatus 208, such as in the form of the service loop cable holder 208a, comprises a block 445 comprised of a plurality of segments 446, such as a first segment 446a, a second segment 446b, and a third segment 446c, where the first segment 446a, the second segment 446b, and the third segment 446c are in a stacked configuration 447. As shown in FIG. 16A, the block 445 of the cable holder apparatus 208, such as in the form of the service loop cable holder 208a, further comprises a plurality of screw holes 448 designed to clamp the plurality of segments 446 together, and further comprises a side through hole 449 designed to form a tight fit around a connector element 202 (see FIG. 16B), such as a cable 204 (see FIG. 16B), for example, a Bowden cable 206 (see FIG. 16B). As shown in FIG. 16A, the block 445 of the cable holder apparatus 208, such as in the form of the service loop cable holder 208a, further comprises a through slot 450 formed in the block 445, and designed to maintain the shape of the loop 443 while allowing some movement of the connector element 202 (see FIG. 16B), such as the cable 204 (see FIG. 16B), for example, the Bowden cable 206 (see FIG. 16B).

FIG. 16B shows the cable holder apparatus 208, such as in the form of the service loop cable holder 208a, in the interior 20 of a confined space 14 of a structure 16. FIG. 16B further shows the cable holder apparatus 208, such as in the form of the service loop cable holder 208a, comprising the block 445 with the through slot 450 and a plurality of screws 452 inserted in the screw holes 448. FIG. 16B further shows the connector element 202, such as the cable 204, for example, the Bowden cable 206, inserted through the through slot 450 and forming the loop 443.

Figure 16C:
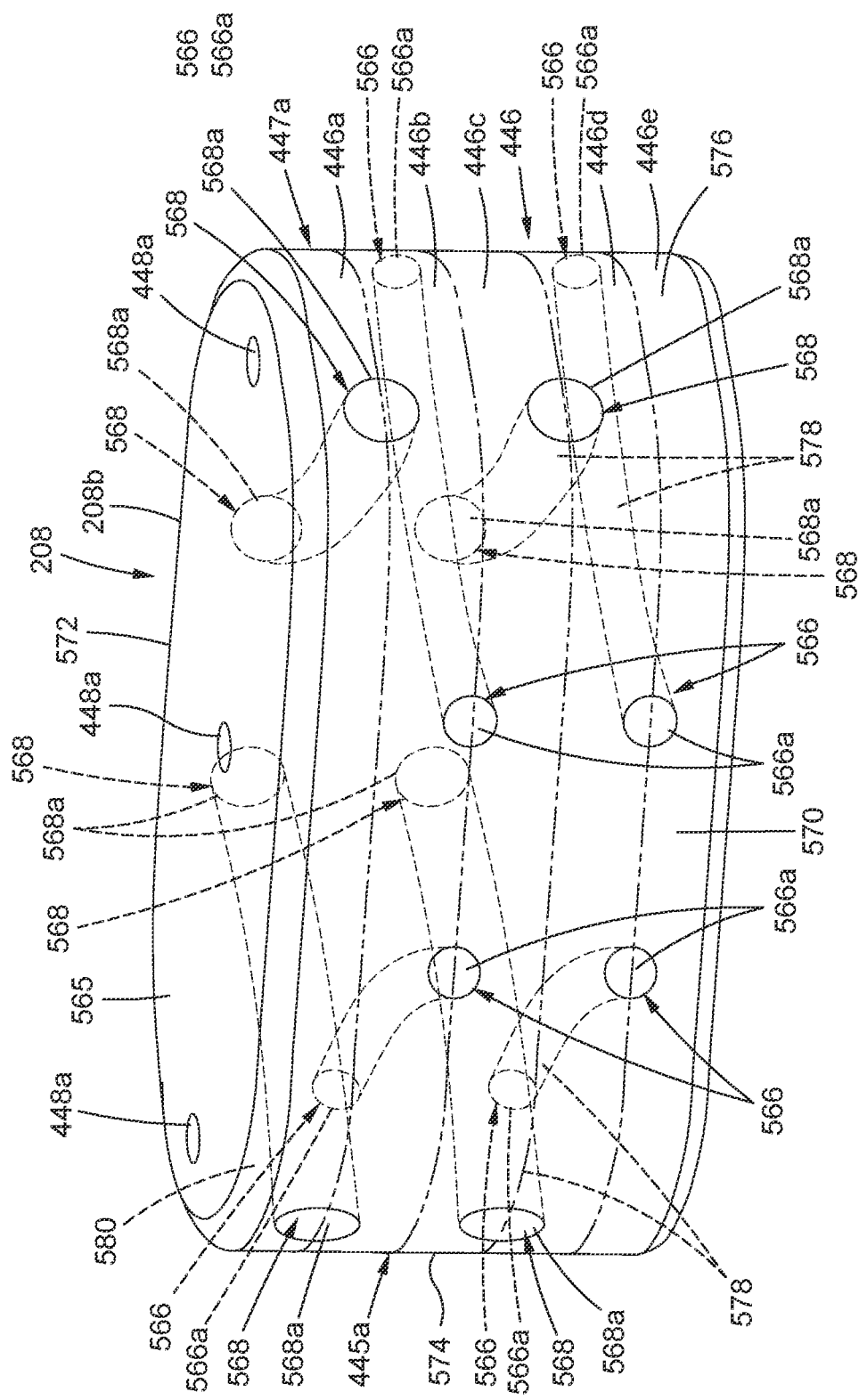
FIG. 16C is an illustration of a back perspective view of another version of a cable holder apparatus that may be used with a version of a mechanical avatar system of the disclosure.
Figure 16D:
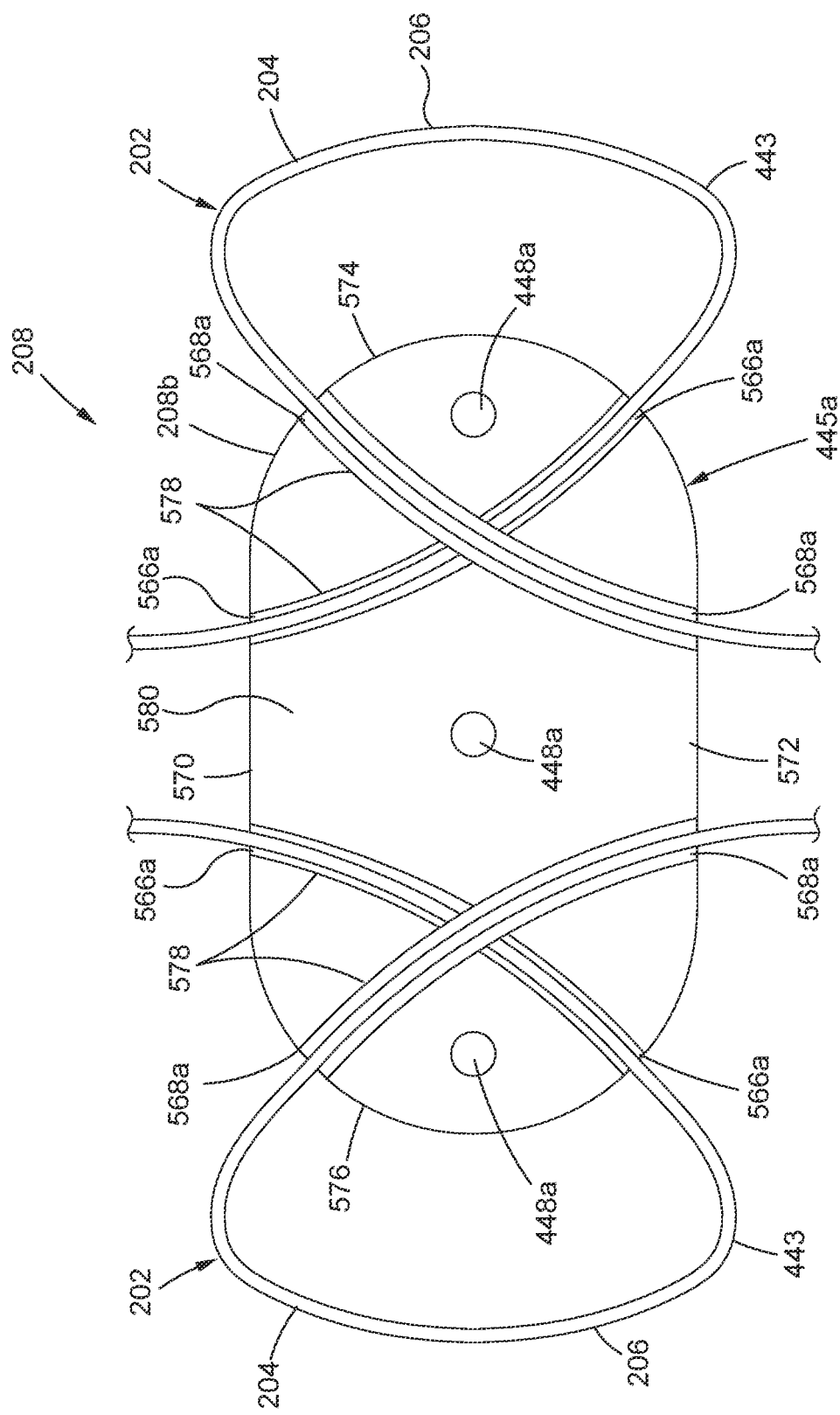
FIG. 16D is an illustration of a top cross-sectional view of the cable holder apparatus of FIG. 16C holding connector elements.
Figure 16E:
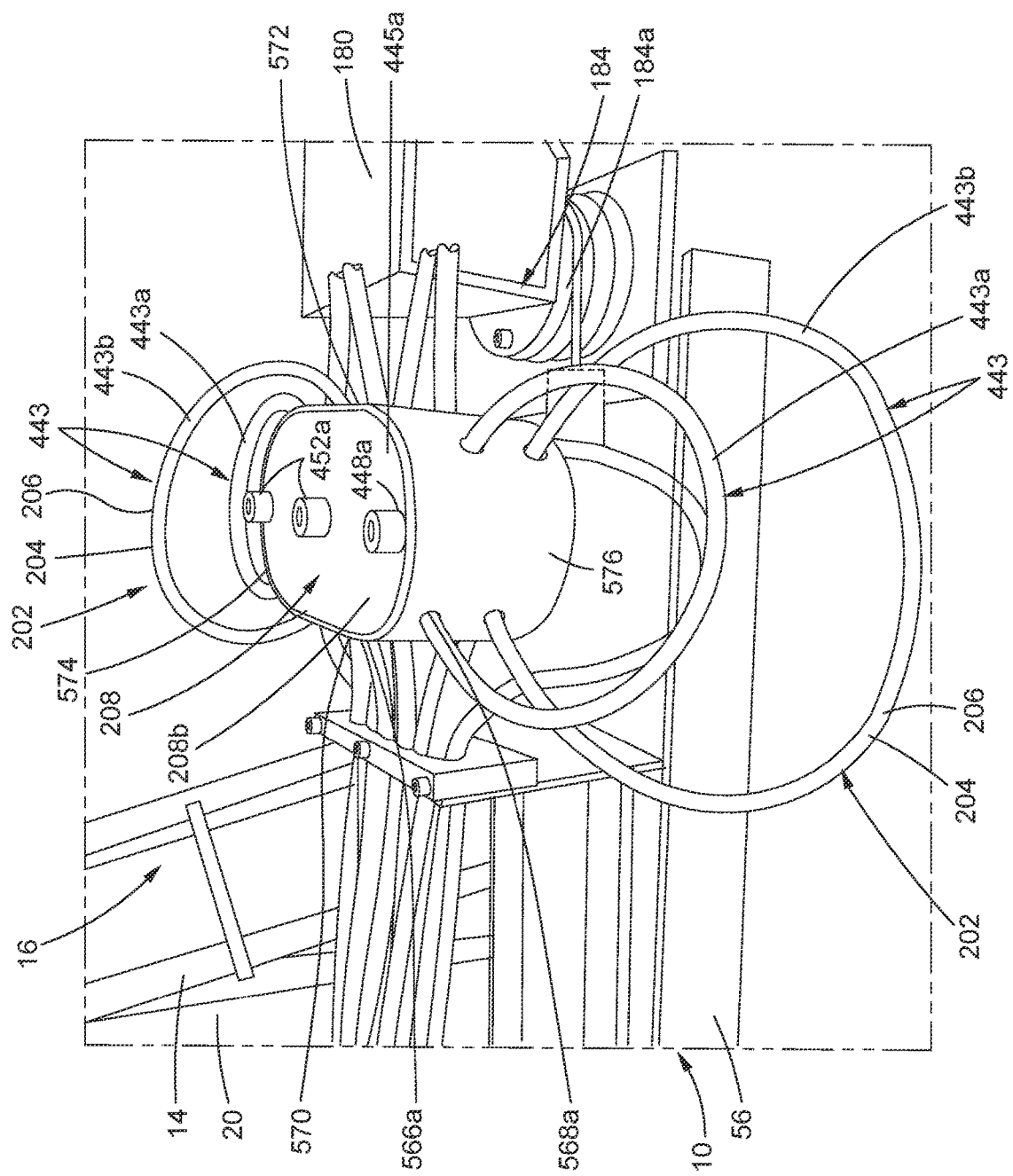
FIG. 16E is an illustration of a left perspective view of the cable holder apparatus of FIG. 16C holding connector elements connected to a version of a mechanical avatar assembly.

Now referring to FIGS. 16C-16E, FIG. 16C is an illustration of a back perspective view of another version of a cable holder apparatus 208, such as in the form of a multiple service loop cable holder 208b, that may be used with a version of the mechanical avatar system 12 (see FIGS. 1B, 11A) of the disclosure. FIG. 16D is an illustration of a top cross-sectional view of the cable holder apparatus 208, such as in the form of the multiple service loop cable holder 208b, of FIG. 16C, holding connector elements 202, such as cables 204, for example, Bowden cables 206. FIG. 16E is an illustration of a left perspective view of the cable holder apparatus 208, such as in the form of the multiple service loop cable holder 208b, of FIG. 16C, holding connector elements 202, such as cables 204, for example, Bowden cables 206, connected to a version of the mechanical avatar assembly 10.

As shown in FIG. 16C, in one version, the cable holder apparatus 208, such as in the form of the multiple service loop cable holder 208b, comprises a block 445a comprised of a plurality of segments 446, such as a first segment 446a, a second segment 446b, a third segment 446c, a fourth segment 446d, and a fifth segment 446e, where the first segment 446a, the second segment 446b, the third segment 446c, the fourth segment 446d, and the fifth segment 446e are in a stacked configuration 447a. As shown in FIG. 16C, the block 445a of the cable holder apparatus 208, such as in the form of the multiple service loop cable holder 208b, further comprises a plurality of screw holes 448a formed through a body 565 of the block 445a and designed to clamp the plurality of segments 446 together with screws 452a (see FIG. 16E) inserted into the plurality of screw holes 448a. Each of the plurality of segments 446 of the block 445a may be formed by three-dimensional (3D) printing, and then the formed plurality of segments 446 are attached to together with the screws 452a (see FIG. 16E). Each screw 452a (see FIG. 16E) is inserted through one of the screw holes 448a (see FIG. 16C). The plurality of segments 446 of the block 445a may also be formed with another suitable forming or manufacturing process.

As shown in FIG. 16C, the block 445a of the cable holder apparatus 208, such as in the form of the multiple service loop cable holder 208b, further comprises a plurality of first through openings 566, such as in the form of small diameter through openings 566a. As further shown in FIG. 16C, the block 445a of the cable holder apparatus 208, such as in the form of the multiple service loop cable holder 208b, further comprises a plurality of second through openings 568, such as in the form of large diameter through openings 568a. As shown in FIG. 16C, the block 445a has four small diameter through openings 566a formed through a back side 570 of the block 445a, two small diameter through openings 566a formed through a first end 574 of the block 445a, and two small diameter through openings 566a formed through a second end 576 of the block 445a. As shown in FIG. 16C, the block 445a has eight large diameter through openings 568a, with four large diameter through openings 568a formed through a front side 572 of the block 445a, two large diameter through openings 568a formed through the first end 574 of the block 445a, and two large diameter through openings 568a formed through the second end 576 (see also FIG. 16D) of the block 445a. As shown in FIGS. 16C-16D, the small diameter through openings 566a are connected via a plurality of through channels 578 formed through an interior 580 of the block 445a, and the large diameter through openings 568a are connected via a plurality of through channels 578 formed through an interior 580 of the block 445a.

FIG. 16D shows connector elements 202, such as cables 204, for example, Bowden cables 206, inserted through small diameter through openings 566a, inserted through large diameter through openings 568a, and passing through the through channels 578, to form loops 443 at the first end 574 and at the second end 576 of the block 445a. Each connector element 202, such as the cable 204, for example, the Bowden cable 206, is inserted into two small diameter through openings 566a and into two large diameter through openings 568a and through the associated through channels 578. The back part of the connector elements 202, such as the cables 204, for example, the Bowden cables 206 enter through the small diameter through openings 566a to hold each connector element 202, such as the cable 204, for example, the Bowden cable 206, fixed while the forward part of the connector elements 202, such as the cables 204, for example, the Bowden cables 206 goes through the large diameter through openings 568a and the through channels 578 to allow for each connector element 202, such as the cable 204, for example, the Bowden cable 206, to freely enter and exit. The small diameter through openings 566a and associated through channels 578 are designed to form a tight fit around the connector element 202 (see FIG. 16D), such as the cable 204 (see FIG. 16D), for example, the Bowden cable 206 (see FIG. 16D). The large diameter through openings 568a and associated through channels 578 are designed to allow for movement of the connector element 202, such as the cable 204, for example, the Bowden cable 206.

FIG. 16E shows the cable holder apparatus 208, such as in the form of the multiple service loop cable holder 208b, holding connector elements 202, such as cables 204, for example, Bowden cables 206, connected to a version of the mechanical avatar assembly 10 comprising the articulating avatar arm 180 attached to the rail assembly 56. As shown in FIG. 16E, the cable holder apparatus 208, such as in the form of the multiple service loop cable holder 208b, comprises the block 445a with the plurality of screws 452a inserted in the screw holes 448a. FIG. 16E further shows the connector elements 202, such as the cables 204, for example, the Bowden cables 206, inserted through the small diameter through openings 566a and the large diameter through openings 568a and forming four loops 443, including a first loop 443a and a second loop 443b at the first end 574, and a first loop 443a and a second loop 443b at the second end 576. The cable holder apparatus 208, such as in the form of the multiple service loop cable holder 208b, creates four loops 443 that pull the excess connector elements 202, such as the cables 204, for example, the Bowden cables 206, back and against the articulating avatar arm 180 to keep the excess connector elements 202, such as the cables 204, for example, the Bowden cables 206, from hanging off the articulating avatar arm 180. The cable holder apparatus 208, such as in the form of the multiple service loop cable holder 208b, is used to create multiple loops 443 (see FIG. 16E) at the second end 184 (see FIG. 16E), such as the aft end 184a (see FIG. 16E), of the articulating avatar arm 180 (see FIG. 16E), to remove the connector elements 202, such as the cables 204, for example, the Bowden cables 206, that are loose along the articulating avatar arm 180. Preferably, all of the loose cables 204 are kept in the loops 443, such as the first loop 443a and the second loop 443b, and the loops 443 increase and decrease in size with bending movements of the articulating avatar arm 180. For example, the loops 443 increase in size with the connector elements 202, such as the cables 204, for example, the Bowden cables 206, held loosely against the articulating avatar arm 180.

Figure 17A:
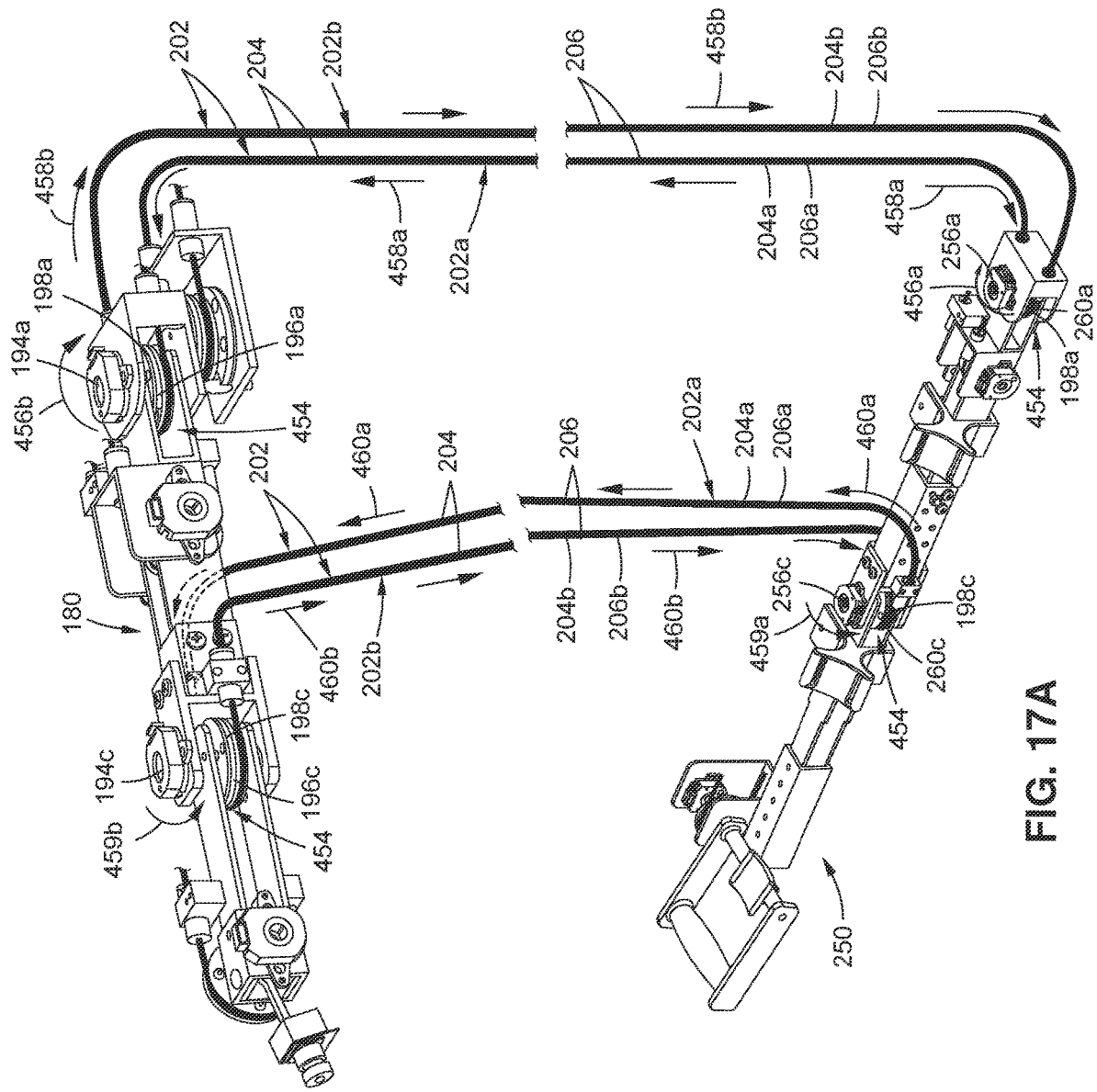
FIG. 17A is an illustration of a right perspective view of an articulating avatar arm and an input control arm of the mechanical avatar system of the disclosure, showing attachment of cables between the articulating avatar arm and the input control arm.

Now referring to FIG. 17A, FIG. 17A is an illustration of a right perspective view of the articulating avatar arm 180 of FIG. 2, and the input control arm 250 of FIG. 12A, of the mechanical avatar system 12 (see FIGS. 1B, 11A), of the disclosure, showing connector elements 202, such as cables 204, for example, Bowden cables 206, attached between left-right direction pulley and cable assemblies 454. As shown in FIG. 17A, the first pulley and cable assembly 198a of the first input control arm actuator assembly 260a of the input control arm 250 is connected to the first pulley and cable assembly 198a of the first actuator assembly 196a of the articulating avatar arm 180, via a first connector element 202a, such as a first cable 204a, for example, a first Bowden cable 206a, and a second connector element 202b, such as a second cable 204b, for example, a second Bowden cable 206b. As shown in FIG. 17A, when the first input control arm joint 256a of the input control arm 250 rotates in a rotation direction 456a, the first connector element 202a, such as the first cable 204a, for example, the first Bowden cable 206a, moves in a direction 458a, and the second connector element 202b, such as a second cable 204b, for example, the second Bowden cable 206b, moves in a direction 458b, to cause the first joint 194a of the articulating avatar arm 180 to rotate in a rotation direction 456b similar to the rotation direction 456a.

As further shown in FIG. 17A, the third pulley and cable assembly 198c of the third input control arm actuator assembly 260c of the input control arm 250 is connected to the third pulley and cable assembly 198c of the third actuator assembly 196c of the articulating avatar arm 180, via a first connector element 202a, such as a first cable 204a, for example, a first Bowden cable 206a, and a second connector element 202b, such as a second cable 204b, for example, a second Bowden cable 206b. As shown in FIG. 17A, when the third input control arm joint 256c of the input control arm 250 rotates in a rotation direction 459a, the first connector element 202a, such as the first cable 204a, for example, the first Bowden cable 206a, moves in a direction 460a, and the second connector element 202b, such as a second cable 204b, for example, the second Bowden cable 206b, moves in a direction 460b, to cause the third joint 194c of the articulating avatar arm 180 to rotate in a rotation direction 459b similar to the rotation direction 459a.

Figure 17B:
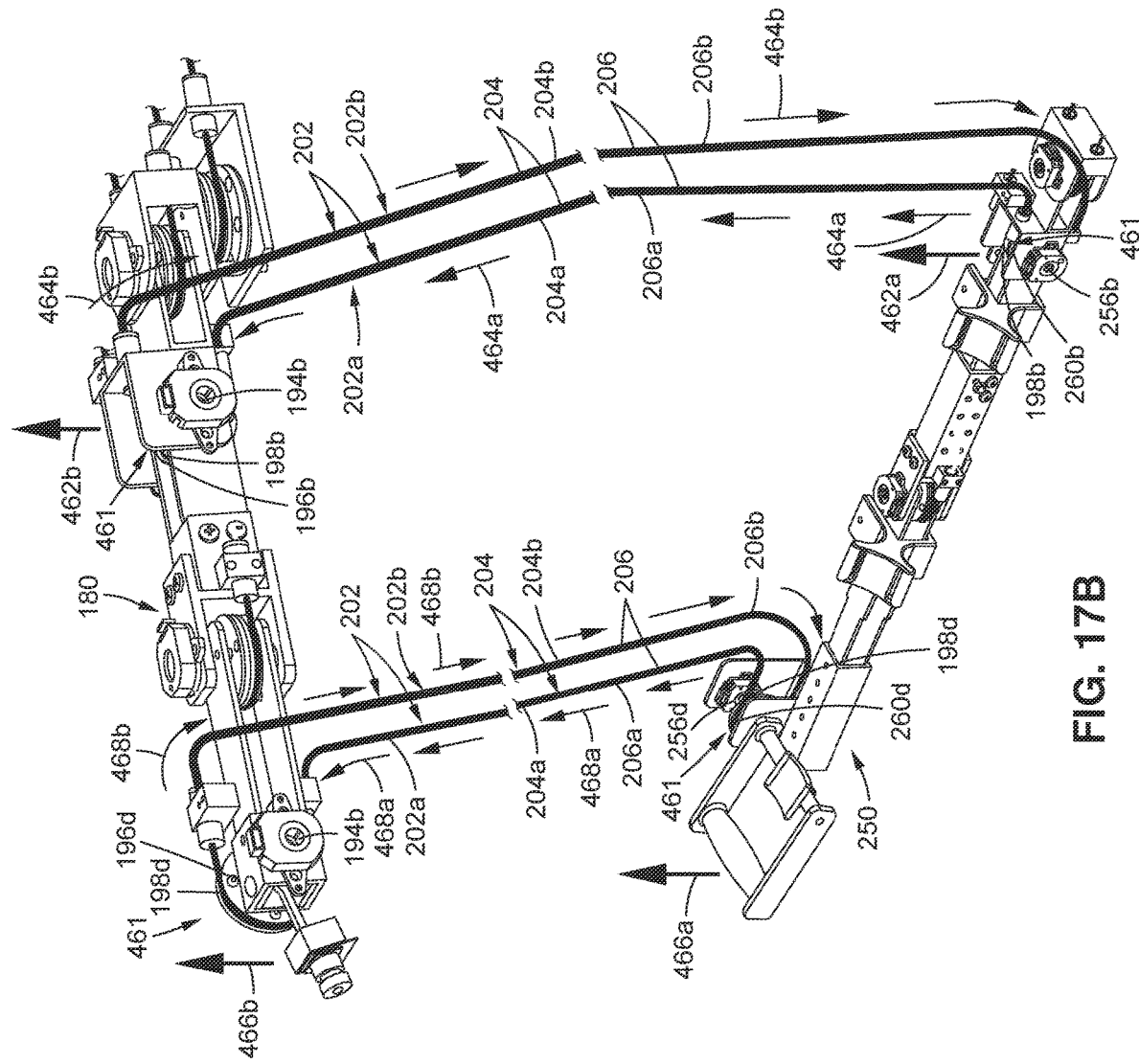
FIG. 17B is an illustration of a right perspective view of the articulating avatar arm and the input control arm of FIG. 17A, showing further attachment of cables between the articulating avatar arm and the input control arm.

Now referring to FIG. 17B, FIG. 17B is an illustration of a right perspective view of the articulating avatar arm 180, and the input control arm 250 of FIG. 17A, showing connector elements 202, such as cables 204, for example, Bowden cables 206, attached between up-down direction pulley and cable assemblies 461.

As shown in FIG. 17B, the second pulley and cable assembly 198b of the second input control arm actuator assembly 260b of the input control arm 250 is connected to the second pulley and cable assembly 198b of the second actuator assembly 196b of the articulating avatar arm 180, via a first connector element 202a, such as a first cable 204a, for example, a first Bowden cable 206a, and a second connector element 202b, such as a second cable 204b, for example, a second Bowden cable 206b. As shown in FIG. 17B, when the second input control arm joint 256b of the input control arm 250 moves in an upward direction 462a, the first connector element 202a, such as the first cable 204a, for example, the first Bowden cable 206a, moves in a direction 464a, and the second connector element 202b, such as the second cable 204b, for example, the second Bowden cable 206b, moves in a direction 464b, to cause the second joint 194b of the articulating avatar arm 180 to move in an upward direction 462b similar to the upward direction 462a.

As further shown in FIG. 17B, the fourth pulley and cable assembly 198d of the fourth input control arm actuator assembly 260d of the input control arm 250 is connected to the fourth pulley and cable assembly 198d of the fourth actuator assembly 196d of the articulating avatar arm 180, via a first connector element 202a, such as a first cable 204a, for example, a first Bowden cable 206a, and a second connector element 202b, such as a second cable 204b, for example, a second Bowden cable 206b. As shown in FIG. 17B, when the fourth input control arm joint 256d of the input control arm 250 moves in an upward direction 466a, the first connector element 202a, such as the first cable 204a, for example, the first Bowden cable 206a, moves in a direction 468a, and the second connector element 202b, such as the second cable 204b, for example, the second Bowden cable 206b, moves in a direction 468b, to cause the fourth joint 194d of the articulating avatar arm 180 to move in an upward direction 466b similar to the upward direction 466a.

Figure 18:
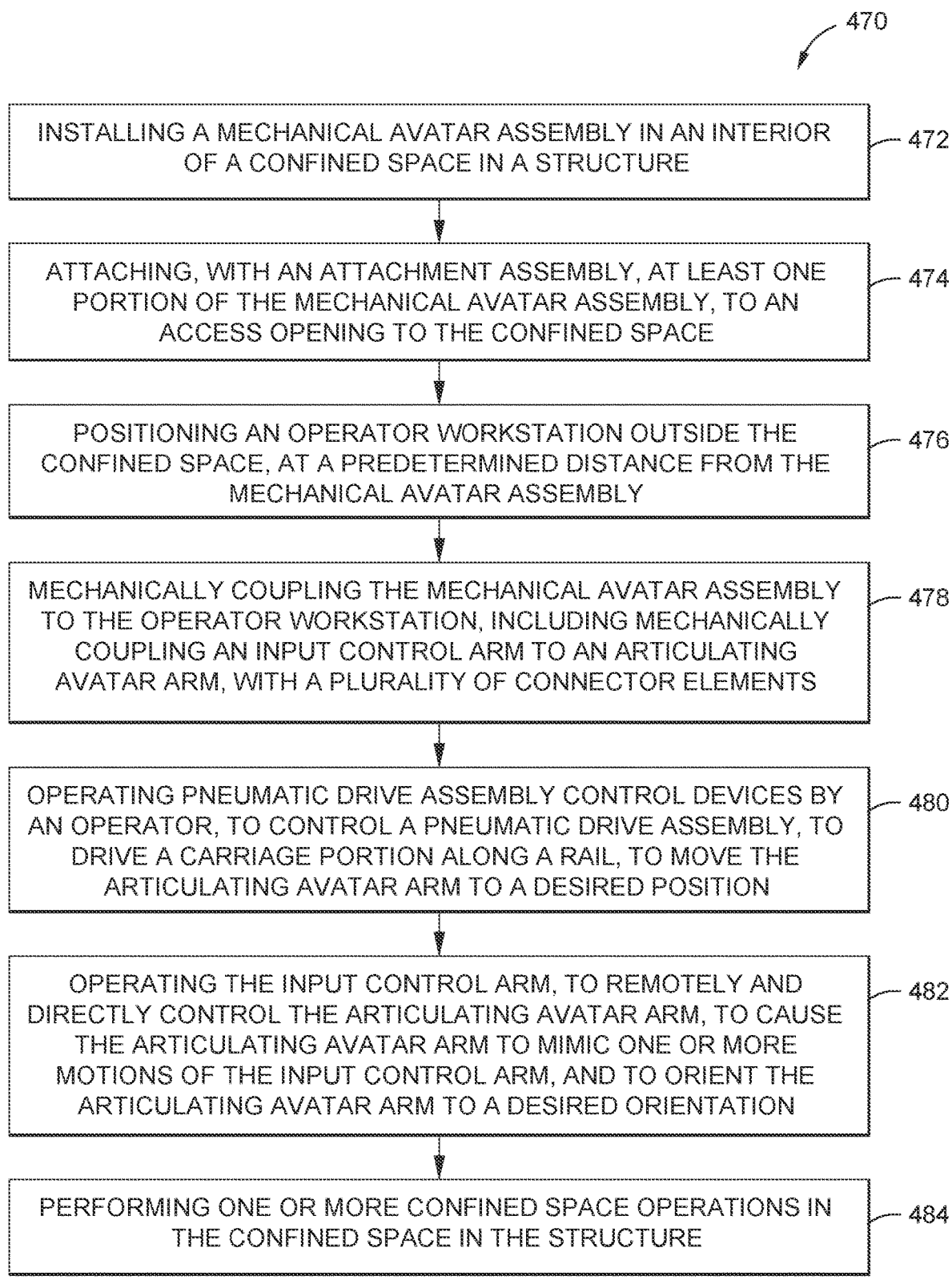
FIG. 18 is an illustration of a flow diagram showing a version of a method of the disclosure.

Now referring to FIG. 18, in another version there is provided a method 470 of using and remotely operating a mechanical avatar assembly 10 (see FIGS. 1A, 4A, 5A, 6A), as discussed in detail above, in a confined space 14 (see FIGS. 1B, 11A) in a structure 16 (see FIGS. 1B, 11A), to perform the one or more confined space operations 18 (see FIG. 1A) in the structure 16. FIG. 18 is an illustration of a flow diagram showing a version of the method 470 of the disclosure.

The blocks in FIG. 18 represent operations and/or portions thereof, or elements, and lines connecting the various blocks do not imply any particular order or dependency of the operations or portions thereof, or elements. FIG. 18 and the disclosure of the steps of the method 470 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 18, the method 470 comprises the step of installing 472 the mechanical avatar assembly 10 (see FIGS. 1A, 4A, 11A) in the interior 20 (see FIGS. 1B, 11A) of the confined space 14 (see FIGS. 1B, 11A) in the structure 16 (see FIGS. 1B, 11A). The step of installing 472 the mechanical avatar assembly 10 in the interior 20 of the confined space 14 in the structure 16 may further comprise installing the mechanical avatar assembly 10 in the interior 20 of the confined space 14 in the structure 16, where the structure 16 comprises a vehicle 24 (see FIG. 1B), including an aircraft 26 (see FIGS. 1B, 9A, 19), a rotorcraft 28 (see FIG. 1B), a spacecraft 30 (see FIG. 1B), an automobile 32 (see FIG. 1B), a truck 34 (see FIG. 1B), a train 36 (see FIG. 1B), and a watercraft 38 (see FIG. 1B). The structure 16 further comprises an architectural structure 40 (see FIG. 1B), such as a building, a monument, or another suitable architectural structure, having the confined space 14 in the structure 16.

As discussed in detail above, the mechanical avatar assembly 10 comprises a rail assembly 56 (see FIGS. 1A, 4A, 5A, 6A) having a rail 90 (see FIGS. 1A, 4A), such as a center rail 92 (see FIG. 4A), and a gear rack 106 (see FIGS. 1A, 4A), such as a side gear rack 108 (see FIG. 4A), extending along a length 64 (see FIGS. 1A, 4B, 5B, 6C) of an elongated base 62 (see FIGS. 1A, 4A). The elongated base 62 is formed by two or more rail segments 58 (see FIGS. 1A, 4A, 5A, 6A). The rail assembly 56 further comprises a carriage portion 120 (see FIGS. 1A, 4A) coupled to the rail 90, and driven by a drive assembly 136 (see FIGS. 1A, 4C), such as a pneumatic drive assembly 136a (see FIGS. 1A, 4C) coupled to the carriage portion 120, along the rail 90.

The mechanical avatar assembly 10 further comprises an articulating avatar arm 180 (see FIGS. 1A, 2, 4A) coupled to, and movable via, the carriage portion 120. The articulating avatar arm 180 comprises a plurality of mechanical links 190 (see FIGS. 1A, 2), a plurality of joints 194 (see FIGS. 1A, 2) coupling the plurality of mechanical links 190 together, and one or more actuator assemblies 196 (see FIGS. 1A, 2) coupled at each joint 194. The actuator assemblies 196 may comprise pulley and cable assemblies 198 (see FIGS. 1A, 2), water-driven hydraulic piston assemblies 199 (see FIG. 1A), or another suitable actuator assembly. The mechanical avatar assembly 10 further comprises an image capturing device 210 (see FIGS. 1A, 2), such as a camera 212 (see FIGS. 1A, 2), or another suitable image capturing device, coupled to the articulating avatar arm 180, and in particular, coupled at, or to, the first end 182 (see FIG. 2), such as the forward end 182a (see FIG. 2), of the articulating avatar arm 180.

The mechanical avatar assembly 10 may further comprise an end effector tool assembly 220 (see FIGS. 1A, 10C) coupled to the articulating avatar arm 180, and in particular, at, or to, the first end 182, such as the forward end 182a, of the articulating avatar arm 180. As shown in FIG. 1A, the end effector tool assembly 220 comprises the end effector 222 and the tool 224 coupled, or attached, to the end effector 222. The tool 224 may be changed or modified depending on the type of confined space operations 18 performed, or to be performed. As shown in FIG. 1A, the tool 224 may comprise the sealant tool 224a, such as the sealant gun 224b, the paint tool 224c, the primer tool 224d, the fastener tool 224e, the cleaning tool 224f, the installation tool 224g, or another suitable tool, that is configured to perform, and performs, one or more confined space operations 18.

In one exemplary version, the step of installing 472 the mechanical avatar assembly 10 in the interior 20 of the confined space 14 in the structure 16 may further comprise the steps of: attaching the articulating avatar arm 180 to a first rail segment 58a of the rail assembly 56; inserting a second rail segment 58b of the rail assembly 56 through the access opening 230 (see FIG. 9A) into the interior 20 of the confined space 14 of the structure 16; inserting the first rail segment 58a with the attached articulating avatar arm 180 through the access opening 230 into the interior 20 of the confined space 14 of the structure 16, and positioning the first rail segment 58a with the attached articulating avatar arm 180 aft to, and aligned with, the second rail segment 58b; and coupling the first rail segment 58a to the second rail segment 58b, with one or more coupling elements 88, such as latches 88a (see FIGS. 4D, 9C). These further steps of installing are performed by an operator 248 (see FIG. 1B).

As shown in FIG. 18, the method 470 further comprises the step of attaching 474, with an attachment assembly 226 (see FIGS. 1B, 8A, 9E), at least one portion 56b (see FIG. 9E) of the mechanical avatar assembly 10, such as the at least one portion 56b of the rail assembly 56, to an edge 228 (see FIG. 9E) of the access opening 230 (see FIG. 9E) to the interior 20 of the confined space 14 in the structure 16, such as an aircraft 26.

The step of attaching 474 the at least one portion 56b of the rail assembly 56 of the mechanical avatar assembly 10, to the edge 228 of the access opening 230, may further comprise, attaching with the attachment assembly 226 comprising the connector device 232 (see FIG. 8A) connected to the at least one portion 56b of the rail assembly 56 of the mechanical avatar assembly 10, and the coupling mechanism 234 (see FIG. 8A) that couples the connector device 232 relative to the edge 228 of the access opening 230. As shown in FIGS. 8A-8B, in one version, the connector device 232 comprises the connector portion 316 with the bolt 318 coupled to the connector portion 316. In other versions, the connector device 232 may also comprise latches, clamps, clips, quick-disconnect elements, or other suitable connector devices. As shown in FIG. 8A, in one version, the coupling mechanism 234 comprises the clamp assembly 235 with clamps 236, such as in the form of dual-sided clamps 236a. As shown in FIG. 8A, the clamps 236, such as the dual-sided clamps 236a, have extendable clamp arms 237. Preferably, the clamps 236 are quick release detachable clamps having a C-clamp configuration. In other versions, the coupling mechanism 234 may comprise latches, clips, or other suitable coupling mechanisms.

As shown in FIG. 18, the method 470 further comprises the step of positioning 476 an operator workstation 238 (see FIGS. 1B, 11A) outside the confined space 14, at a predetermined distance 240 (see FIG. 1B) from the mechanical avatar assembly 10, which is attached to the access opening 230 (see FIG. 11A). The operator workstation 238 comprises the portable structure 242 (see FIGS. 1B, 11A), such as the portable cart 242a (see FIGS. 1B, 11A), having a control system 158 (see FIG. 1B) with a plurality of control devices 244 (see FIGS. 1B, 11A). The plurality of control devices 244 include an input control arm 250 (see FIGS. 11C, 12A-12C), and pneumatic drive assembly control devices 264 (see FIGS. 1B, 11A). The operator workstation 238 further comprises a monitor 245 (see FIGS. 1B, 11A-11C), such as a computer screen 246 (see FIGS. 11A-11C), to display one or more output images 216 (see FIG. 1A) from the image capturing device 210, such as the camera 212.

As shown in FIG. 18, the method 470 further comprises the step of mechanically coupling 478 the mechanical avatar assembly 10 to the operator workstation 238, including mechanically coupling the input control arm 250 to the articulating avatar arm 180, with a plurality of connector elements 202 (see FIG. 1B, 11A), such as cables 204 (see FIGS. 1B, 11A) with the pulley and cable assemblies 198, or tubes 207 (see FIG. 1B) with the water-driven hydraulic piston assemblies 199, or another suitable connector element.

The step of mechanically coupling 478 the mechanical avatar assembly 10 to the operator workstation 238, may further comprise, mechanically coupling the input control arm 250 to the articulating avatar arm 180, with a plurality of cables 204 (see FIG. 1B), such as a plurality of Bowden cables 206 (see FIG. 1B), and controlling a tension 276 (see FIG. 1B) of one or more of the plurality of cables 204, such as the plurality of Bowden cables 206, with a cable tension control device 272 (see FIGS. 1B, 11C), such as a tensioner assembly 274 (see FIGS. 1B, 11C), coupled to the portable structure 242 (see FIG. 11A), such as the portable cart 242a (see FIG. 11A).

As shown in FIG. 18, the method 470 further comprises the step of operating 480 the pneumatic drive assembly control devices 264 by an operator 248 (see FIGS. 1B, 11A), such as a human operator 248a (see FIGS. 1B, 11A) or a robot operator 248b (see FIG. 1B), to remotely control the pneumatic drive assembly 136a, to drive the carriage portion 120 along the rail 90, to move the articulating avatar arm 180 to a desired position 267 (see FIG. 1B). The step of operating 480 the pneumatic drive assembly control devices 264, to remotely control the pneumatic drive assembly 136a, may further comprise, operating 480 the pneumatic drive assembly control devices 264 comprising a pedal valve 265 (see FIGS. 1B, 11A) and a control valve 266 (see FIGS. 1B, 11A), to remotely control an air motor 138 (see FIGS. 1A, 7A-7B) of the pneumatic drive assembly 136a (see FIGS. 1B, 7A-7B), and controlling a speed 160 (see FIG. 1A) of the air motor 138 with the pedal valve 265, and controlling a direction 161 (FIG. 1A) of the air motor 138 with the control valve 266, and further powering the air motor 138 with air 148 (see FIG. 1B), such as shop air 148a (see FIG. 1B), from an air supply 150 (see FIG. 1B) located outside of the interior 20 of the confined space 14 of the structure 16.

As shown in FIG. 18, the method 470 further comprises the step of operating 482 the input control arm 250 by the operator 248, to remotely and directly control the articulating avatar arm 180, by mechanically actuating one or more input control arm actuator assemblies 260 (see FIGS. 1B, 12A) coupled to, and corresponding to, the one or more actuator assemblies 196 (see FIGS. 1A, 2) of the articulating avatar arm 180, to cause the articulating avatar arm 180 to mimic one or more motions 252 (see FIG. 1B) of the input control arm 250, and to orient the articulating avatar arm 180 to a desired orientation 262 (see FIG. 1B), prior to performing one or more confined space operations 18 (see FIG. 1A).

The step of operating 482 the input control arm 250 to remotely and directly control the articulating avatar arm 180, may further comprise, mechanically actuating the one or more input control arm actuator assemblies 260 coupled to, and corresponding to, the one or more actuator assemblies 196 of the articulating avatar arm 180, wherein the one or more input control arm actuator assemblies 260 and the one or more actuator assemblies 196 of the articulating avatar arm 180 comprise one or more pulley and cable assemblies 198 (see FIG. 1A), or one or more water-driven hydraulic piston assemblies 199 (see FIG. 1A), or another suitable actuator assembly.

The method 470 may further comprise after the step of operating 480 the pneumatic drive assembly control devices 264, and before the step of operating 482 the input control arm 250, the step of operating a gross angular motion control device 268 (see FIGS. 1B, 14A) coupled to the portable structure 242, such as the portable cart 242a, and coupled to a base portion 188 of the articulating avatar arm 180, and enabling about 300 (three hundred) degrees of motion 254 (see FIG. 1B) of the articulating avatar arm 180 with a range of 0 (zero) degrees to 90 (ninety) degrees of operator movement 270 (see FIG. 1B) by the operator 248 (see FIGS. 1B, 11A).

As shown in FIG. 18, the method 470 further comprises the step of performing 484 one or more confined space operations 18 in the confined space 14 in the structure 16, by using and remotely operating one of, the image capturing device 210, such as the camera 212, or the image capturing device 210 and the end effector tool assembly 220, coupled to the mechanical avatar assembly 10. The step of performing 484 the one or more confined space operations 18 in the confined space 14 in the structure 16, further comprises, performing the one or more confined space operations 18, as shown in FIG. 1A, comprising one or more of, inspection 18a, sealing 18b, painting 18c, primer application 18d, fastening 18e, cleaning 18f, installing 18g, or another suitable confined space operation.

Figure 19:
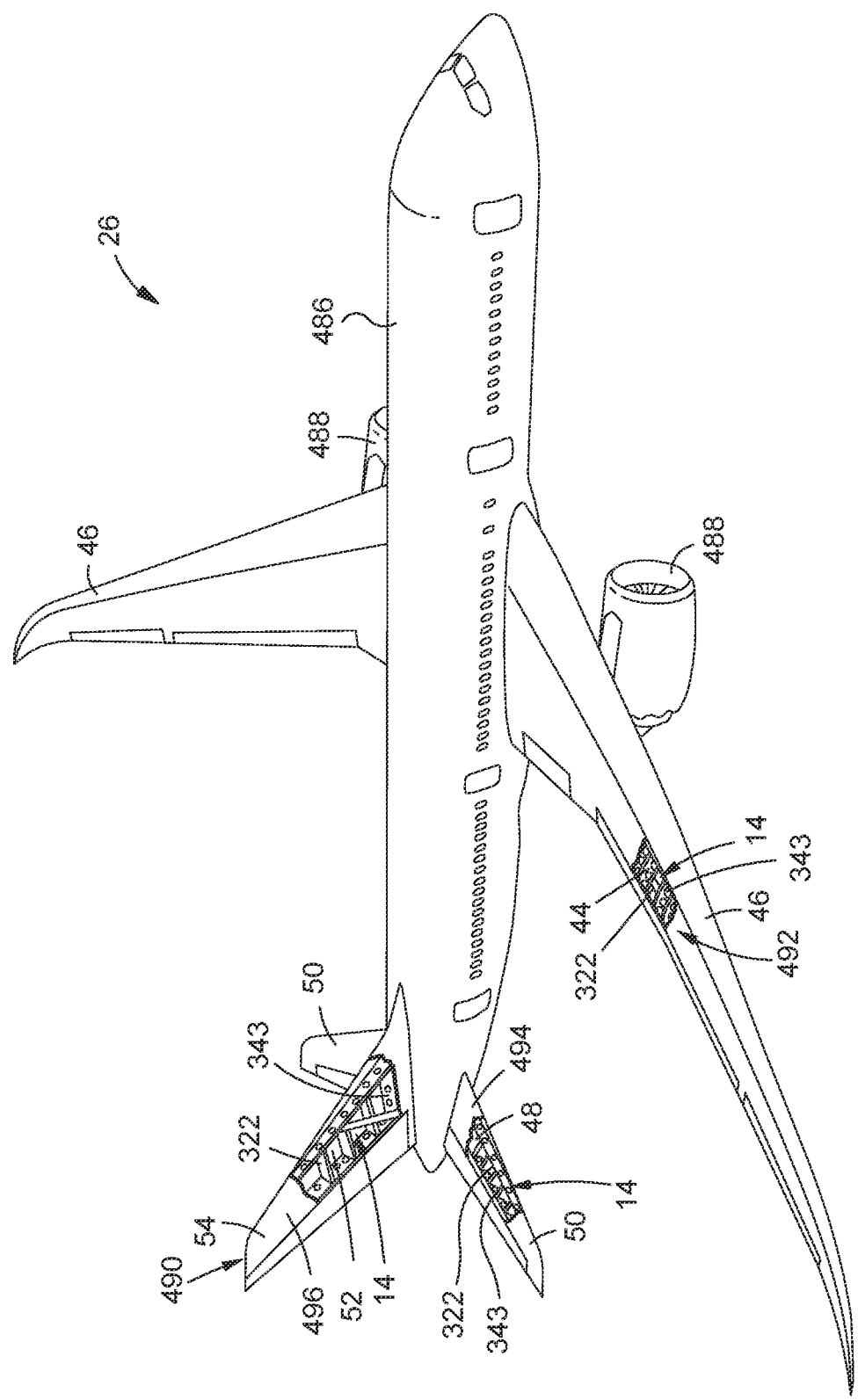
FIG. 19 is an illustration of a perspective view of an aircraft having one or more confined spaces in which versions of a mechanical avatar assembly may be installed and used.

Now referring to FIG. 19, FIG. 19 is an illustration of a perspective view of an aircraft 26, that may use a version of a mechanical avatar assembly 10 (see FIG. 1A) and a mechanical avatar system 12 (see FIG. 1B) of the disclosure. As shown in FIG. 19, the aircraft 26, includes a fuselage 486, wings 46, engines 488, and a tail 490. As shown in FIG. 19, the tail 490 comprises the horizontal stabilizers 50 and the vertical stabilizer 54.

As further shown in FIG. 19, one aircraft wing 46 has a cutaway portion of a wing skin panel 492 to show the confined space 14, for example, in the rib bay 44, in which the mechanical avatar assembly 10 (see FIGS. 1A, 4A, 5A, 6A) may be used to perform, or may be configured to perform, the one or more confined space operations 18 (see FIG. 1A). As shown in FIG. 19, the cutaway portion of the wing skin panel 492 further shows stringers 322 and ribs 343.

As further shown in FIG. 19, one horizontal stabilizer 50 has a cutaway portion of a horizontal stabilizer panel 494, to show a confined space 14, for example, a horizontal stabilizer rib bay 48, in which the mechanical avatar assembly 10 (see FIGS. 1A, 4A, 5A, 6A) may be used to perform, or may be configured to perform, the one or more confined space operations 18 (see FIG. 1B). The cutaway portion of the horizontal stabilizer panel 494 further shows stringers 322 and ribs 343.

As further shown in FIG. 19, the vertical stabilizer 54 has a cutaway portion of a vertical stabilizer panel 496, to show a confined space 14, for example, a vertical stabilizer rib bay 52, in which the mechanical avatar assembly 10 (see FIGS. 1A, 4A, 5A, 6A) may be used to perform, or may be configured to perform, the one or more confined space operations 18 (see FIG. 1B). The cutaway portion of the vertical stabilizer panel 496 further shows stringers 322 and ribs 343.

It is noted that the confined spaces 14 in the wing 46, the horizontal stabilizer 50, and the vertical stabilizer 54, as shown in FIG. 19, are examples, and other confined spaces 14, where access openings 230 (see FIGS. 9A, 11A) are used to access the interior 20 (see FIGS. 1B, 11A) of the confined spaces 14, may also be accessed with the mechanical avatar assembly 10 (see FIGS. 1A, 4A, 5A, 6A) of the mechanical avatar system 12 (see FIGS. 1B, 11A), of the disclosure.

Figure 20:
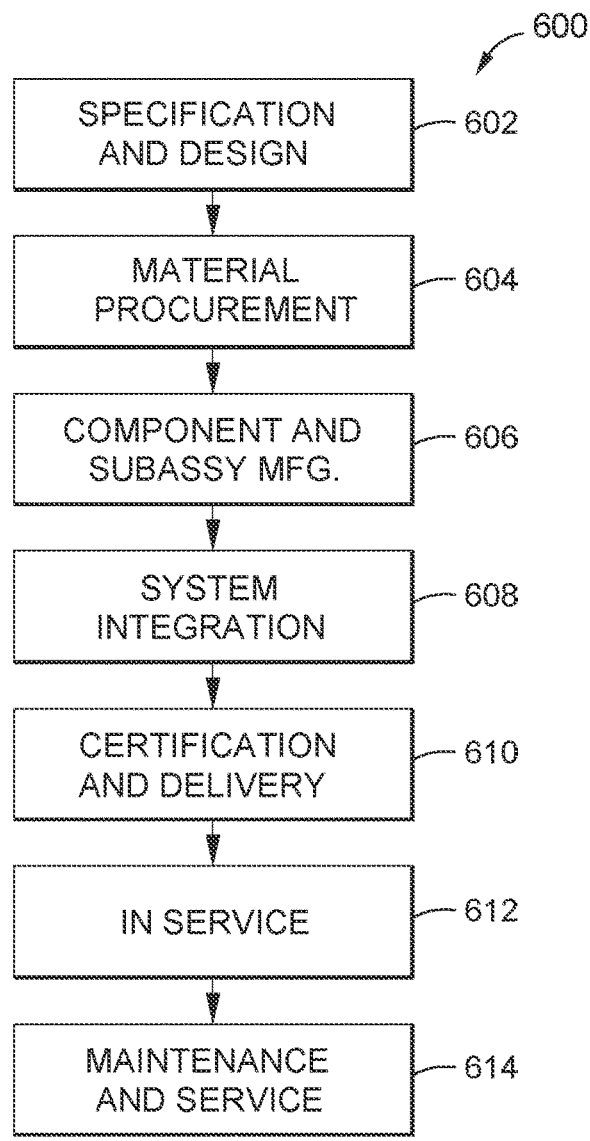
FIG. 20 is an illustration of a flow diagram of an aircraft manufacturing and service method.
Figure 21:
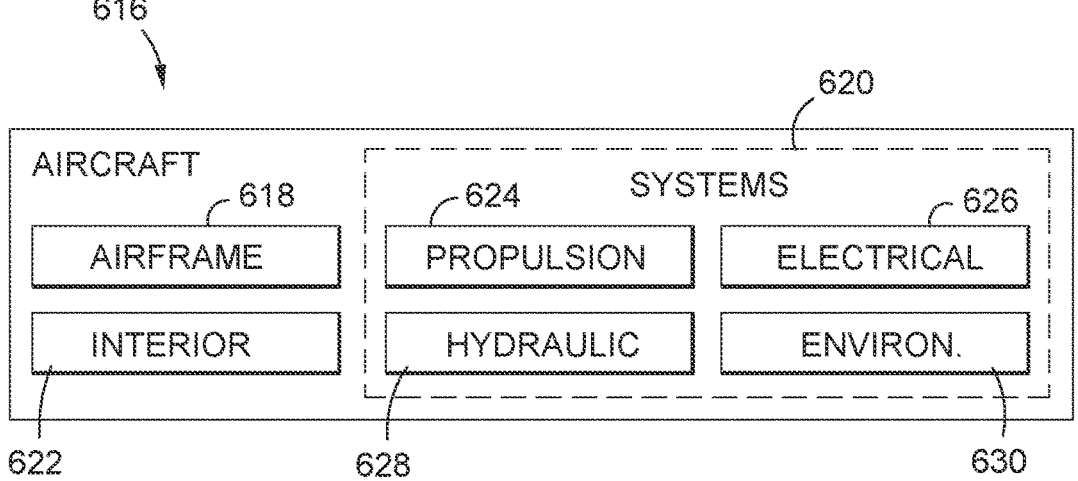
FIG. 21 is an illustration of a block diagram of an aircraft.

Now referring to FIGS. 20 and 21, FIG. 20 is an illustration of a flow diagram of an aircraft manufacturing and service method 600, and FIG. 21 is an illustration of a block diagram of an aircraft 616. Referring to FIGS. 20 and 21, embodiments of the disclosure may be described in the context of the aircraft manufacturing and service method 600 as shown in FIG. 20, and the aircraft 616 as shown in FIG. 21.

During pre-production, exemplary aircraft manufacturing and service method 600 may include specification and design 602 of the aircraft 616 and material procurement 604. During manufacturing, component and subassembly manufacturing 606 and system integration 608 of the aircraft 616 takes place. Thereafter, the aircraft 616 may go through certification and delivery 610 in order to be placed in service 612. While in service 612 by a customer, the aircraft 616 may be scheduled for routine maintenance and service 614 (which may also include modification, reconfiguration, refurbishment, and other suitable services).

Each of the processes of the aircraft manufacturing and service method 600 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 21, the aircraft 616 produced by the exemplary aircraft manufacturing and service method 600 may include an airframe 618 with a plurality of systems 620 and an interior 622. Examples of the plurality of systems 620 may include one or more of a propulsion system 624, an electrical system 626, a hydraulic system 628, and an environmental system 630. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 600. For example, components or subassemblies corresponding to component and subassembly manufacturing 606 may be fabricated or manufactured in a manner similar to components or subassemblies produced while the aircraft 616 is in service 612. Also, one or more apparatus embodiments, method embodiments, or a combination thereof, may be utilized during component and subassembly manufacturing 606 and system integration 608, for example, by substantially expediting assembly of or reducing the cost of the aircraft 616. Similarly, one or more of apparatus embodiments, method embodiments, or a combination thereof, may be utilized while the aircraft 616 is in service 612, for example and without limitation, to maintenance and service 614.

Disclosed versions of the mechanical avatar assembly 10 (see FIGS. 1A, 4A, 5A, 6A), the mechanical avatar system 12 (see FIGS. 1B, 11A), and the method 470 (see FIG. 18) provide a shop aid to mimic human activity with teleoperated equipment and provide an articulating avatar arm 180 (see FIGS. 1A, 2) for performing one or more confined space operations 18 in an interior 20 of a confined space 14 in a structure 16, such as a vehicle 24, for example, an aircraft 26, that is mechanically and remotely operated and controlled with an input control arm 250 located at an operator workstation 238 (see FIG. 11A) by an operator 248 (see FIG. 11A) outside of the confined space 14. The mechanical avatar assembly 10 (see FIGS. 1A, 4A, 5A, 6A), the mechanical avatar system 12 (see FIGS. 1B, 11A), and the method 470 (see FIG. 18) improve worker safety and improve issues associated with working in a confined space 14 in a structure 16, such as a vehicle 24, for example, an aircraft 26, improve factory flow, reduce complexity as they rely on control by an operator 248, such as a human operator 248a, instead of full automation, are low cost, as compared to known fully automated systems, and the human operator 248a viewing and controlling enables variable work activities without unique programming and controls. Further, the mechanical avatar assembly 10 (see FIGS. 1A, 4A, 5A, 6A), the mechanical avatar system 12 (see FIGS. 1B, 11A), and the method 470 (see FIG. 18) provide a lightweight, modular, mechanical avatar assembly 10 for teleoperation by an operator 248, such as a human operator 248a, at an operator workstation 238 (see FIG. 11A). Moreover, having the articulating avatar arm 180 (see FIGS. 10C, 11A) in the confined space 14 in the structure 16, such as a tank 42 of an aircraft 26, that is mechanical and not electrical allows for quick installation and removal and control of movement of the articulating avatar arm 180 with the input control arm 250, via connector elements 202, such as cables 204, for example, Bowden cables 206, or via a hydraulic system with water-driven hydraulic piston assemblies 199 (see FIG. 1A).

In addition, disclosed versions of the mechanical avatar assembly 10 (see FIGS. 1A, 4A, 5A, 6A), the mechanical avatar system 12 (see FIGS. 1B, 11A), and the method 470 (see FIG. 18) provide a modular rail assembly 56a which can be adaptable to any size of the structure 16 or work environment and which can be attached, via an attachment assembly 226 (see FIG. 1B), to an access opening 230 (see FIG. 1B) to the confined space 14 in the structure 16, such as a vehicle 24. The rail assembly 56 (see FIGS. 4A, 5A, 6A) is a very small volume, for example, approximately 6 inches wide by 4 inches high, and as long as needed, as compared to a human body inside of the confined space 14 of the structure 16. Further, the front end 66 (see FIG. 4A) of the rail assembly 56 (see FIG. 4A) has a guide portion 85 (see FIG. 4A) with an upward angled configuration 86 (see FIG. 4A) that is a sled-shaped configuration, to enable movement over surfaces, components, and parts of uneven shape, such as stringers 322 (see FIG. 10C), or stiffeners, and contours. Each rail segment 58 (see FIG. 1A) is lightweight and liftable by a human operator 248a through an access opening 230 (see FIG. 11A) into the confined space 14 (see FIG. 11A).

Further, the mechanical avatar assembly 10 (see FIGS. 1A, 4A, 5A, 6A), the mechanical avatar system 12 (see FIGS. 1B, 11A), and the method 470 (see FIG. 18) use cables 204, such as high tension cables, for example, Bowden cables 206 (see FIG. 15C), to create zero-gravity workload to the operator 248. The reaction forces of the activity are taken up by the mechanical avatar assembly 10, such as the shop aid, and are not imparted on the operator 248 except for feedback. A low volume mechanical packaging of the cables 204, for example, Bowden cables 206 (see FIG. 15C), is achieved by the sandwich pulley and cable assembly 416 (see FIGS. 15A-15B), and the tension 276 (see FIG. 1B) of the cables 204, such as the Bowden cables 206, is controlled at the operator workstation 238 that is remote and readily accessible. Further, the articulated joint, linkage, and degrees of freedom of the input control arm 250 and the articulating avatar arm 180 are in proportion and similar to the joints of the operator 248, such as the human operator 248a, to mimic the operator movement 270 (see FIG. 1B), with little training needed. The articulating avatar arm 180, though proportional to an adult arm of the operator 248, such as a human operator 248a, is a smaller volume than the adult arm of the operator 248, such as a human operator 248a, thus enabling a far reach with a very small volume. The operator workstation 238 that is remote has an angle indexing system which enables approximately 300 (three hundred) degrees of motion by the articulating avatar arm 180 with approximately 0 (zero) degrees to 90 (ninety) degrees of operator movement 270 (see FIG. 1B) depending on the operator's 248 preference.

Moreover, disclosed versions of the mechanical avatar assembly 10 (see FIGS. 1A, 4A, 5A, 6A), the mechanical avatar system 12 (see FIGS. 1B, 11A), and the method 470 (see FIG. 18) are low cost, teleoperated, low profile, are quickly installed and removed, and are mechanical and preferably non-electrical, thus eliminating or reducing the chance of sparking in the confined space, such as a tank 42, in a vehicle 24, such as an aircraft 26. Further, the tools 224 (see FIG. 1A) have an end effector 222 (see FIG. 1A) with the quick disconnect portion 334 (see FIG. 10A), and the adapter 338, such as a clip-on adapter bracket, with a common interface to the first end 182 (see FIG. 10C) of the articulating avatar arm 180, to enable multiple confined space operations 18 (see FIG. 1A) without extensive equipment changes. Further, the mechanical avatar assembly 10 (see FIGS. 1A, 4A, 5A, 6A), the mechanical avatar system 12 (see FIGS. 1B, 11A), and the method 470 (see FIG. 18) use tools 224, such as existing shop tools, with the mechanical avatar assembly 10, and use shop air 148a (see FIG. 1B), such as existing shop air, to pneumatically drive the drive assembly 136 (see FIG. 1A), such as the pneumatic drive assembly 136a (see FIG. 1A). In addition, the mechanical avatar assembly 10 (see FIGS. 1A, 4A, 5A, 6A), the mechanical avatar system 12 (see FIGS. 1B, 11A), and the method 470 (see FIG. 18) leverage human sensory skills of hand, eye, and touch, with human operators 248a.

Further, disclosed versions of the mechanical avatar assembly 10 (see FIGS. 1A, 4A, 5A, 6A), the mechanical avatar system 12 (see FIGS. 1B, 11A), and the method 470 (see FIG. 18) enable performing of one or more confined space operations 18 (see FIG. 1A) in the confined space 14 in the structure 16, including, as shown in FIG. 1A, inspection 18a, sealing 18b, painting 18c, primer application 18d, fastening 18e, cleaning 18f, installing 18g, or another suitable confined space operation. The mechanical avatar assembly 10 (see FIGS. 1A, 4A, 5A, 6A), the mechanical avatar system 12 (see FIGS. 1B, 11A), and the method 470 (see FIG. 18) use shop air 148a, a camera 212 (see FIG. 1A), and mechanical drive elements to perform work remotely with an operator workstation 238 in a safe environment outside the confined space 14 in the structure 16, and thus eliminate the need for a human worker to perform confined space operations 18 in the confined space 14 in the structure 16. In addition, the mechanical avatar assembly 10 (see FIGS. 1A, 4A, 5A, 6A), the mechanical avatar system 12 (see FIGS. 1B, 11A), and the method 470 (see FIG. 18) do not require known physically large robotic systems to access the confined space 14 in the structure 16, and may be used in any confined space 14 with a varying physical envelope, where one or more confined space operations 18 are to be performed. Further, the mechanical avatar system 12 includes the gross angular motion control device 268 (see FIG. 11A) that provides reachability of the articulating avatar arm 180 inside the confined space 14 of the structure 16 with gross motion control.

The mechanical avatar system 12 (see FIGS. 1B, 11A) comprises the articulating avatar arm 180 (see FIG. 2), the rail assembly 56 (see FIG. 4A) made of rail segments 58 (see FIG. 4A) that are small enough to fit through an access opening 230 (see FIG. 11A), for example, a 4-inch wide piece-wise modularly connected rail assembly that is clamped to an access opening 230 and driven by an air motor 138 (see FIG. 1A) having a control system 158 (see FIG. 1B), and a pneumatic drive assembly 136a (see FIG. 1A), and an attachment assembly 226 (see FIG. 1B) comprising a connector device 232 coupled to a coupling mechanism 234 (see FIG. 1B) in the form of dual-sided clamps 236a (see FIG. 8A). The mechanical avatar system 12 (see FIGS. 1B, 11A) further comprises a shuttle valve 176 (see FIG. 3A) to synchronize the air cylinder 164 (see FIG. 3A) and the air motor 138, cables 204, such as high tension cables, for example, Bowden cables 206, an image capturing device 210 (see FIG. 1A), such as a camera 212 (see FIG. 1A), and an end effector tool assembly 220 (see FIG. 1A), such as an application specific end effector which is coupled to the articulating avatar arm 180. The mechanical avatar system 12 (see FIGS. 1B, 11A) further comprises an operator workstation 238 (see FIG. 11A) with a pedal valve 265 (see FIG. 11A) and a control valve 266 (see FIG. 11A) for the air motor 138, a monitor 245 (see FIG. 11A), such as a computer screen 246 to pipe or display output images 216 (see FIG. 1A) from the image capturing device 210, a tensioner assembly 274 (see FIG. 11C), and a gross angular motion control device 268 (see FIG. 11A) for rotating the articulating avatar arm 180 at its base portion 188, and a fine motion control arm with an end effector trigger for direct mechanical control of the articulating avatar arm 180 inside the confined space 14 in the structure 16, such as a tank 42 or rib bay 44. The mechanical avatar system 12 (see FIGS. 1B, 11A) further comprises a portable cart 242a with a plurality of control devices 244 (see FIG. 11A), including an input control arm 250 which mechanically controls the articulating avatar arm 180, via connector elements 202, such as cables 204, for example, Bowden cables 206.

Accordingly, the mechanical avatar assembly 10 (see FIGS. 1A, 4A, 5A, 6A), the mechanical avatar system 12 (see FIGS. 1B, 11A), and the method 470 (see FIG. 18) provide for mechanically accessing a confined space 14 in a structure 16, such as a vehicle 24, to perform one or more confined space operations 18 in the confined space 14, and to enable control of the one or more confined space operations 18 from outside of the confined space 14, thus avoiding the need for a human worker to crawl into the confined space and perform the one or more confined space operations 18. Further, the mechanical avatar assembly 10 (see FIGS. 1A, 4A, 5A, 6A), the mechanical avatar system 12 (see FIGS. 1B, 11A), and the method 470 (see FIG. 18) are not fully automated thus avoiding the use of heavy and bulky robotic equipment, are simple to use, and may be used as spark-proof or ignition-proof compliant in an environment, such as a tank 42 of an aircraft 26.

Many modifications and other versions or embodiments of the disclosure will come to mind to one skilled in the art to which this disclosure pertains having the benefit of the teachings presented in the foregoing descriptions and the associated drawings. The versions or embodiments described herein are meant to be illustrative and are not intended to be limiting or exhaustive. Although specific terms are employed herein, they are used in a generic and descriptive sense only and not for purposes of limitation.

What is claimed is:

1. A mechanical avatar assembly for use in a confined space in a structure, the mechanical avatar assembly comprising:
   a rail assembly designed for attachment to an access opening to the confined space in the structure, the rail assembly comprising:
      two or more rail segments coupled together to form an elongated base having a rail and a gear rack extending along a length of the elongated base;
      a carriage portion coupled to the rail, and movable relative to the rail; and
      a drive assembly coupled to the carriage portion and to the gear rack, to move the carriage portion along the rail;
   an articulating avatar arm coupled to, and movable via, the carriage portion, the articulating avatar arm comprising a plurality of mechanical links, a plurality of joints coupling the plurality of mechanical links together, and one or more actuator assemblies coupled at each joint, and the one or more actuator assemblies comprising one of, one or more pulley and cable assemblies, and one or more water-driven hydraulic piston assemblies; and
   an image capturing device coupled to the articulating avatar arm.

2. The mechanical avatar assembly of claim 1, further comprising a control system coupled to the mechanical avatar assembly, and located outside of the confined space of the structure, the control system comprising a plurality of control devices, including an input control arm mechanically coupled to the articulating avatar arm.

3. The mechanical avatar assembly of claim 2, wherein the input control arm is mechanically coupled to the articulating avatar arm with a plurality of connector elements that each translate a rotation of one of a plurality of input control arm joints on the input control arm about a joint axis to a linear displacement that causes a corresponding rotation of a corresponding joint on the articulating avatar arm, to remotely and directly control the articulating avatar arm, wherein the articulating avatar arm mimics one or more motions of the input control arm operated by an operator.

4. The mechanical avatar assembly of claim 1, further comprising an attachment assembly designed to attach at least one portion of the rail assembly of the mechanical avatar assembly to an edge of the access opening, the attachment assembly comprising a connector device connected to the at least one portion of the rail assembly, and a coupling mechanism that couples the connector device relative to the edge of the access opening.

5. The mechanical avatar assembly of claim 1, further comprising an end effector tool assembly coupled to the articulating avatar arm.

6. The mechanical avatar assembly of claim 1, wherein the rail assembly comprises one of, two rail segments coupled together, three rail segments coupled together, and four rail segments coupled together.

7. The mechanical avatar assembly of claim 1, wherein the drive assembly comprises a pneumatic drive assembly comprising:
   an air motor; and
   a gear coupled to a first end of the air motor, the gear interlocking with the gear rack and designed to rotate along the gear rack.

8. The mechanical avatar assembly of claim 7, wherein the rail assembly further comprises a brake assembly comprising:
   an air cylinder coupled to the carriage portion;
   a brake device coupled to a first end of the air cylinder, the brake device designed to interlock with the gear rack and stop the carriage portion from moving along the rail; and
   a shuttle valve coupled to the carriage portion, the shuttle valve synchronizing the air cylinder and the air motor.

9. The mechanical avatar assembly of claim 1, wherein the articulating avatar arm further comprises a rotary encoder device coupled to one or more of the plurality of joints.

10. A mechanical avatar system for use in a confined space in a structure, the mechanical avatar system comprising:
   a mechanical avatar assembly attached, via an attachment assembly, to an access opening to the confined space in the structure, the mechanical avatar assembly comprising:
      a rail assembly having a rail and a gear rack, extending along a length of an elongated base formed by two or more rail segments, and having a carriage portion, driven by a pneumatic drive assembly along the rail;
      an articulating avatar arm coupled to, and movable via, the carriage portion, the articulating avatar arm comprising a plurality of mechanical links, a plurality of joints coupling the plurality of mechanical links together, and one or more actuator assemblies coupled at each joint;
      an image capturing device coupled to the articulating avatar arm; and
      an end effector tool assembly coupled to the articulating avatar arm; and
   an operator workstation positioned outside the confined space, at a predetermined distance from the mechanical avatar assembly attached to the access opening in the structure, the operator workstation comprising:
      a portable structure having a control system with a plurality of control devices, including pneumatic drive assembly control devices, and including an input control arm mechanically coupled to the articulating avatar arm, with a plurality of connector elements, to remotely and directly control the articulating avatar arm, wherein the articulating avatar arm mimics one or more motions of the input control arm operated by an operator, and wherein the plurality of control devices further comprise a gross angular motion control device coupled to the portable structure, the gross angular motion control device comprising a gross angular motion wheel with a handle, and a gross angular motion pulley and cable assembly coupled to the gross angular motion wheel, and coupled to a base portion of the articulating avatar arm, to enable 300 (three hundred) degrees of motion of the articulating avatar arm with a range of 0 (zero) degrees to 90 (ninety) degrees of operator movement by the operator; and a monitor coupled to the portable structure, to display one or more output images from the image capturing device.

11. The mechanical avatar system of claim 10, wherein the input control arm comprises:

a plurality of input control arm mechanical links equal in number to the plurality of mechanical links of the articulating avatar arm;

a plurality of input control arm joints coupling the plurality of input control arm mechanical links together, the plurality of input control arm joints equal in number to the plurality of joints of the articulating avatar arm; and one or more input control arm actuator assemblies coupled at each input control arm joint of the plurality of input control arm joints.

12. The mechanical avatar system of claim 10, wherein the rail assembly further comprises a brake assembly comprising:

an air cylinder coupled to the carriage portion;

a brake device coupled to a first end of the air cylinder, the brake device designed to interlock with the gear rack and stop the carriage portion from moving along the rail; and a shuttle valve coupled to the carriage portion, the shuttle valve synchronizing the air cylinder and an air motor.

13. The mechanical avatar system of claim 10, wherein the input control arm is mechanically coupled to the articulating avatar arm, with a plurality of cables, and the plurality of control devices further comprise a cable tension control device coupled to the portable structure, the cable tension control device designed to control a tension of one or more of the plurality of cables.

14. The mechanical avatar system of claim 10, wherein the operator workstation further comprises one or more counterbalance devices coupled to the portable structure, each of the one or more counterbalance devices comprising a counterbalance pulley and cable assembly coupled to a weight, to counterbalance one of, an articulating avatar arm weight of the articulating avatar arm, and an input control arm weight of the input control arm.

15. The mechanical avatar system of claim 10, wherein the structure comprises a vehicle, including an aircraft, a rotorcraft, a spacecraft, an automobile, a truck, a train, and a watercraft, and comprises an architectural structure having the confined space.

16. A method of using and remotely operating a mechanical avatar assembly in a confined space in a structure, the method comprising the steps of:

installing the mechanical avatar assembly in an interior of the confined space in the structure, the mechanical avatar assembly comprising:

a rail assembly having a rail and a gear rack, extending along a length of an elongated base formed by two or more rail segments, and having a carriage portion, driven by a pneumatic drive assembly along the rail;

an articulating avatar arm coupled to, and movable via, the carriage portion, the articulating avatar arm comprising a plurality of mechanical links, a plurality of joints coupling the plurality of mechanical links together, and one or more actuator assemblies coupled at each joint;

an image capturing device coupled to the articulating avatar arm; and an end effector tool assembly coupled to the articulating avatar arm;

attaching, with an attachment assembly, at least one portion of the mechanical avatar assembly, to an edge of an access opening to the confined space;

positioning an operator workstation outside the confined space, at a predetermined distance from the mechanical avatar assembly attached to the access opening, the operator workstation comprising a portable structure having a control system with a plurality of control devices, including an input control arm, and pneumatic drive assembly control devices, and the operator workstation further comprising a monitor, to display one or more output images from the image capturing device;

mechanically coupling the mechanical avatar assembly to the operator workstation, including mechanically coupling the input control arm to the articulating avatar arm, with a plurality of connector elements;

operating the pneumatic drive assembly control devices by an operator, to remotely control the pneumatic drive assembly, to drive the carriage portion along the rail, to move the articulating avatar arm to a desired position, the pneumatic drive assembly control devices comprising a pedal valve and a control valve, to remotely control an air motor of the pneumatic drive assembly, and controlling a speed of the air motor with the pedal valve, and controlling a direction of the air motor with the control valve, and further powering the air motor with air from an air supply located outside of the confined space;

operating the input control arm by the operator, to remotely and directly control the articulating avatar arm, by mechanically actuating one or more input control arm actuator assemblies coupled to, and corresponding to, the one or more actuator assemblies of the articulating avatar arm, to cause the articulating avatar arm to mimic one or more motions of the input control arm, and to orient the articulating avatar arm to a desired orientation; and performing one or more confined space operations in the confined space in the structure, by using and remotely operating one of, the image capturing device, or the image capturing device and the end effector tool assembly, coupled to the mechanical avatar assembly.

17. The method of claim 16, wherein installing the mechanical avatar assembly in the interior of the confined space in the structure, further comprises the steps of:

attaching the articulating avatar arm to a first rail segment of the rail assembly;

inserting a second rail segment of the rail assembly through the access opening into the interior of the confined space of the structure;

inserting the first rail segment with the attached articulating avatar arm through the access opening into the interior of the confined space of the structure, and positioning the first rail segment with the attached articulating avatar arm aft to, and aligned with, the second rail segment; and coupling the first rail segment to the second rail segment, with one or more coupling elements.

18. The method of claim 16, wherein attaching the at least one portion of the mechanical avatar assembly, to the edge of the access opening, further comprises, attaching with the attachment assembly comprising a connector device connected to the at least one portion of the rail assembly of the mechanical avatar assembly, and a coupling mechanism that couples the connector device relative to the edge of the access opening.

19. The method of claim 16, wherein installing the mechanical avatar assembly in the interior of the confined space in the structure, further comprises the mechanical avatar assembly comprising the end effector tool assembly comprising:

an end effector; and a tool coupled to the end effector, the tool comprising one of, a sealant tool, a sealant gun, a paint tool, a primer tool, a fastener tool, a cleaning tool, or an installation tool configured to perform the one or more confined space operations.

20. The method of claim 16, further comprising after operating the pneumatic drive assembly control devices, and before operating the input control arm, operating a gross angular motion control device coupled to the portable structure, and coupled to a base portion of the articulating avatar arm, and enabling 300 (three hundred) degrees of motion of the articulating avatar arm with a range of 0 (zero) degrees to 90 (ninety) degrees of operator movement by the operator.

\* \* \* \* \*